United States Patent [19]

Tinder et al.

[11] Patent Number: 5,026,006
[45] Date of Patent: Jun. 25, 1991

[54] SAFETY ENCLOSURES AND SYSTEMS FOR HIGH SPEED VEHICLES

[76] Inventors: Landon D. Tinder, 12860 Sundown La., Chino Hills, Calif. 91709; Richard F. Tinder, SW. 640 Winter Cir., Pullman, Wash. 99163

[21] Appl. No.: 313,990

[22] Filed: Feb. 22, 1989

[51] Int. Cl.$^5$ ............................................. B64D 11/06
[52] U.S. Cl. ......................... 244/122 AG; 296/24.1; 280/738; 280/748; 244/118.5; 244/122 R; 244/121
[58] Field of Search ............ 280/738, 728, 748; 244/121, 122 AG, 140, 141, 118.5; 62/52.1, 78, 223; 220/88 B; 296/24.1

[56] References Cited

U.S. PATENT DOCUMENTS

| | | | |
|---|---|---|---|
| 1,027,764 | 5/1912 | Rilleau | 244/118.5 |
| 1,360,755 | 11/1920 | Jordan . | |
| 1,733,932 | 10/1929 | Ballaz . | |
| 1,820,958 | 9/1931 | Zinkowetsky | 244/121 |
| 2,058,659 | 10/1936 | Bellanca | 244/118.5 |
| 2,077,910 | 4/1937 | Thomson | 244/140 |
| 2,240,747 | 5/1941 | Babb et al. | 244/1 |
| 2,418,798 | 4/1947 | Whitmer | 244/121 |
| 2,497,153 | 2/1950 | Cosakis | 244/118.5 |
| 2,570,622 | 10/1951 | Willis | 244/121 |
| 2,715,001 | 8/1955 | Provenzano | 244/118.5 |
| 2,960,292 | 11/1960 | Pitta | 244/121 |
| 2,984,211 | 5/1961 | Schneider | 121/38 |
| 3,090,212 | 5/1963 | Anderson et al. | 244/117 |
| 3,169,466 | 2/1965 | Cramer | 244/140 |
| 3,229,936 | 1/1966 | Quillinan | 244/138 |
| 3,294,346 | 12/1966 | Summers | 244/121 |
| 3,352,123 | 11/1967 | Ulbricht et al. | 62/52.1 |
| 3,516,895 | 6/1970 | Hartman | 244/117 |
| 3,603,535 | 9/1971 | DePolo | 244/121 |
| 3,758,133 | 9/1973 | Okada | 244/121 |
| 4,297,757 | 11/1981 | Camu | 114/349 |
| 4,477,732 | 10/1984 | Mausner | 280/728 |
| 4,500,114 | 2/1985 | Grey, Jr. | 280/738 |
| 4,609,166 | 9/1986 | Breman | 244/141 |
| 4,646,993 | 3/1987 | Baetke | 244/118.5 |
| 4,649,795 | 3/1987 | Olander | 244/121 |
| 4,742,760 | 5/1988 | Horstman et al. | 244/118.5 |
| 4,821,984 | 4/1989 | Yoshida | 244/141 |
| 4,937,953 | 4/1988 | Soffiantini | 244/122 |

FOREIGN PATENT DOCUMENTS

| | | | |
|---|---|---|---|
| 1091874 | 10/1960 | Fed. Rep. of Germany | 244/121 |
| 44480 | 6/1933 | France | 244/118 |
| 1275699 | 12/1961 | France | 244/121 |
| 338963 | 3/1936 | Italy | 244/118.5 |
| 932476 | 5/1982 | U.S.S.R. | 62/52.1 |
| 1408084 | 10/1975 | United Kingdom | 280/738 |

*Primary Examiner*—Joseph F. Peters, Jr.
*Assistant Examiner*—Christopher P. Ellis
*Attorney, Agent, or Firm*—Wells, St. John & Roberts

[57] ABSTRACT

Safety enclosures for use in high speed vehicles such as aircraft and high speed trains. The safety enclosures include an enclosure shell which preferably has two shell walls separated by a crash resistant intermediate material which also provides thermal insulation against fires and acoustic attenuation. The enclosures also advantageously include cooling systems which utilize a refrigerant which is expanded through tubes connected along the inner wall of the enclosure shell. A compressed air supply is provided which supplies breathing air to passengers and is used to expand a crash bag. Air is supplied through both the crash bag at passenger contacting panels and through supply lines which exhaust near the passengers' heads. A motor driven door assembly is controlled to close as the crash bag is being deployed. Exhaust ports having check valves allow positive pressure to be maintained in the cabin of the enclosures to exclude smoke and fire. Passenger seating is provided which includes a dual shoulder harness restraint which is supplemented by the crash bag system. Seating includes a number of features designed to reduce shock and inertial forces experienced by the passengers during crashes. The safety enclosures are provided in singular units and modular arrays having single rows and opposing muliple rows of passenger seats.

87 Claims, 52 Drawing Sheets

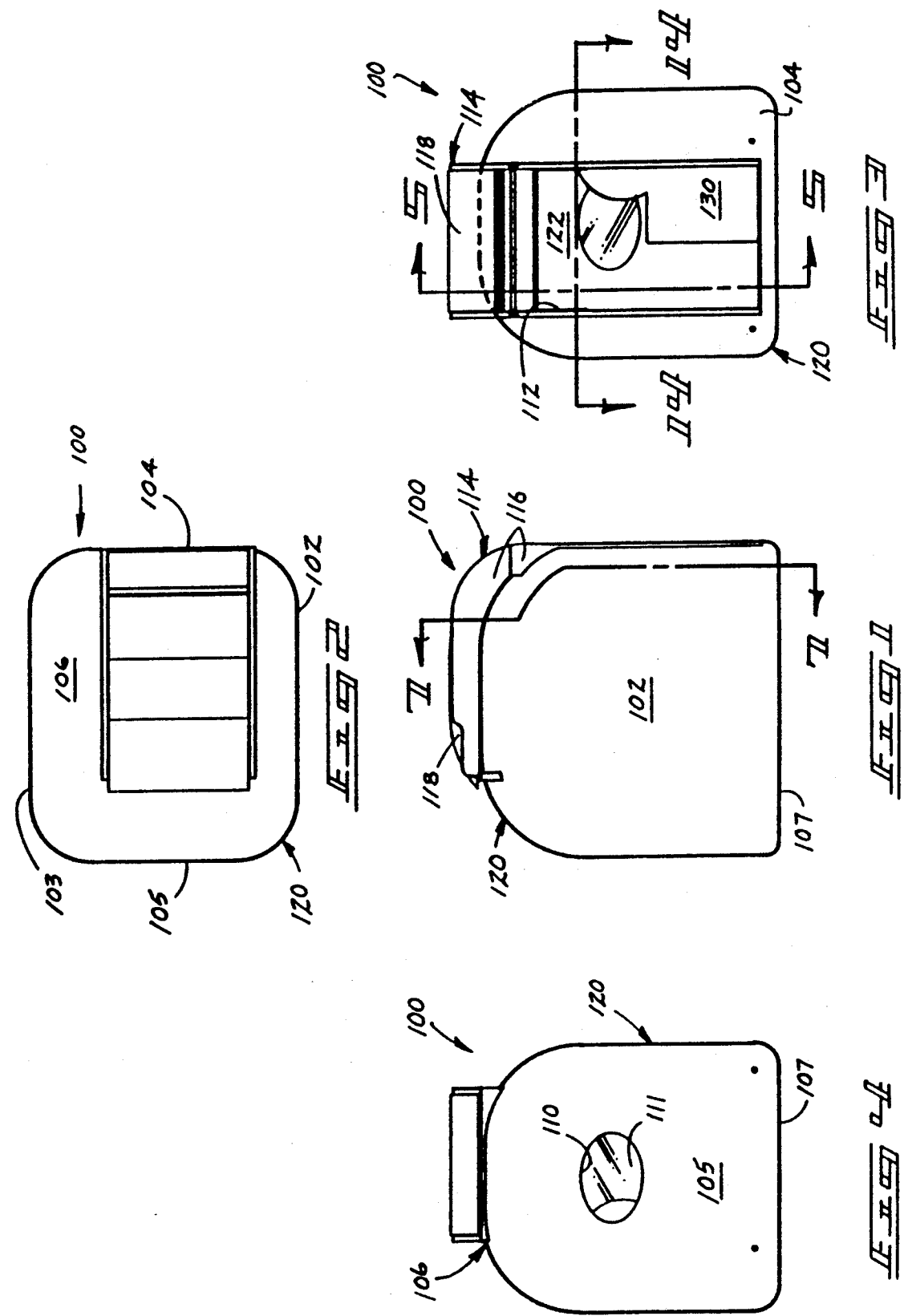

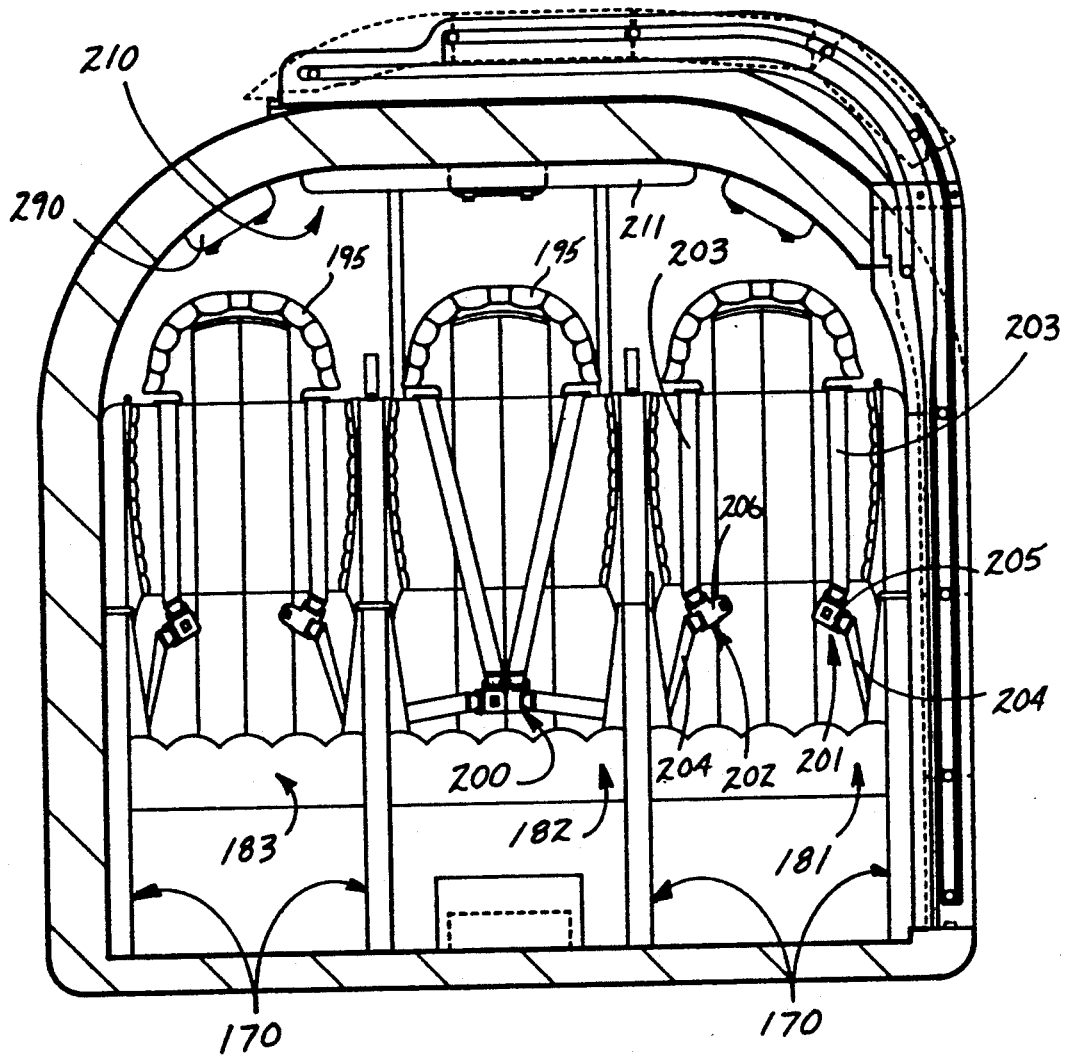

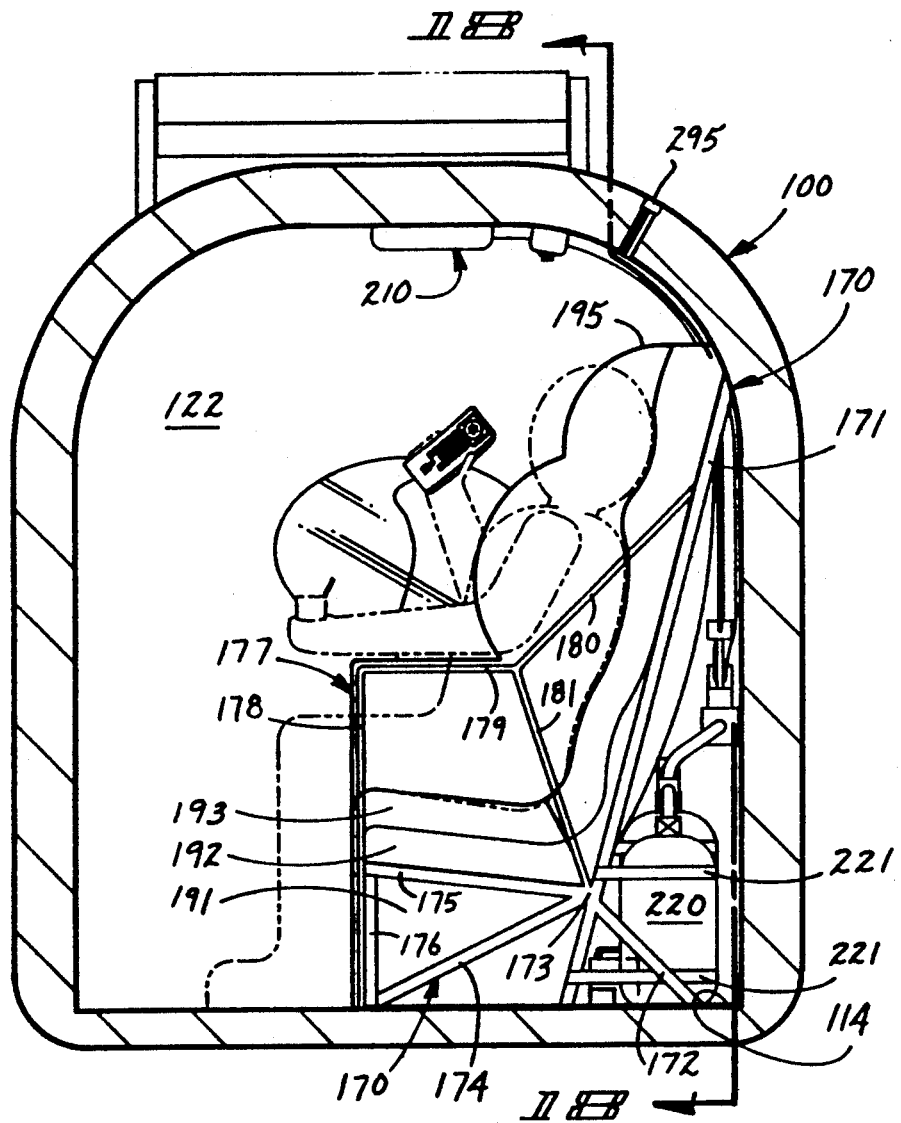

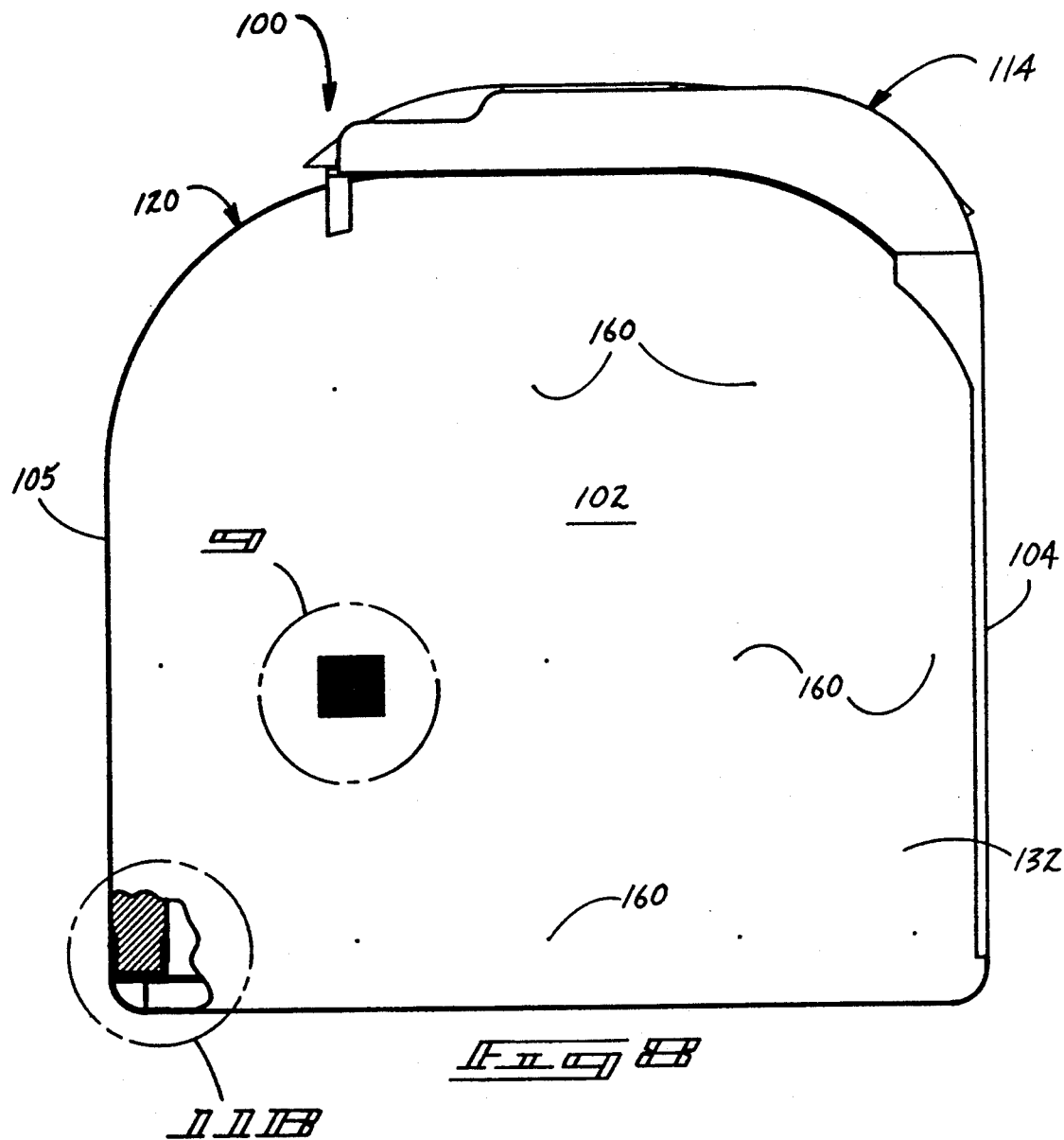

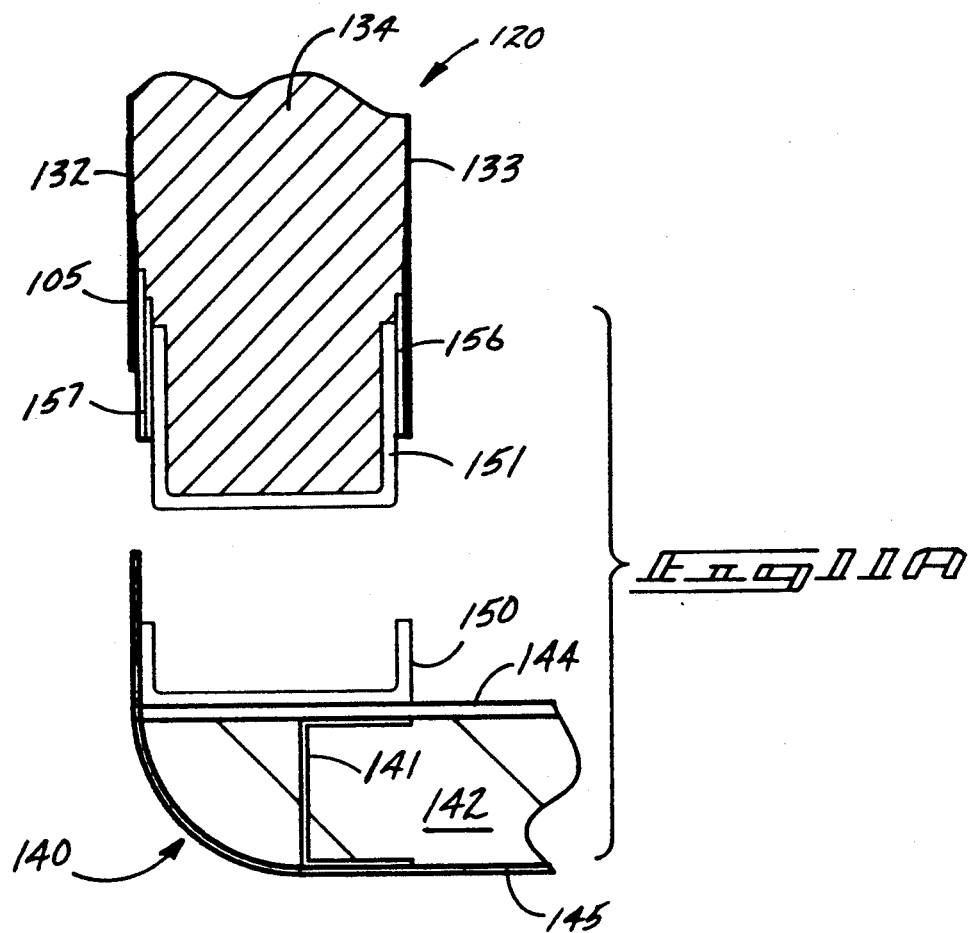
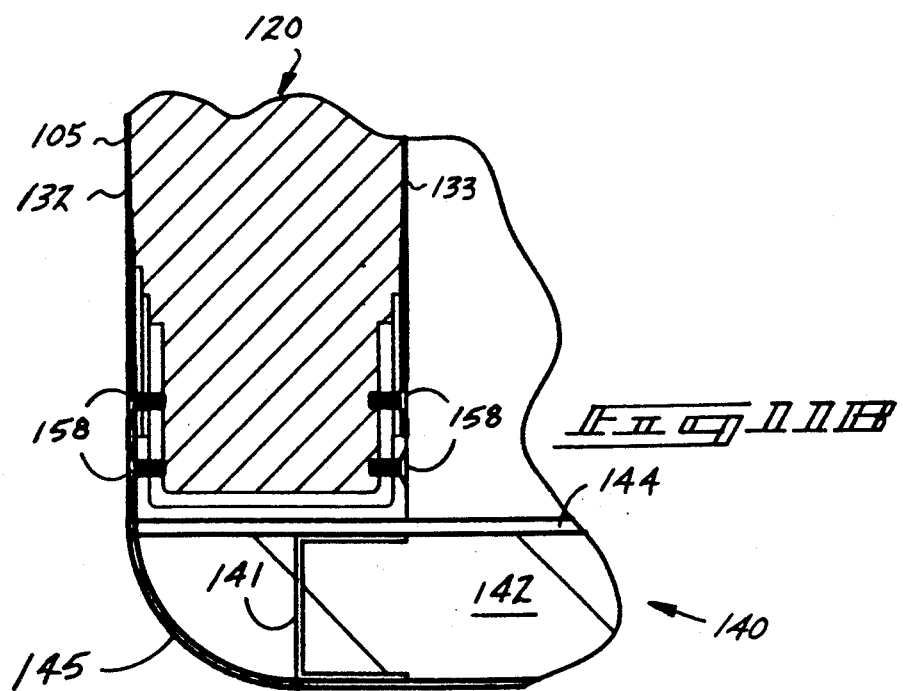

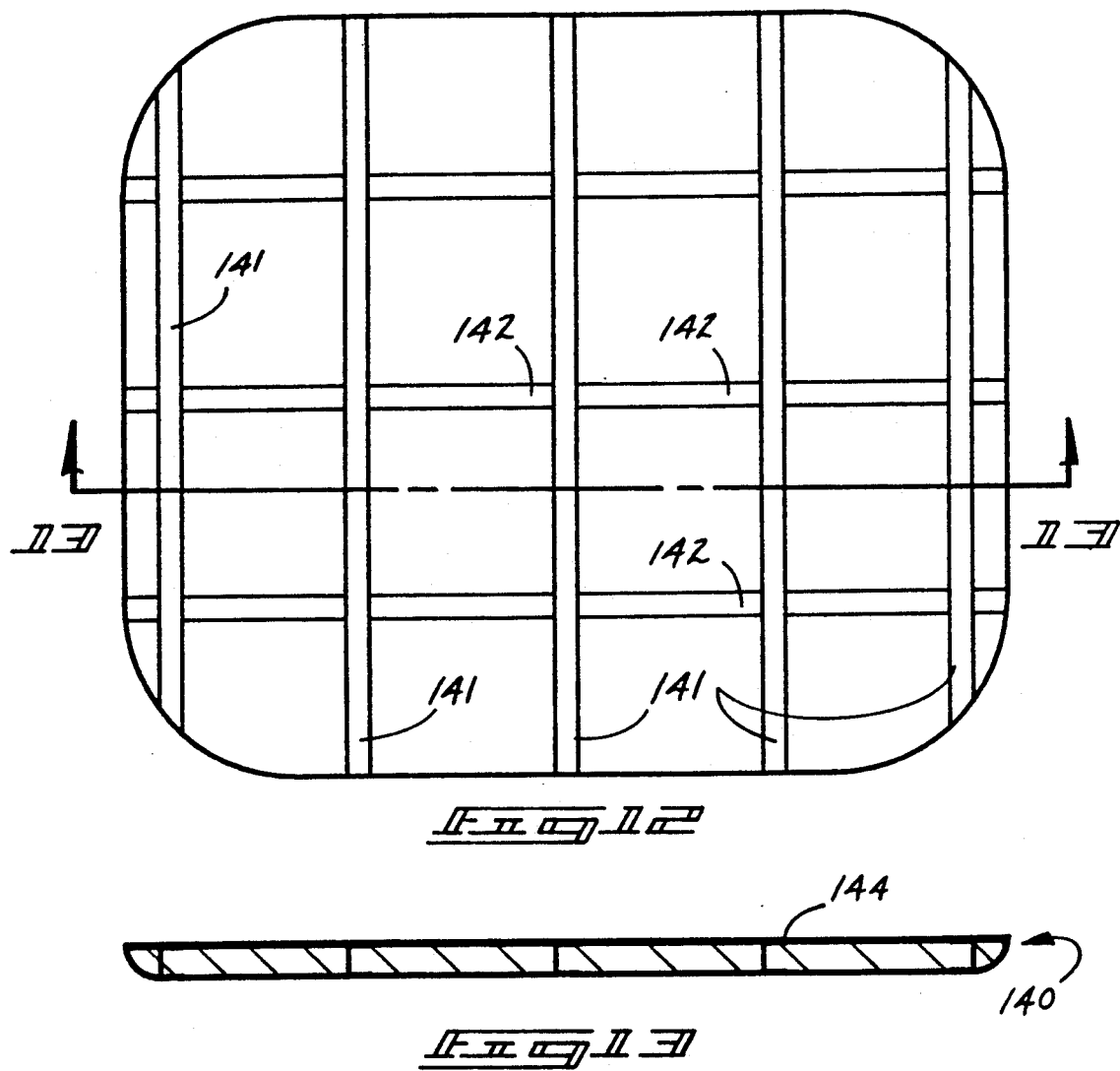

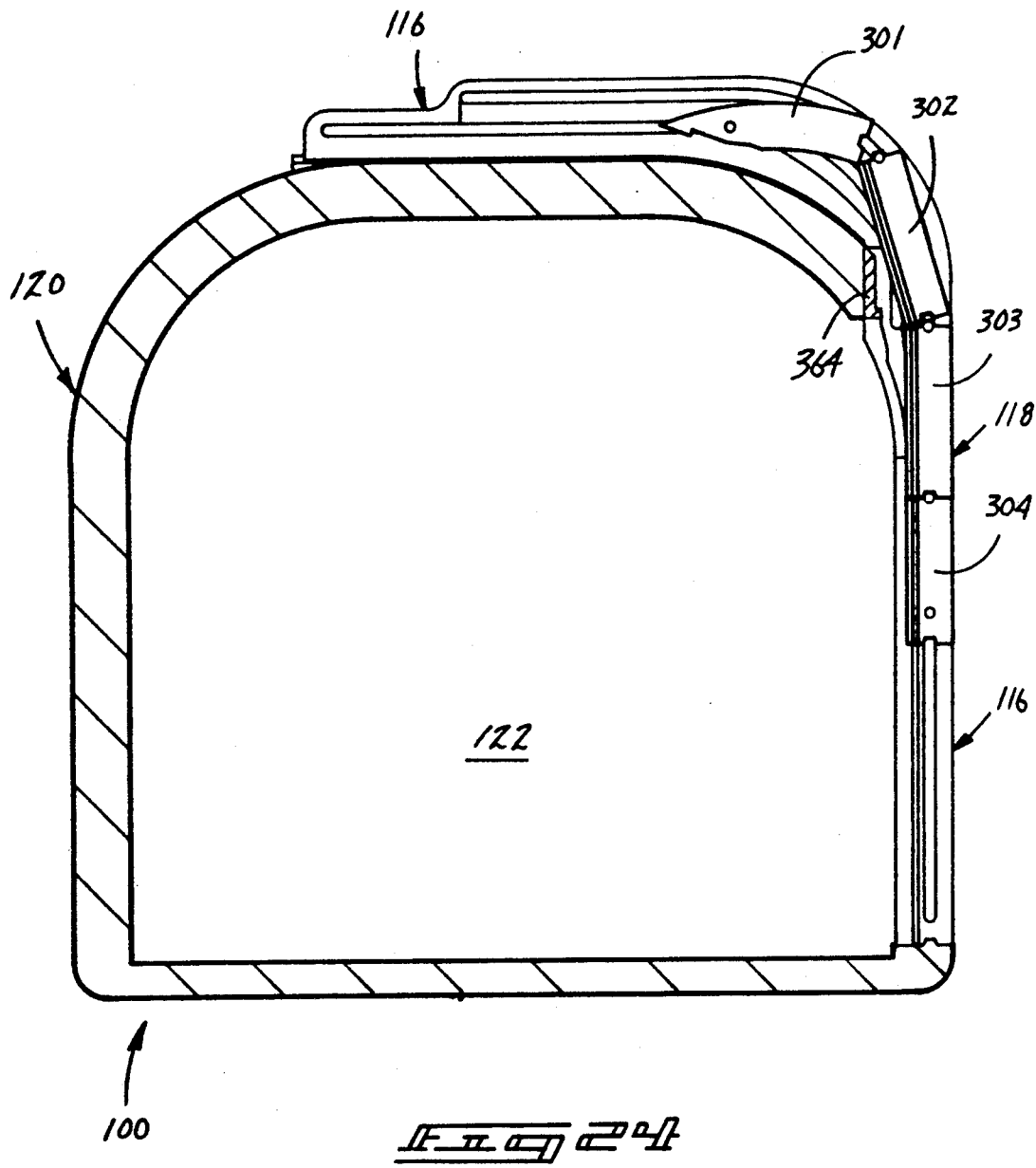

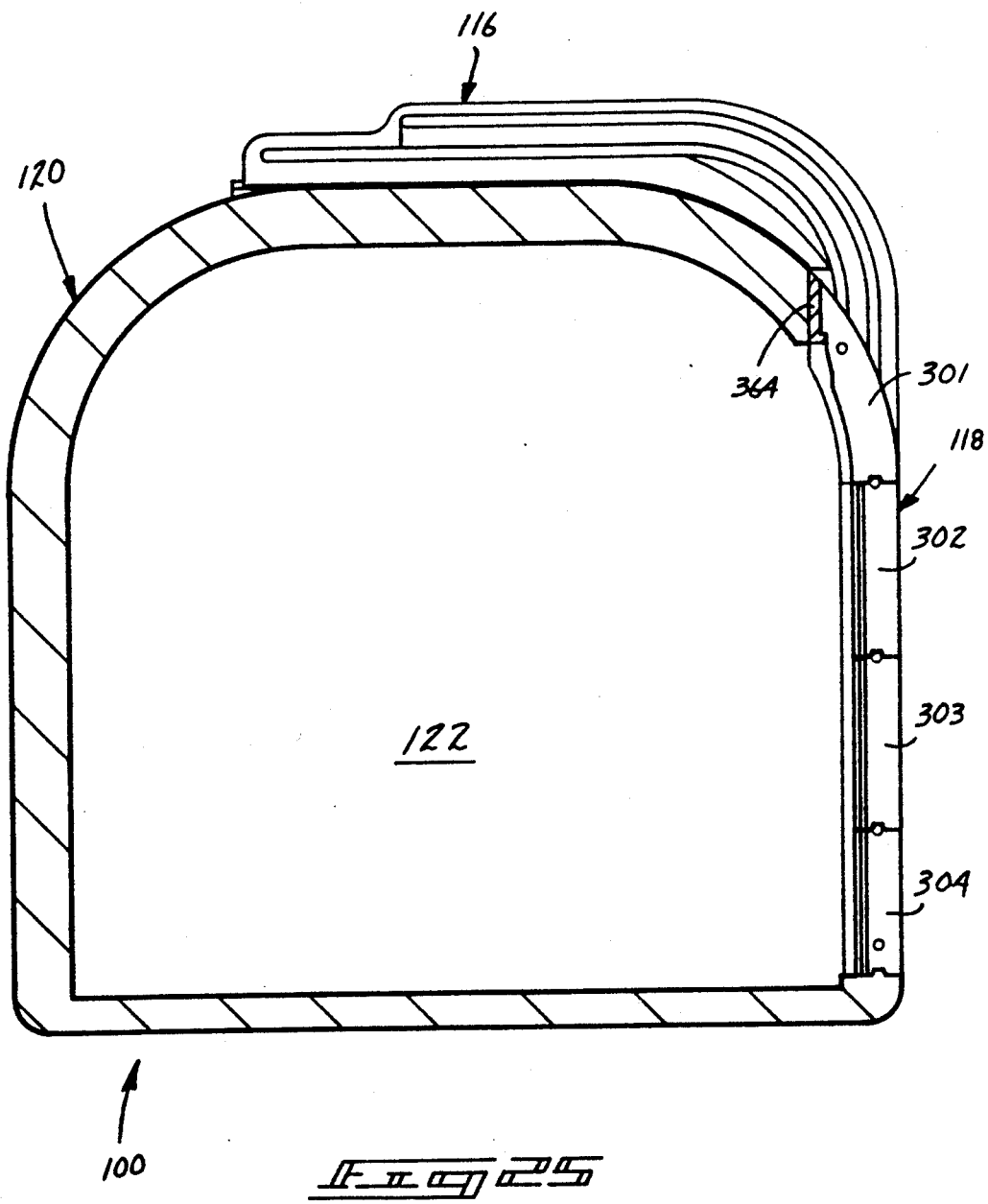

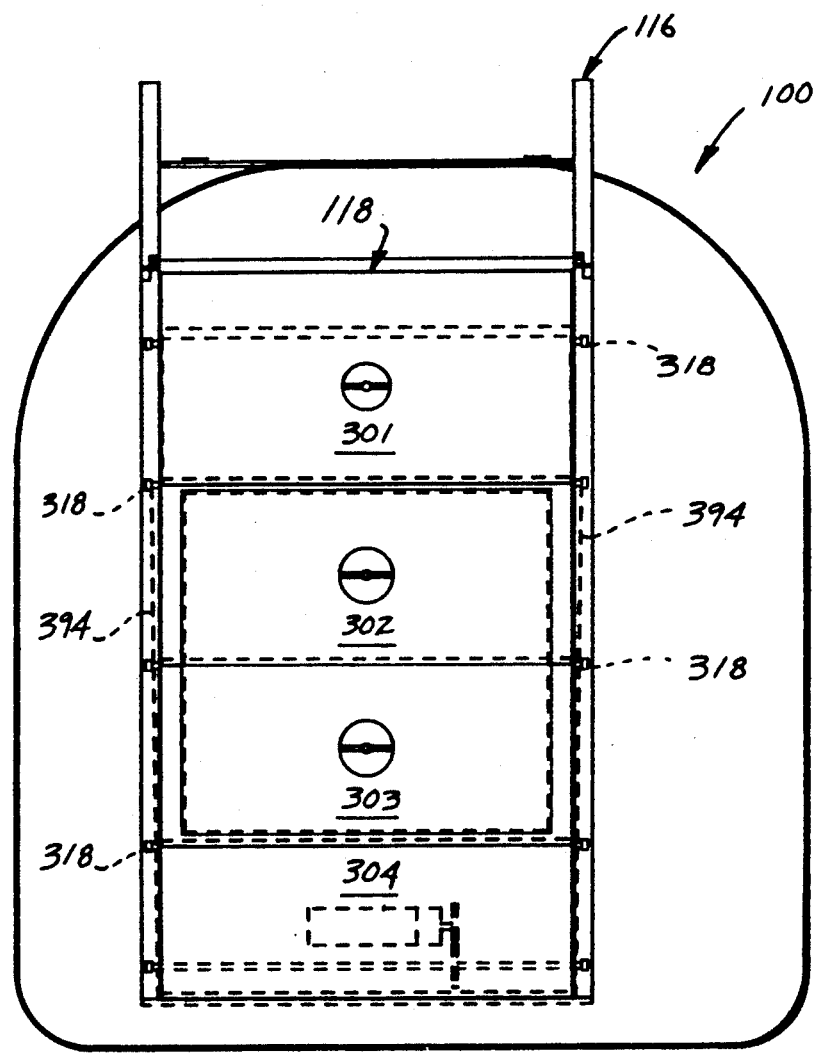

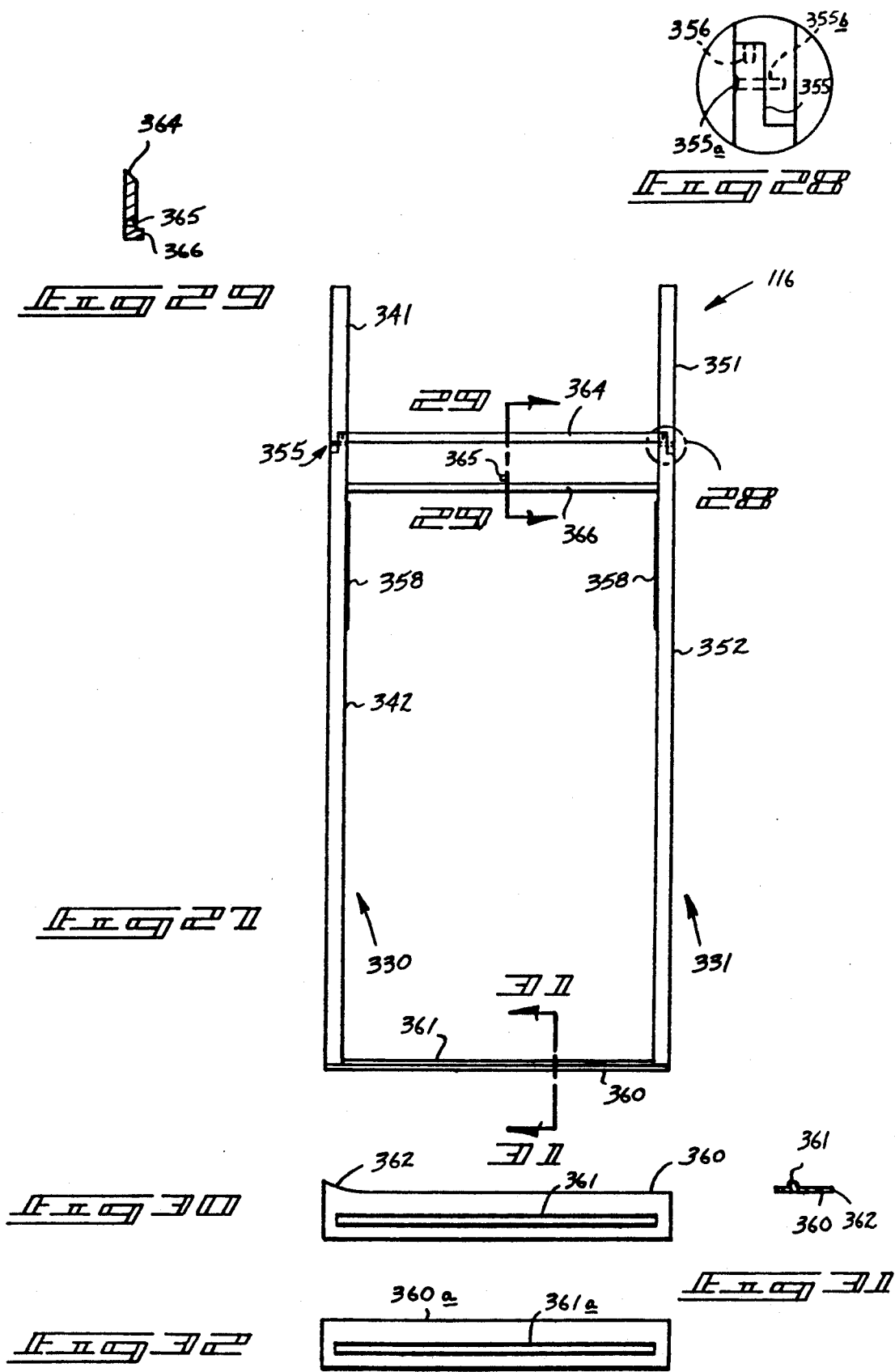

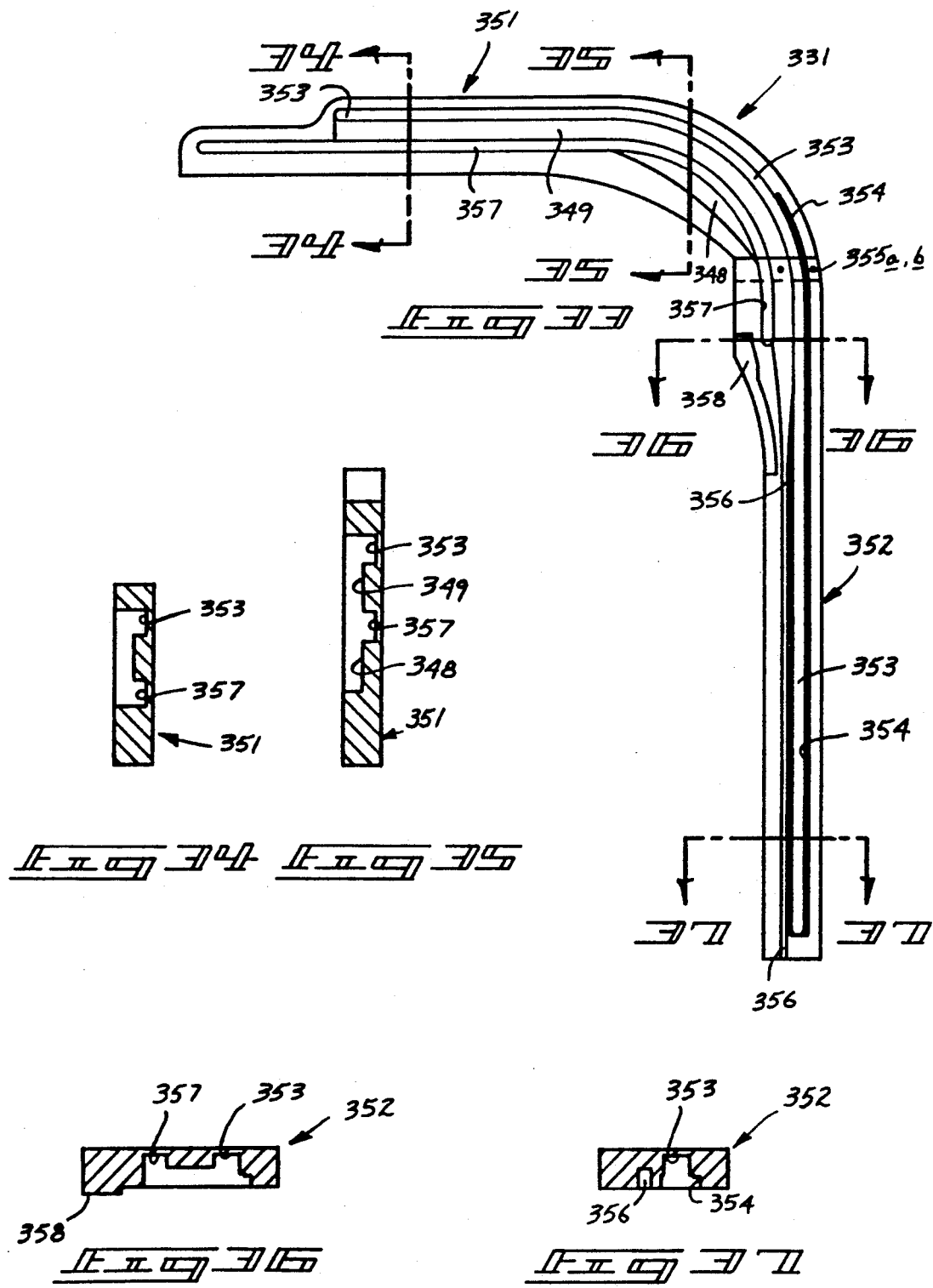

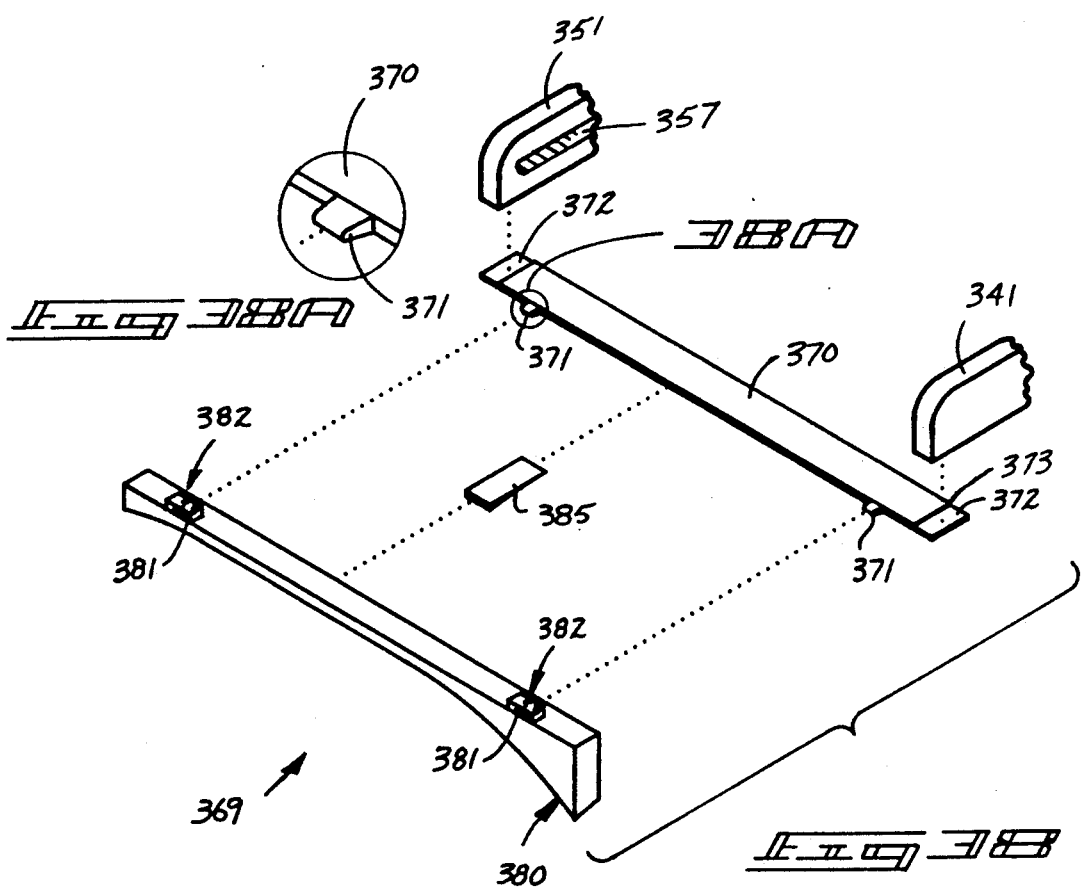

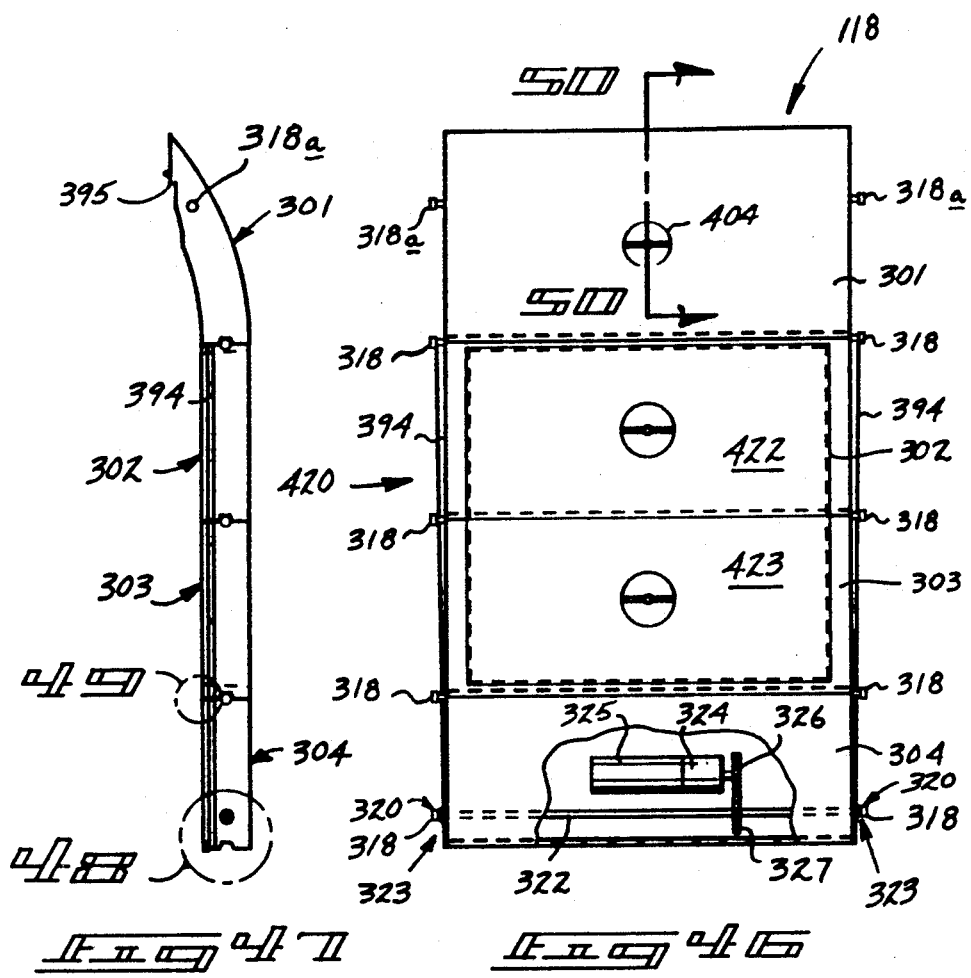
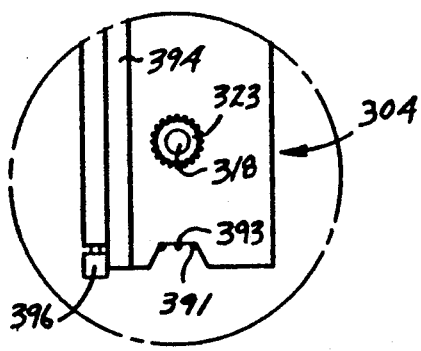
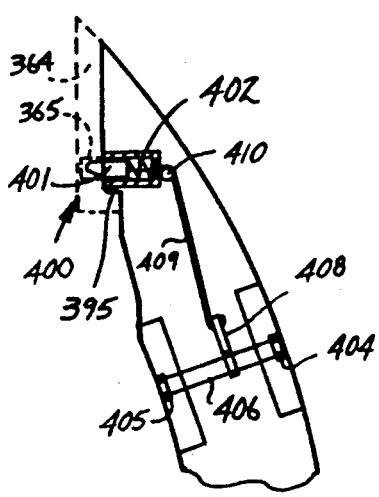
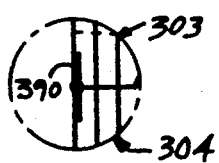

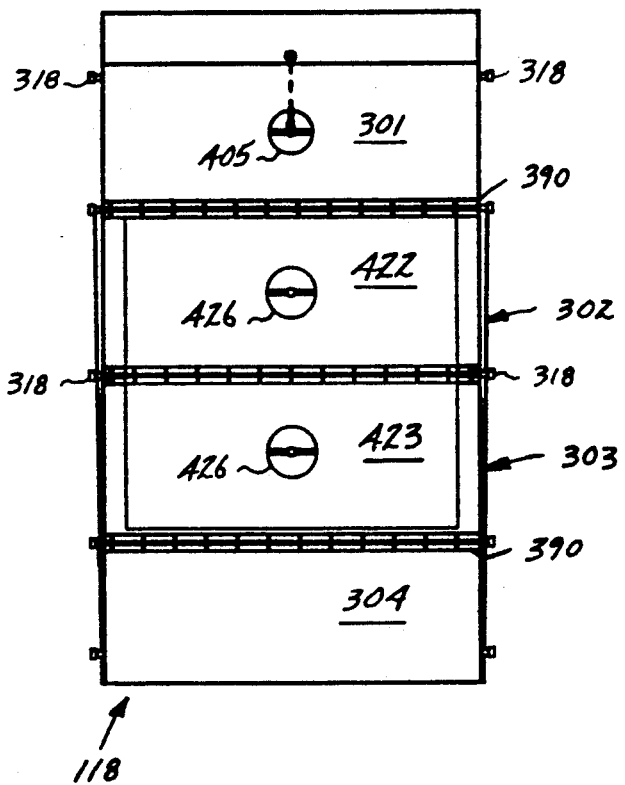

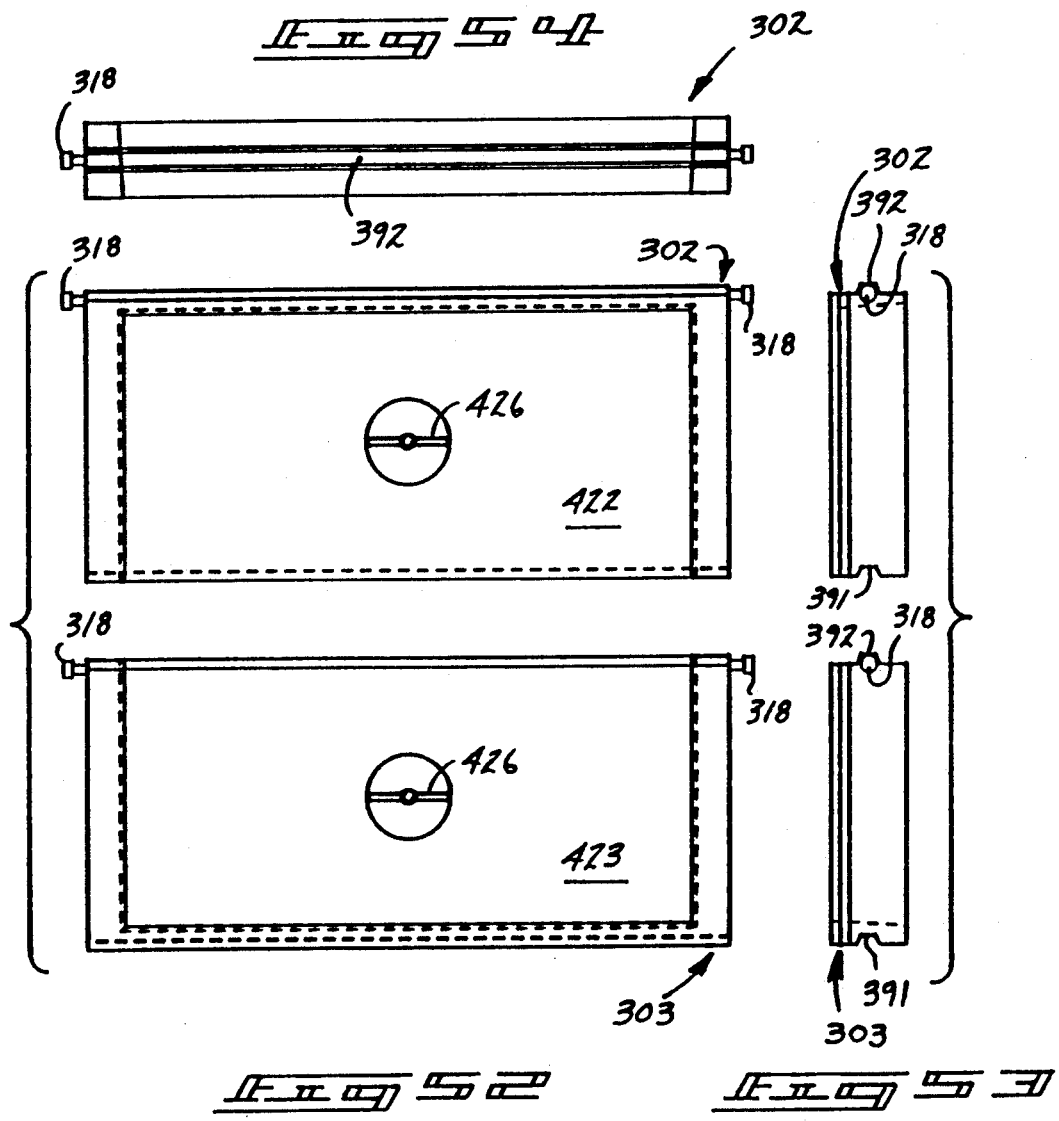

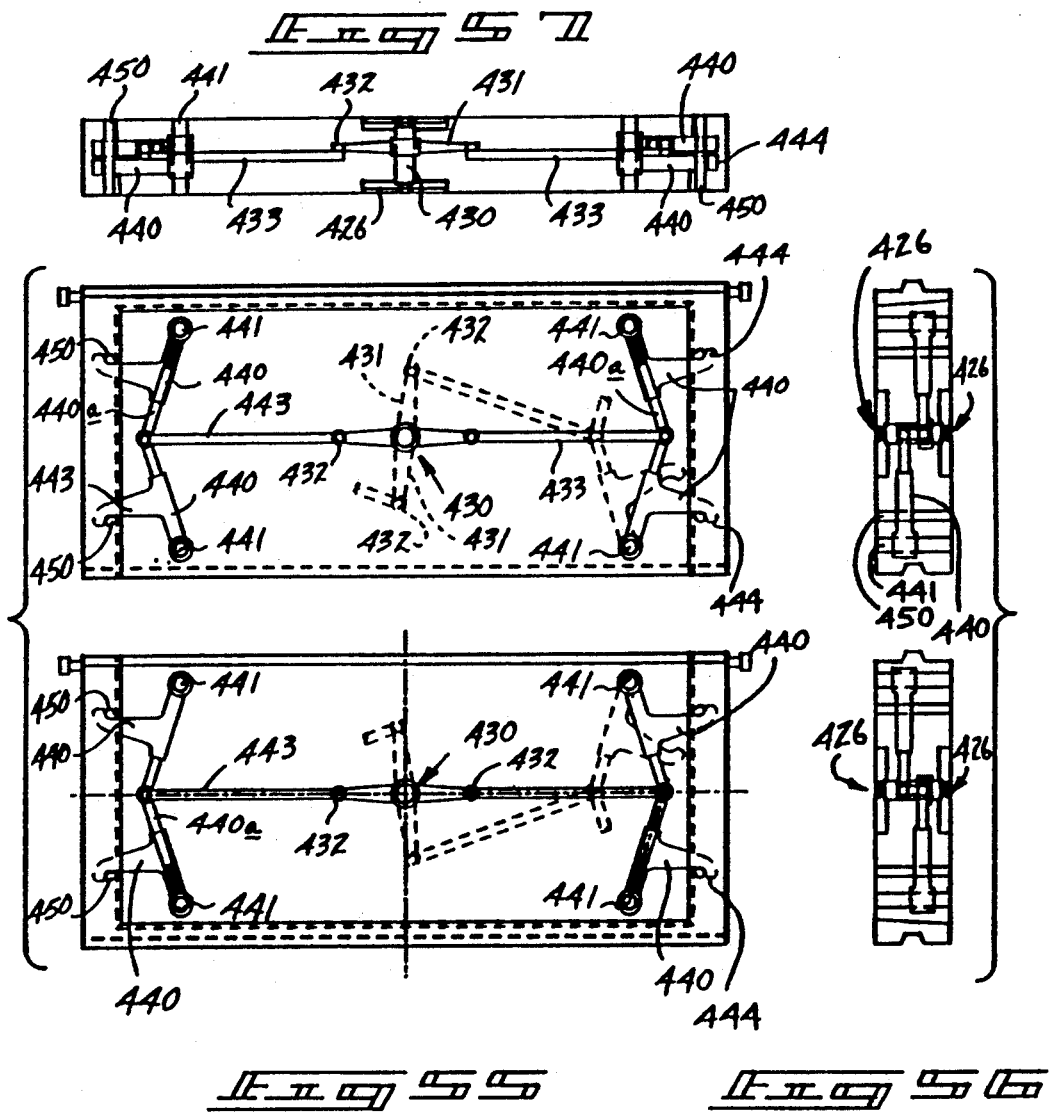

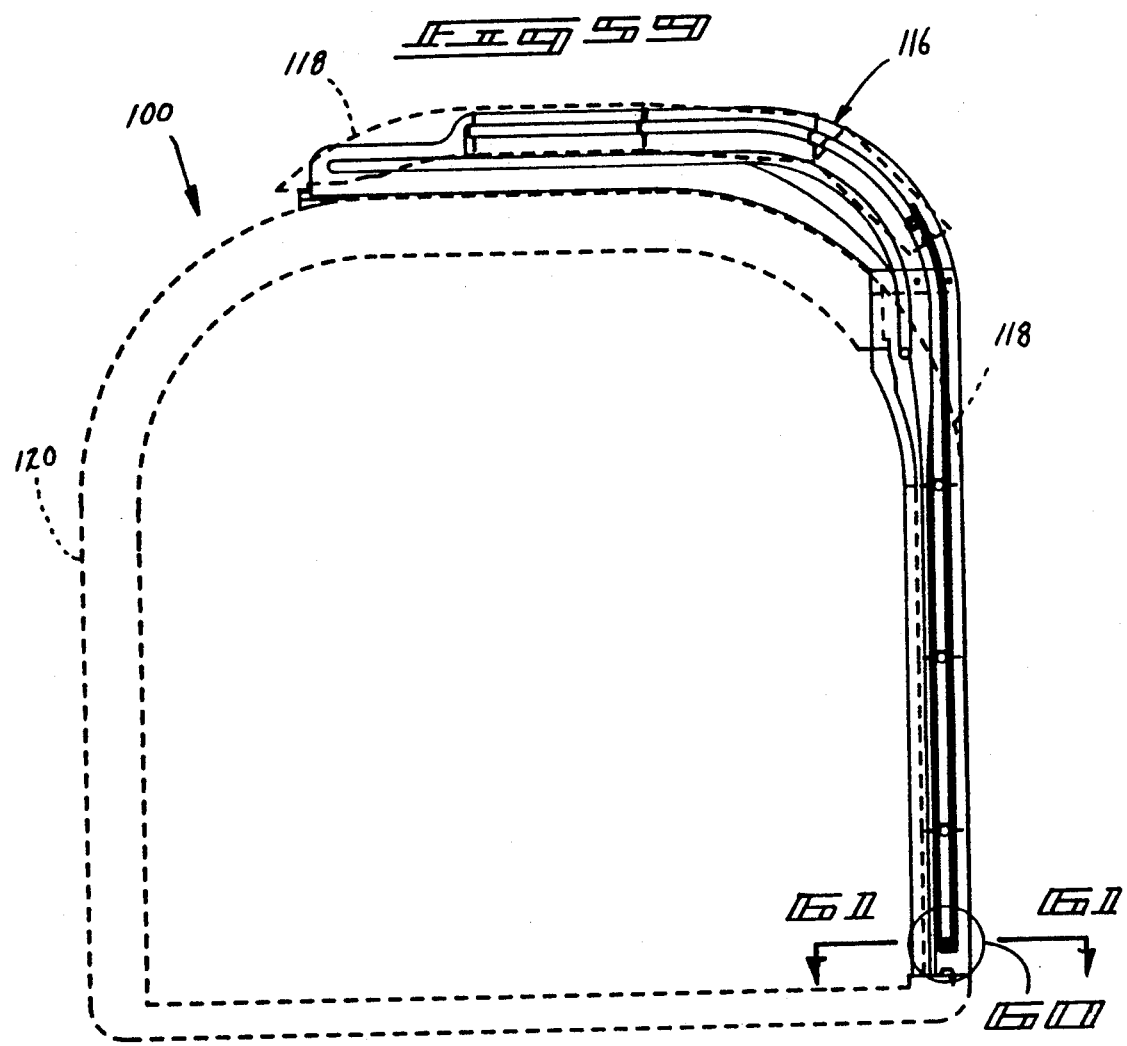
Fig 59
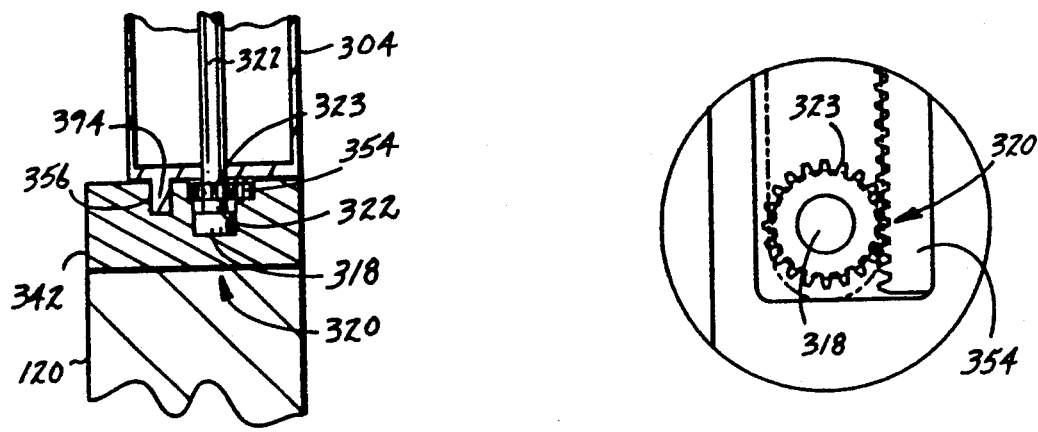
Fig 61
Fig 60

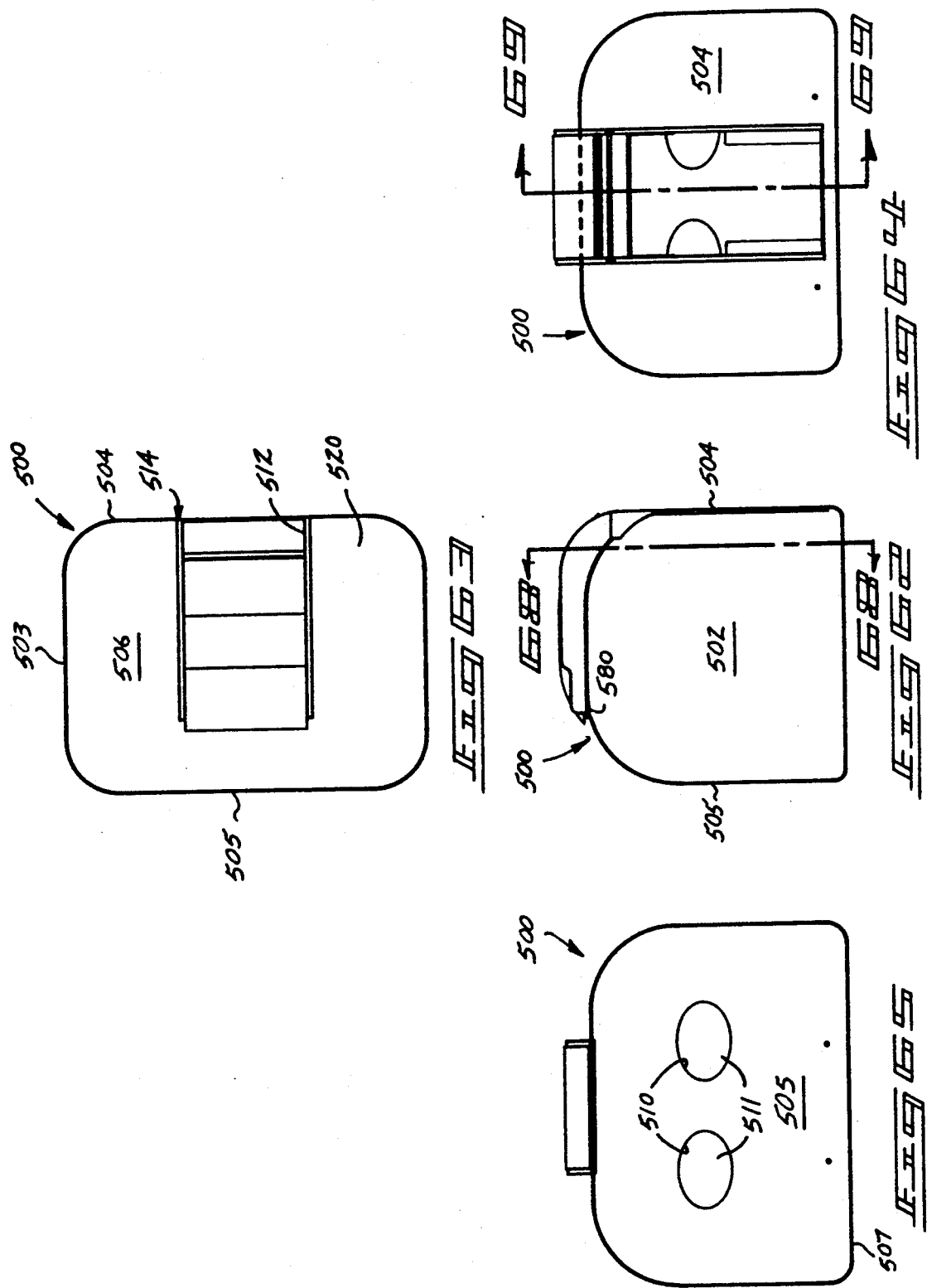

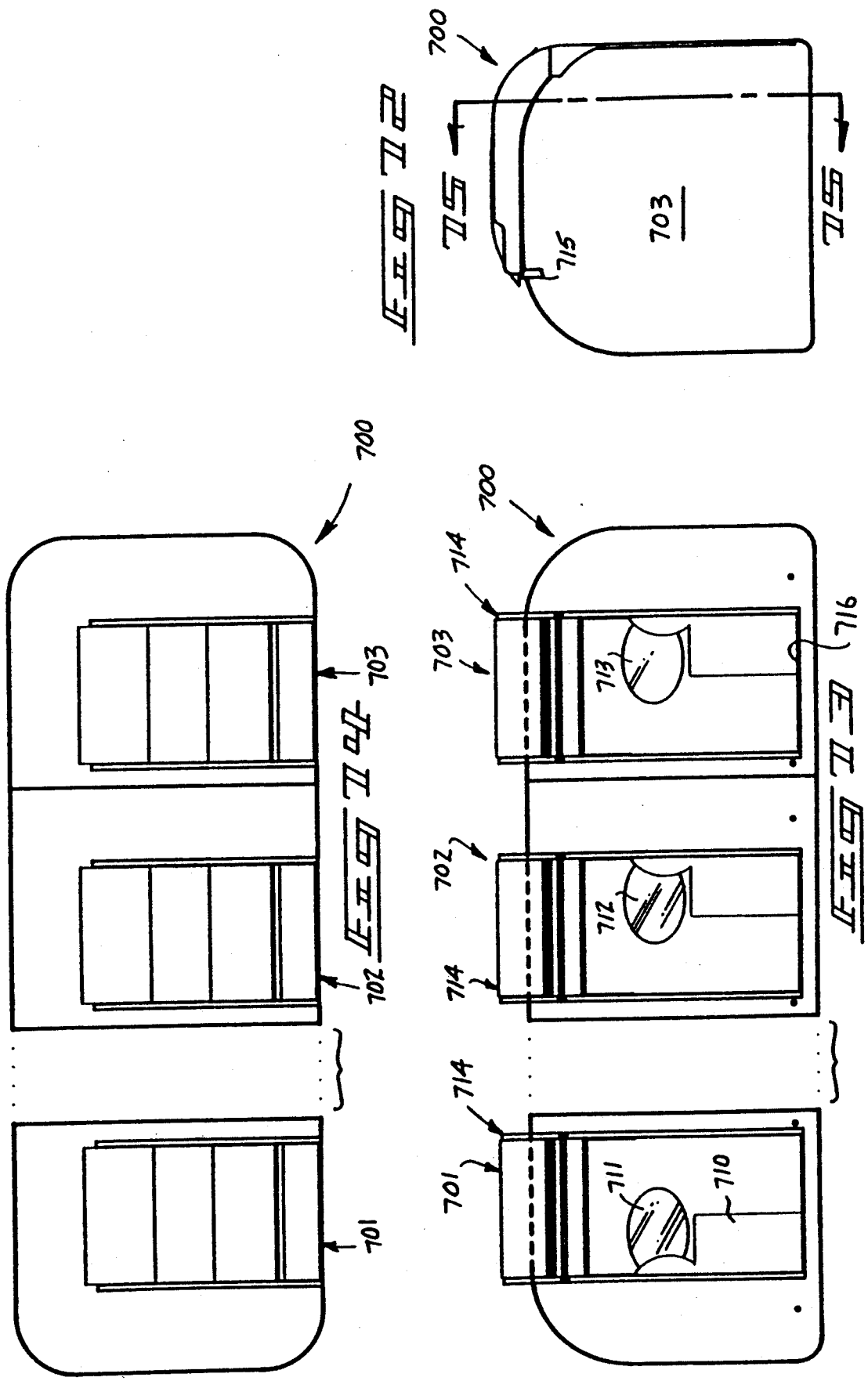

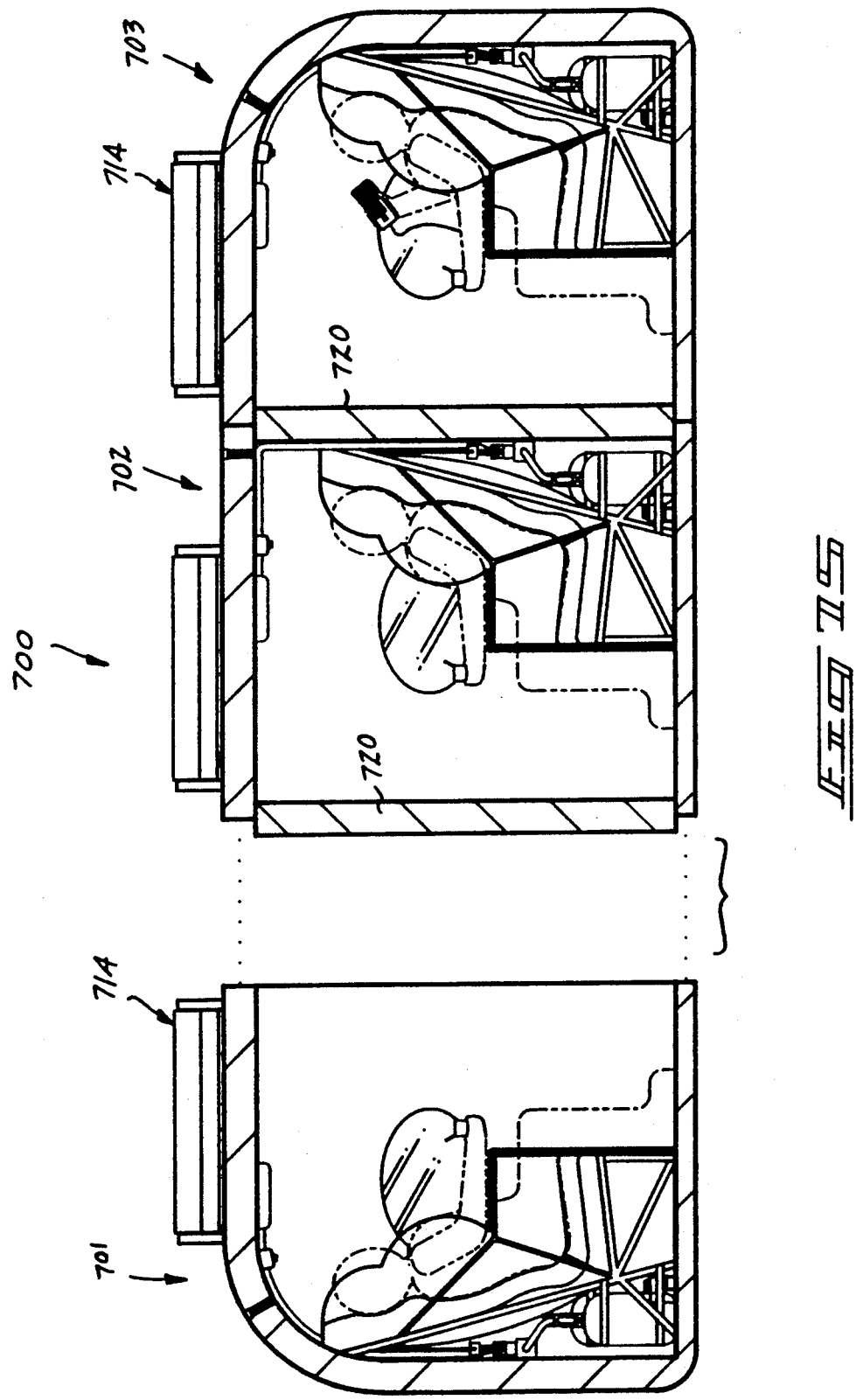

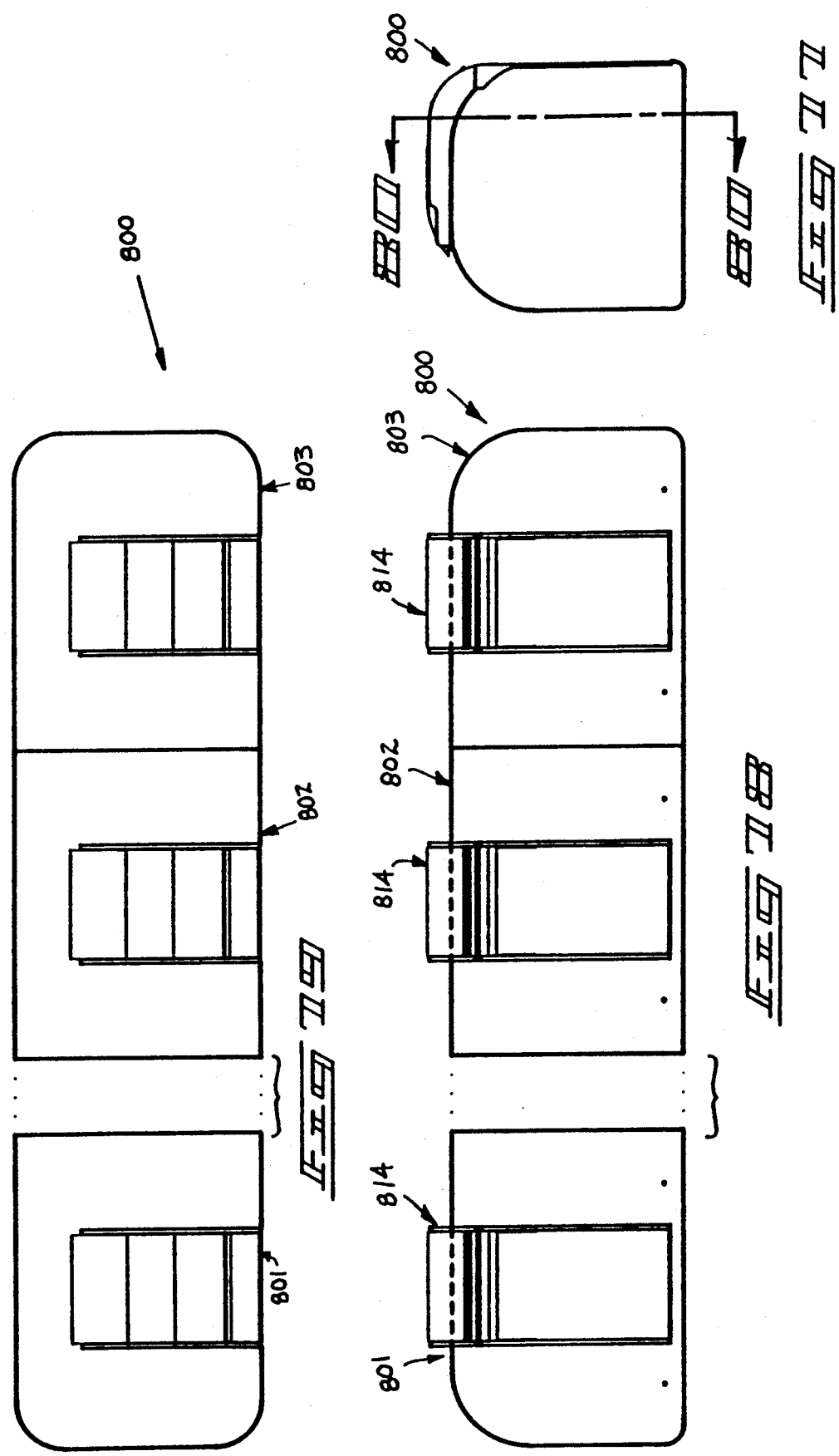

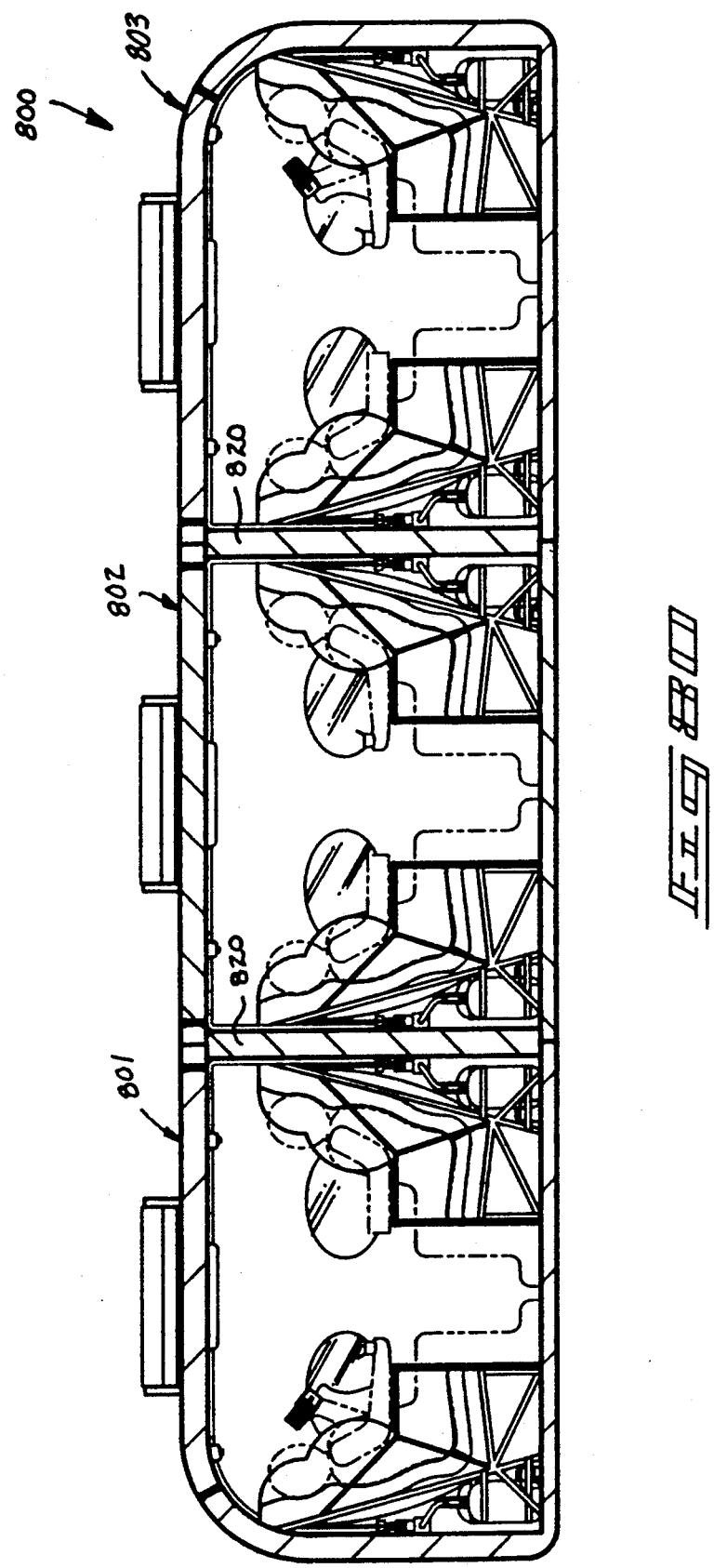

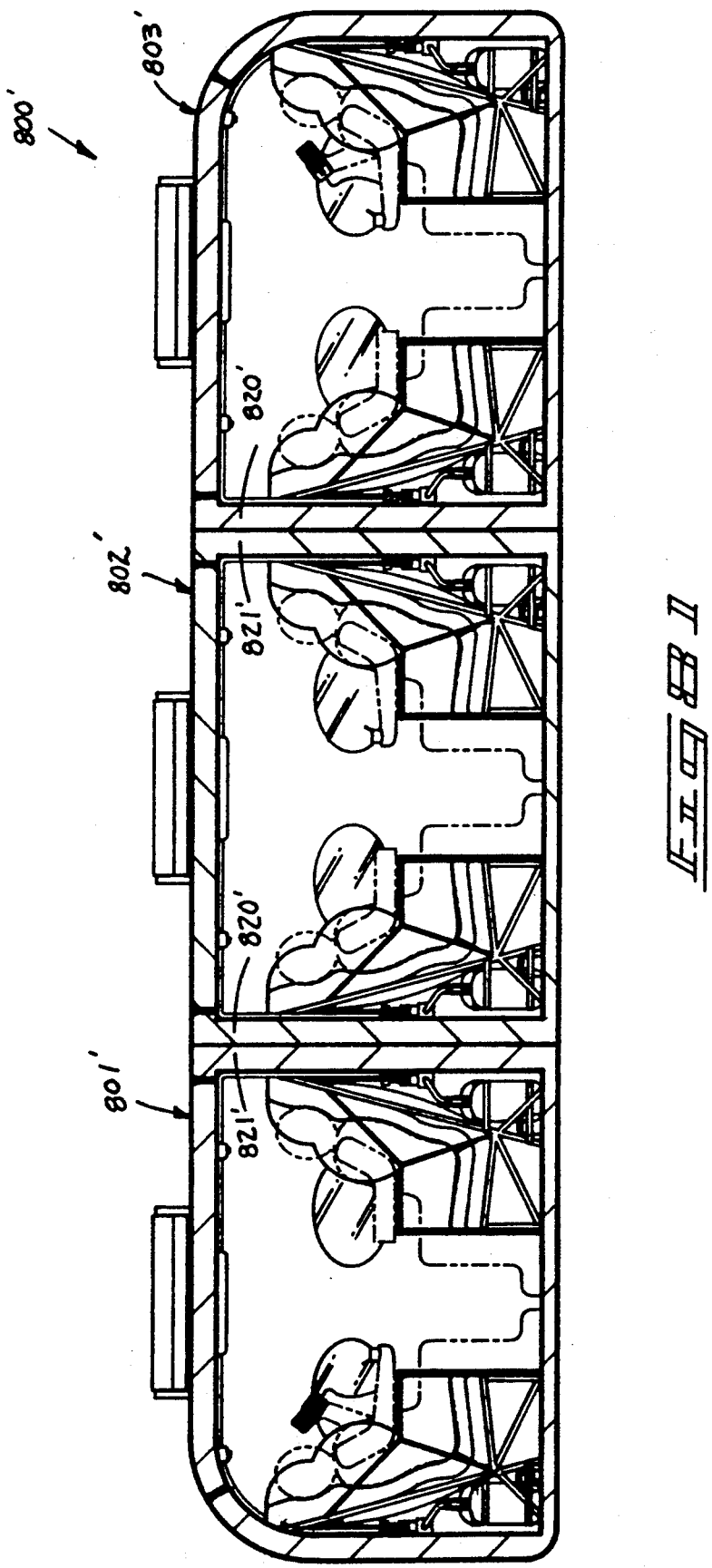

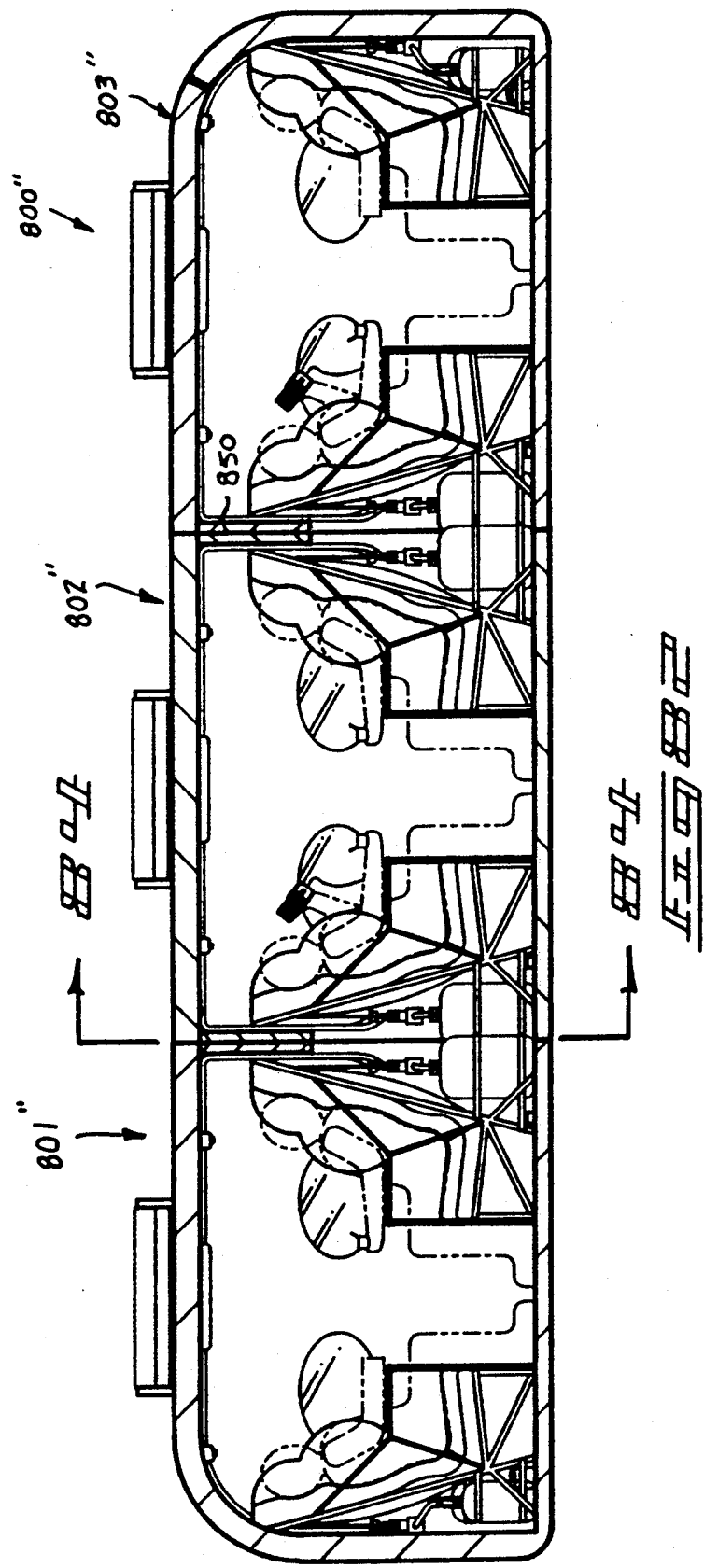

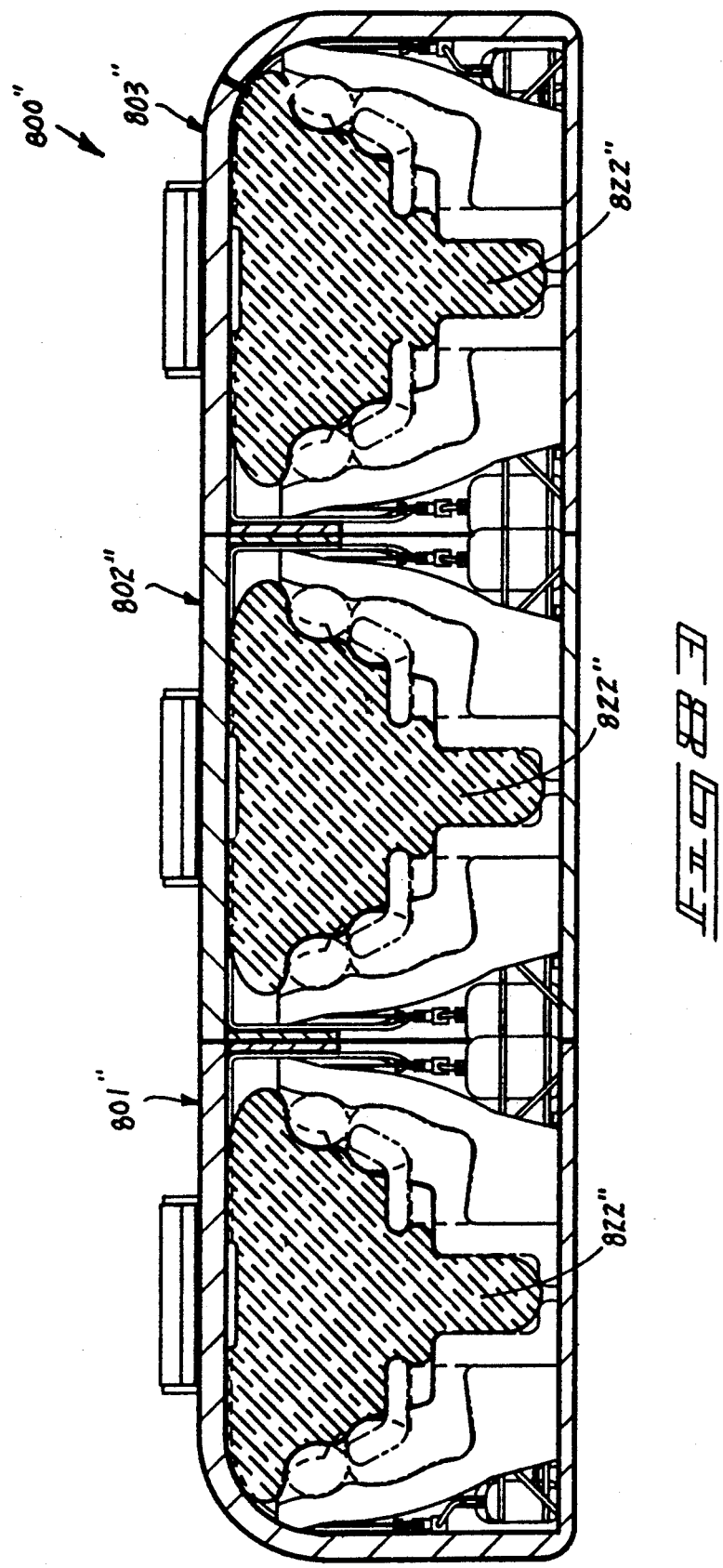

SAFETY ENCLOSURES AND SYSTEMS FOR HIGH SPEED VEHICLES

TECHNICAL FIELD

The technical field of this invention is passenger safety enclosures and systems for use in moving vehicles, such as high speed vehicles, particularly aircraft.

BACKGROUND OF THE INVENTION

Although the commercial aircraft and airline industries have developed an enviable safety record there remains a continuing need to improve the safety of aircraft. Each year hundreds of passengers and crew members perish or are injured due to aircraft equipment failures, operational errors, terrorism or other causes. Fire and smoke inhalation often kill people involved in aircraft accidents which occur during takeoff and landing. Inertial forces experienced during crashes of aircraft are also very significant in causing injuries and death.

In addition to the inherent risks of travel at aircraft speeds, there are additional factors which appear to be increasing the risks of air travel. These factors include: (1) increased air traffic and air traffic congestion, especially near terminals; (2) aging aircraft which show increasing evidence of structural, mechanical and electrical failures; (3) decreasing levels of pilot experience; (4) evidence of some drug and alcohol abuse among pilots, maintenance crews and air traffic controllers; (5) evidence of violations of Federal Aviation Administration (FAA) rules by pilots and other crew members; (6) increased traffic and stress on air traffic controllers and the air traffic control systems of many major airports; and, (7) outdated FAA safety regulations and standards for passenger accommodations.

These and other factors have caused a significant increase in public concern about the safety of air travel. Additionally, there is greater publicity concerning all aircraft disasters, even incidents where no damage has occurred but safety has been compromised. The above factors, coupled with the problems of terrorism and hijacking, have placed grave concerns in the minds of many people as to the safety of air travel.

Aside from the safety problems associated with air travel, there is also a significant and justifiable concern about the safety of travel in other forms of public and private transportation, such as trains. An alarming number of train accidents have occurred in recent years, many due to operational errors and deteriorating track and equipment conditions. These problems and concerns about safety have been underscored by increasing interest in high speed trains due to the recent advances in superconductivity and the potential for magnetically elevated high speed trains. Increasing train speeds necessarily subject passengers to increasing risks of high inertial forces during emergency stops, crashes and derailments.

Thus it can be appreciated that substantial room for improvement exists in passenger accommodations in aircraft, trains and other high speed passenger vehicles. The present invention addresses many safety concerns associated with such travel and provides means for protecting occupants and increasing confidence in the safety of high speed travel.

BRIEF DESCRIPTION OF THE DRAWINGS

Preferred embodiments of the invention are illustrated in the accompanying drawings which are briefly described as follows.

FIG. 1 is a front elevational view of a first embodiment protective safety enclosure according to this invention. The embodiment of FIG. 1 is designed to accommodate three (3) passengers in a single row seating configuration and is further illustrated in FIGS. 2-31 and 33-61.

FIG. 2 is a top view of the safety enclosure of FIG. 1.

FIG. 3 is an aisle side or inside elevational view of the safety enclosure of FIG. 1.

FIG. 4 is a window side or outside elevational view of the safety enclosure of FIG. 1.

FIG. 5 is a transverse sectional view taken along line 5—5 of FIG. 3 showing portions of the cabin interior, including the seating. The door is shown in phantom in both the open and closed positions.

FIG. 7 is a longitudinal sectional view taken substantially along line 7—7 of FIG. 1.

FIG. 8 is an enlarged front elevational view similar to FIG. 1 showing additional detail with portions broken away and shown in sectional presentation.

FIG. 9 is a detail elevational view of a preferred intermediate material used in the walls of the safety enclosure of FIGS. 1 and 8. It is an enlarged view of a portion shown exposed by breaking away part of the outer safety enclosure wall as shown within detail circle 9 of FIG. 8.

FIG. 11A is an enlarged exploded detail sectional view showing adjoining portions of the wall and floor structure of the safety enclosure of FIG. 1 separated and aligned for insertion and connection.

FIG. 11B is an enlarged detail sectional view, such as taken substantially along line 13—13 in FIG. 12, showing the wall and floor structure components of FIG. 11A fully assembled, and as shown in detail circle 11B of FIG. 8.

FIG. 12 is a plan view of the safety enclosure of FIG. 1 with the interior floor removed to show the structural framework of the base or floor structure.

FIG. 13 is a sectional view taken along line 13—13 of FIG. 12 with the interior floor included.

FIG. 24 is a view similar to FIGS. 22 and 23 with the door repositioned still further downwardly in a lower partially closed position.

FIG. 25 is a view similar to FIGS. 22-24 with the door repositioned downwardly into the fully extended and closed position.

FIG. 26 is an aisle side elevational view showing the safety enclosure shell of FIG. 1 with emphasis on the door and door frame assembly which are shown in the position of FIG. 25.

FIG. 27 is an aisle side view of the door frame assembly of FIG. 26 shown in isolation from the enclosure shell for illustrative purposes.

FIG. 28 is a detail view of the door frame side rail connection joint shown in detail circle 28 of FIG. 27.

FIG. 29 is a sectional view taken along line 29—29 in FIG. 28.

FIG. 30 is a top or plan view of the door frame threshold or sill shown in FIG. 27.

FIG. 31 is a sectional view taken along line 31—31 of FIG. 27.

FIG. 32 is a view similar to FIG. 30 showing an alternative door frame threshold which can be used with other embodiments of the invention shown and described below.

FIG. 33 is an elevational view showing the inside surface of the rear door frame side rails included in FIG. 27.

FIG. 34 is a sectional view taken along line 34—34 of FIG. 33.

FIG. 35 is a sectional view taken along line 35—35 of FIG. 33.

FIG. 36 is a sectional view taken along line 36—36 of FIG. 33.

FIG. 37 is a sectional view taken along line 37—37 of FIG. 33.

FIG. 38 is an exploded pictorial view showing the upper portions of the door frame assembly and a preferred means for their attachment with the enclosure shell.

FIG. 38A is an enlarged detail view taken at detail circle 38A in FIG. 38 showing a tab on the tab bar.

FIG. 46 is an enlarged aisle side elevational view of the door shown in FIG. 26. Portions have been broken away to show interior components.

FIG. 47 is a front edge view of the door shown in FIG. 46.

FIG. 48 is an enlarged detail view taken at detail circle 48 of FIG. 47.

FIG. 49 is an enlarged detail view taken at detail circle 49 of FIG. 47.

FIG. 50 is a diagrammatic sectional view taken substantially along line 50—50 of FIG. 46.

FIG. 51 is an elevational view from the inside of the safety enclosure cabin of the door shown in FIGS. 26 and 46.

FIG. 52 is an exploded elevational view of the two intermediate sections of the door shown in FIG. 46. Such door sections include an escape hatch.

FIG. 53 is an exploded front edge view of the escape hatch door sections shown in FIG. 52.

FIG. 54 is a top view of the lower door section shown in FIG. 52.

FIG. 55 shows the internal mechanisms used in the escape hatch door sections shown in the corresponding FIG. 52. Portions are shown in phantom to demonstrate the operative movement of the mechanisms.

FIG. 56 shows the escape hatch internal mechanisms of FIG. 55 in front edge view, and corresponds to FIG. 53.

FIG. 57 shows the escape hatch internal mechanisms in top view relative to FIG. 55, and corresponds to FIG. 54.

FIG. 59 is a diagrammatic view showing the interaction of the door assembly (shown in phantom) with the door frame assembly. The door assembly is shown in both the fully retracted overhead position and the fully extended closed position.

FIG. 60 is an enlarged detail view showing a rack and pinion used to drive the door assembly relative to the door frame and is taken from detail circle 60 of FIG. 59.

FIG. 61 is an enlarged sectional view showing the door assembly rack and pinion gear drive, and is taken along line 61—61 of FIG. 59.

FIG. 62 is a front elevational view of a second embodiment safety enclosure according to this invention which provides two rows of seating for three people each to thus accommodate a total of six passengers.

FIG. 63 is a top view of the embodiment shown in FIG. 62.

FIG. 64 is an aisle side elevational view of the embodiment of FIG. 62.

FIG. 65 is an outside or window side elevational view of the safety enclosure of FIG. 62.

FIG. 72 is a front elevational view of a third alternative form of safety enclosure in accordance with this invention which seats three passengers in each of several units of a modular enclosure array.

FIG. 73 is a aisle side elevational view showing three units of the variable length safety enclosure shown in FIG. 72.

FIG. 74 is a top view of the safety enclosure shown in FIGS. 72 and 73.

FIG. 75 is a longitudinal sectional view taken substantially along line 75—75 of FIG. 72.

FIG. 77 is a front elevational view of a still further alternative safety enclosure of this invention which incorporates seating for six persons in each of several modular units of a safety enclosure array.

FIG. 78 is an aisle side elevational view of the safety enclosure shown in FIG. 77.

FIG. 79 is a top view of the safety enclosure of FIGS. 77 and 78.

FIG. 80 is a longitudinal sectional view taken substantially along line 80—80 of FIG. 77.

FIG. 81 is a view similar to FIG. 80 showing an alternative construction which can be used for the modular safety enclosure of FIG. 77.

FIG. 82 is a view similar to FIG. 80 showing a further alternative construction which can be used for the modular safety enclosure of FIG. 77.

FIG. 83 is a diagrammatic view similar to FIG. 82 showing the deployment of gas expandable crash bags.

DETAILED DESCRIPTION OF THE PREFERRED EMBODIMENTS

Figure 6:
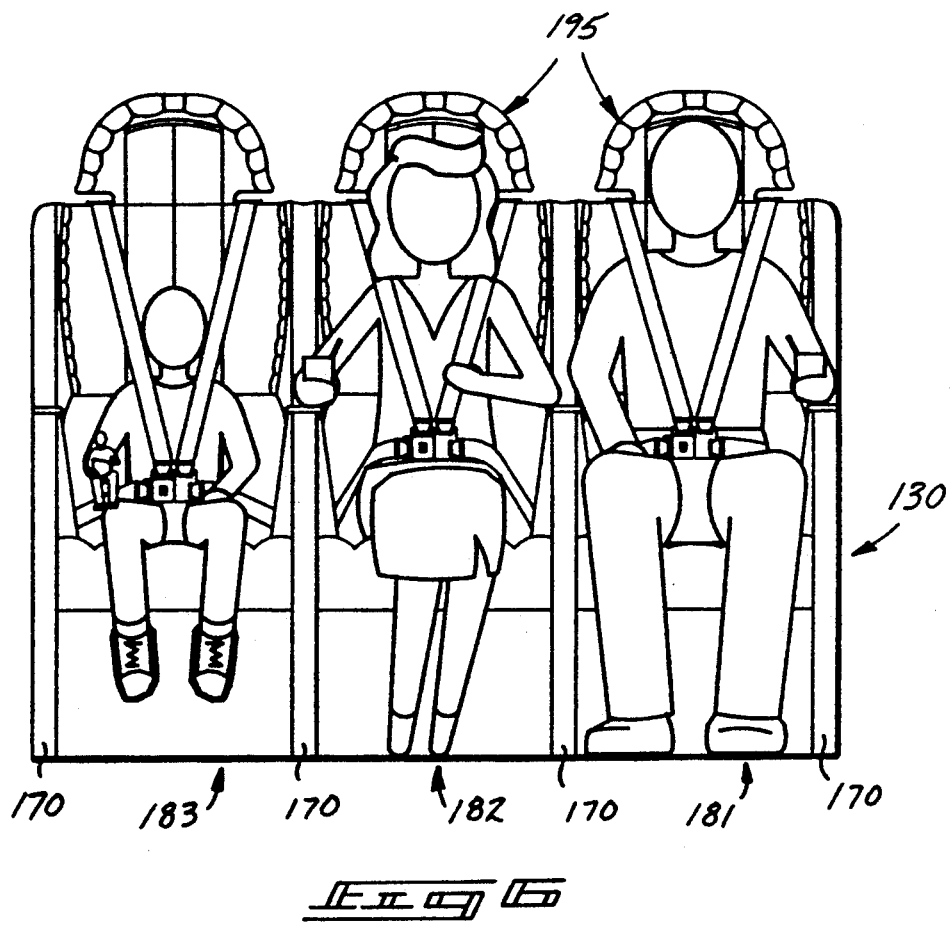
FIG. 6 is a partial view similar in orientation to FIG. 5 showing isolated seating portions of the cabin with three people seated and harnessed therein.
Figure 10:
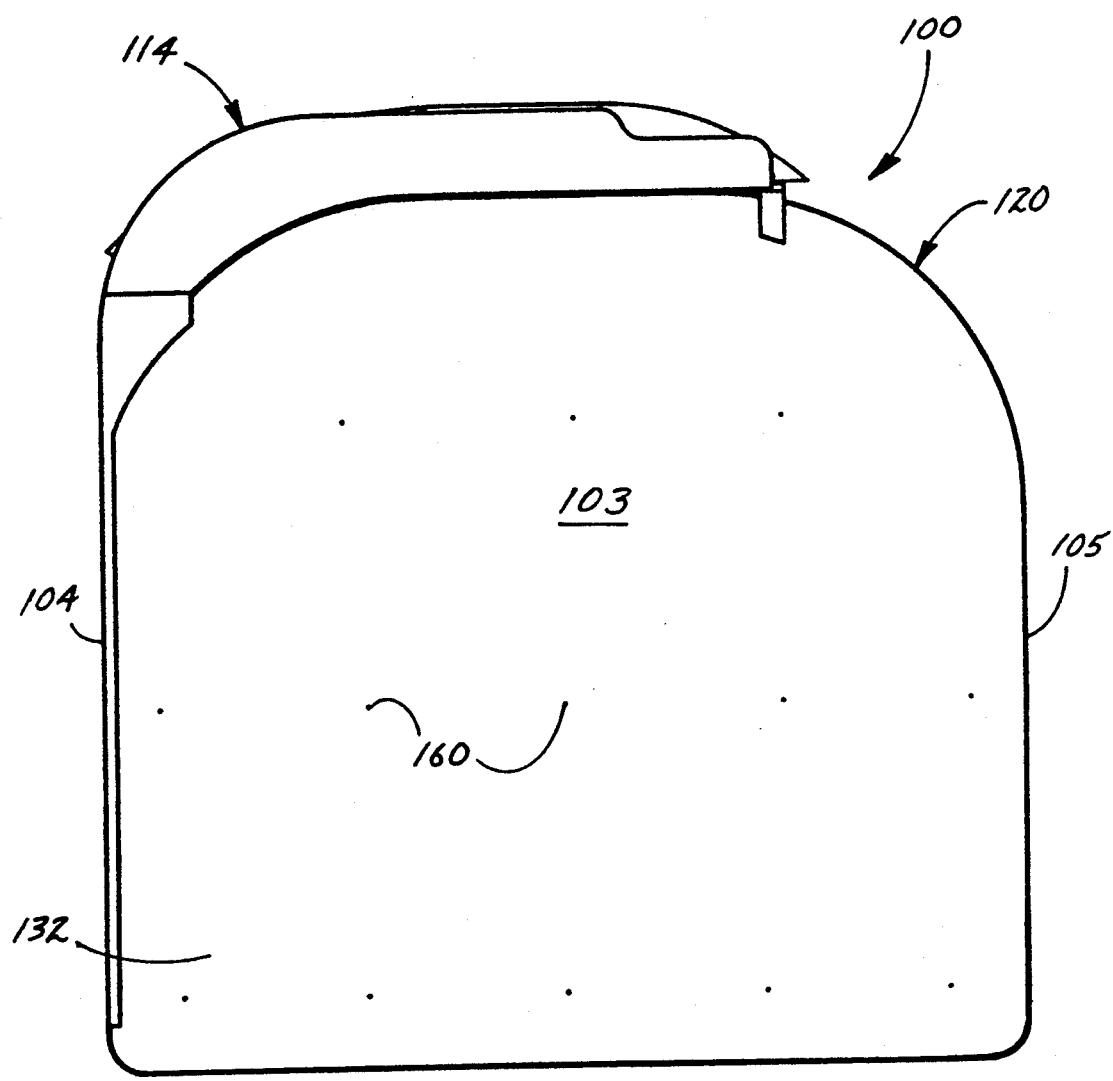
FIG. 10 is an enlarged rear elevational view of the safety enclosure shown in FIG. 1.

The following disclosure of the invention is submitted in compliance with the constitutional purpose of the Patent Laws "to promote the progress of science and useful arts" (Article 1, Section 8).

FIG. 1 shows a preferred form of safety enclosure 100 according to this invention. Safety enclosure 100 is specifically adapted for use and mounting within aircraft, such as those commonly used in commercial air travel. FIGS. 2-4 further illustrate the general configuration of safety enclosure 100. Enclosure 100 includes an enclosure shell 120 having a front wall 102 and rear wall 103 which are oriented towards the front and rear of the aircraft, respectively. Enclosure 100 also includes an aisle side wall 104 which faces the inside or aisle of the aircraft fuselage. An outer or window side wall 105 is provided opposite to the aisle side 104. Top 106 and bottom 107 are also provided as part of enclosure shell 120.

The enclosure shell window side wall 105 is advantageously provided with a port hole 110 and associated port hole window 111. The aisle side wall 104 is provided with a door opening 112. The door opening is advantageously fitted with a door means 114. Door means 114 includes a door frame assembly 116 and a door assembly 118. Door assembly 118 is shown in a retracted overhead position in FIGS. 1-4. The door means will be explained in greater detail hereinafter.

The front, back, inside, outside, top and bottom walls of enclosure 100 form the substantially continuous and integrated enclosure shell 120. Enclosure shell 120 as shown includes relatively smoothly curved corners along the top periphery and along each of the vertical intersections between the elevational walls. This relatively curved form of enclosure shell 120 serves to help accommodate the safety enclosure within the typically curved fuselage sections of the aircraft or other vehicle in which it is mounted. They further serve to increase the strength of the enclosure shell and to provide better crash resistance if the safety enclosure is hurled from the aircraft or thrown within the aircraft due to inertial forces. The enclosure shell is preferably formed in a manner which provides sufficient structural integrity to provide a high degree of crash resistance and also to provide a substantially airtight interior space or cabin 122. Port hole window 111 is preferably installed to provide an airtight seal within port hole 110. The door frame and door assemblies 116 and 118 are constructed to provide a substantially airtight closure to door opening 112. The airtight construction allows fire, smoke and noxious fumes to be excluded, and provides protection against conditions wherein loss of fuselage cabin pressure may occur. The airtight construction further provides increased safety for flights over water, since the safety enclosure can float for sustained periods thus allowing the occupants to escape at an appropriate time and recover from the shock of the emergency water landing.

Safety enclosure 100 advantageously includes seating 130 within the interior cabin 122. FIG. 5 shows the general arrangement of seating 130 in greater detail. FIGS. 5 and 6 together show that seating 130 of safety enclosure 100 is particularly adapted to accommodate three people in comfort. Although the embodiments shown include seating rows with seating for three people, the concepts according to this invention are applicable to two, three or more occupants. FIG. 7 also shows the general relationship of the seating and potential occupants within safety enclosure 100. Greater explanation of the specifics of seating 130 and other features of the cabin will be described below after more careful description is made of the construction of enclosure shell 120.

FIG. 8 shows in greater detail particulars of a preferred manner of constructing enclosure shell 120. Enclosure shell 120 is preferably constructed with all peripheral walls made in a double wall construction form to provide increased crash resistance and protection against high temperatures such as experienced in aircraft fires. FIGS. 8, 11A and 11B show the double wall construction in greater detail. The vertical walls and top are provided with an outer wall member or exterior skin 132. Outer wall layer or skin 132 can advantageously be constructed of stainless steel or other relatively durable, strong material capable of resisting at least some exposure to fire. The shell walls also advantageously include an inner wall layer or interior skin 133. The inner and outer walls of the enclosure shell are preferably spaced apart and filled with an intermediate material which is strength enhancing, crash resisting, and thermally and acoustically insulating. As shown, the intermediate shell wall layer 134 advantageously consists of a honeycomb 136 formed of a material such as aluminum which appears, when viewed on end, as shown in FIG. 9 or other suitable shape. The honeycomb cells can be advantageously provided with a fire resistant insulating filler material(s), such as fiberglass fibers which may be partially bonded into a semi-rigid cellular filler 137 occupying the space within each of the honeycomb cells. The axes of the honeycomb cells can be oriented to run approximately transverse, preferably 90° to the surface of the exposed outer wall to provide superior crash resistance.

FIGS. 11A, 11B, 12 and 13 illustrate that a similar double wall construction is also advantageously used for the floor or base portion 140 of enclosure shell 120. FIGS. 12 and 13 show a plurality of frontwardly to rearwardly extending C channel longitudinal base frame members 141 which serve as primary structural elements of base 140. A series of transverse interconnecting C channels 142 extend between the longitudinal base members 141. Along the periphery, base members 141 and 142 are contoured to provide the rounded edge shape. An upper floor layer or member 144 extends across and is supported by the floor members 141 and 142. The base structure 140 is also provided with an exterior base shell skin 145 which preferably extends along and is connected to the lower portions of base members 141 and 142. FIG. 11A shows the base exterior skin 145 advantageously extending upwardly along the lower portions of the enclosure shell side walls to enhance the connection between the side walls and base member 140.

FIGS. 11A and 11B show in detail the connection between side wall 105 and base 140. Similar means for connecting the side walls to the base are employed for the remaining portions of the enclosure shell. The wall-base connection is advantageously formed by including on the base a wall receptacle 150 which can be made in the form of a C-shaped channel turned flat and opening upwardly. Receptacle 150 is sized to receive a reinforced wall mount extension 151. Receptacle 150 and extension 151 can be connected to their respective base and wall members using any suitable manner, but preferably through integral forming such as by welding or the like. As shown, receptacle 150 is welded to the floor member 144. Supporting base members 141 and 142 offer additional reinforcement by welding to the outer skin 145. Wall mount extension 151 is provided with reinforcing and spacer pieces 156 and 157 along the respective inner and outer wall skins to provide for the complementary fit best illustrated in FIG. 11B. Fasteners 158 are extended through mating parts of the joint to secure the wall and base portions of the enclosure shell together in rigid relationship.

The interior or cabin 122 of safety enclosure 100 is advantageously provided with a number of additional features and systems to enhance both the safety and comfort of passengers riding therein. A primary passenger convenience and safety feature is the seating 130. Seating 130 includes a plurality of seating frameworks 170 which are best shown in FIG. 7. Seating frameworks 170 advantageously include a primary member 171 which extends from an upper connection with the enclosure shell inner wall downwardly at an angle to connect with the base 140. A rear oblique strut 172 extends from the primary member 171 rearwardly and downwardly to the base 140. The rear oblique strut 172 intersects the primary frame member 171 at an intersect point 173 which also is adjacent a number of other related frame strut members. The additional frame members include a forward oblique strut 174 which extends from the intersect point to the base adjacent to the front of the seat structure. A seat support platform is formed by seat support struts 175. A vertical seat front connection strut 176 extends between the forward end of the seat support strut 175 and the base, and is advantageously connected with the lower end of forward oblique strut 174.

Seating frameworks 170 also advantageously include lateral or side frameworks 177 which serve to help restrain the passengers against transverse or lateral motion within the seats. The passenger harnesses described below act as the primary lateral passenger restraint. Lateral frameworks 177 include a forward vertical post 178 which connects with an arm rest member 179. The rearward end of arm rest member 179 is connected with upper and lower side struts 180a and 180b. The upper end of upper strut 180a connects with primary frame member 171 and the lower end of lower side strut member 180b connects at the intersect point 173. Seating frameworks 170 are included along each side of the three individual passenger seats 181, 182 and 183 as can be seen from FIG. 5.

Seats 181–183 also include three layers of passenger support materials which are designed to provide both comfort and optimal shock and inertial force protection. FIG. 7 shows a foundation layer 191 which is preferably constructed of a material which deforms plastically only under conditions of extreme inertial force loading. An intermediate or secondary layer 192 provides very firm yet resilient support which deforms under the weight of the passenger's body and is capable of absorbing very substantial amounts of shock and inertial forces during moderate to high acceleration and deceleration conditions. Secondary layer 192 also functions as an emergency flotation device and is removable for that purpose. An inner or tertiary seat layer 193 provides relatively soft and comfortable padding to optimize passenger comfort. Suitable fabric or synthetic film coverings may be employed as is well-known in the art.

FIGS. 5 and 6 further show that seating 130 preferably includes individual head rests or head protection assemblies 195. Head protection assemblies 195 are formed in a concave shape which extends around the passenger's head to provide additional protection and support during crash conditions. The head protection assemblies are advantageously padded for additional shock absorbing capabilities.

Seating 130 also preferably includes lateral body restraint means such as the side panels 195 best illustrated in FIG. 7. Such passenger torso and upper body side support panels 195 provide restraint against lateral movement and acceleration caused by a variety of unexpected maneuvers which may occur during crashes or aircraft malfunction.

The seating described above can alternatively be constructed in accordance with the concepts, in part or in whole, described below with respect to FIGS. 87-91, which are even more preferred for use in safety enclosures constructed according to this invention.

The seating described above provides restraint against rearward motion of the passenger relative to the safety enclosure. They further provide lateral restraint due to the positioning of the seating frameworks 170 and lateral passenger support side panels 195. The safety enclosure 100 is also advantageously provided with means for providing restraint against motion of the passenger out of the seat, such as forward and/or upward and lateral motion relative to the safety enclosure 100. This is advantageously accomplished using a dual system of individual safety harnesses and a controllably deployed gas expandable crash bag.

FIGS. 5 and 6 show a safety harness construction preferred for use in safety enclosures made in accordance with this invention. Safety harness 200 preferably include a left hand harness part 201 and a right hand harness part 202. Left hand harness part 201 includes a shoulder strap 203 and a lower side strap 204. Right hand harness part 202 similarly includes a shoulder strap 203 and lower side strap 204. Left hand harness part 201 further includes a connection fitting 205 which acts as a female part which receives a male right hand connection fitting 206 to secure the two connection fittings together to provide maximum passenger restraint as shown in FIG. 6. This construction of passenger harness restrains over both shoulders and across the torso in an X-shaped arrangement. This arrangement prevents lateral, forward and upward motion of passengers restrained therein.

The safety harness 200 is designed to work in coordination with the deployed crash bag (FIG. 16), hereafter described, to cushion and greatly restrict movement of the upper portions of the body of each seated occupant that is subjected to strong inertial forces. The lower ends of the lower side straps 204 are connected to the safety enclosure base 140 via energy absorbing terminal fixtures such as strong helical springs (not shown). The upper ends of the upper shoulder straps 203 are connected to the inner shell wall 133 at approximately shoulder height via an inertial latching mechanism (not shown) common to automobile safety belts, and energy absorbing terminal fixtures such as strong helical springs (not shown). The inertial latching mechanism permits limited movement of a buckled occupant during normal vehicle (aircraft) operation but sharply resists sudden occupant displacements.

Figure 16:
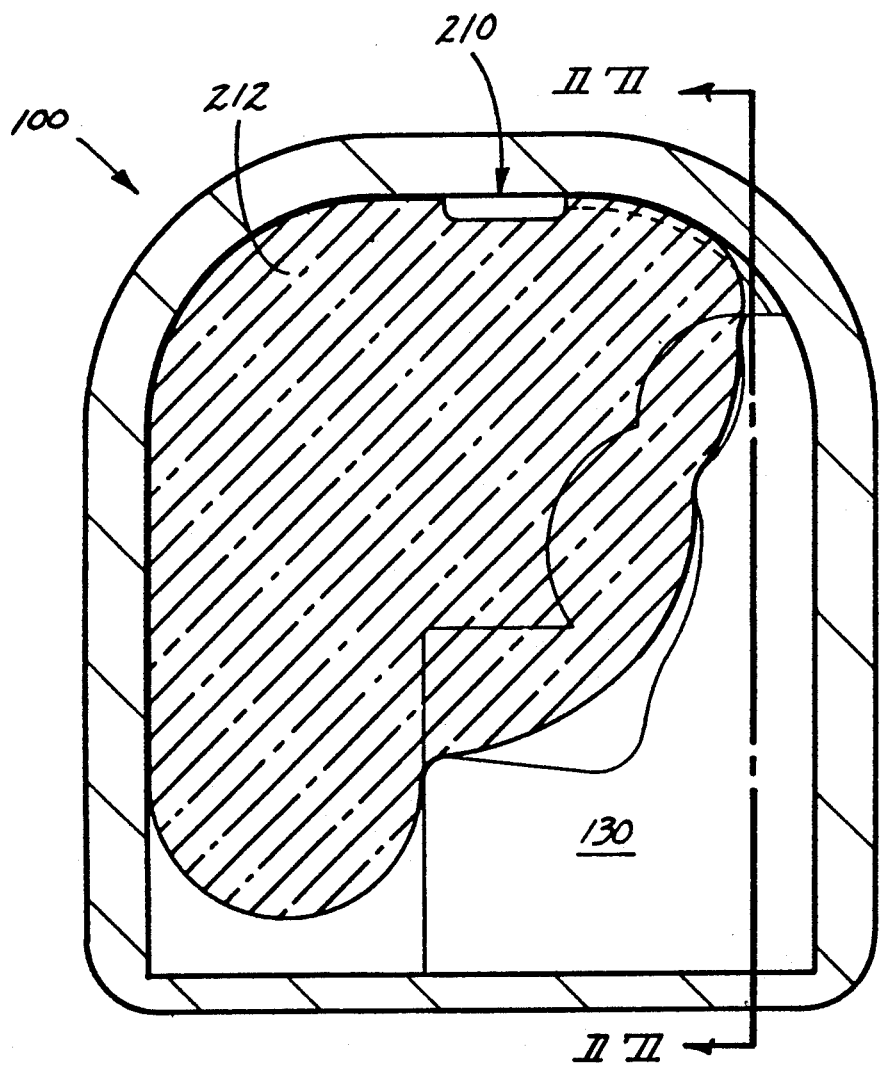
FIG. 16 is a diagrammatic aisle side sectional view showing deployment of the gas actuated crash bag within the safety enclosure cabin.
Figure 17:
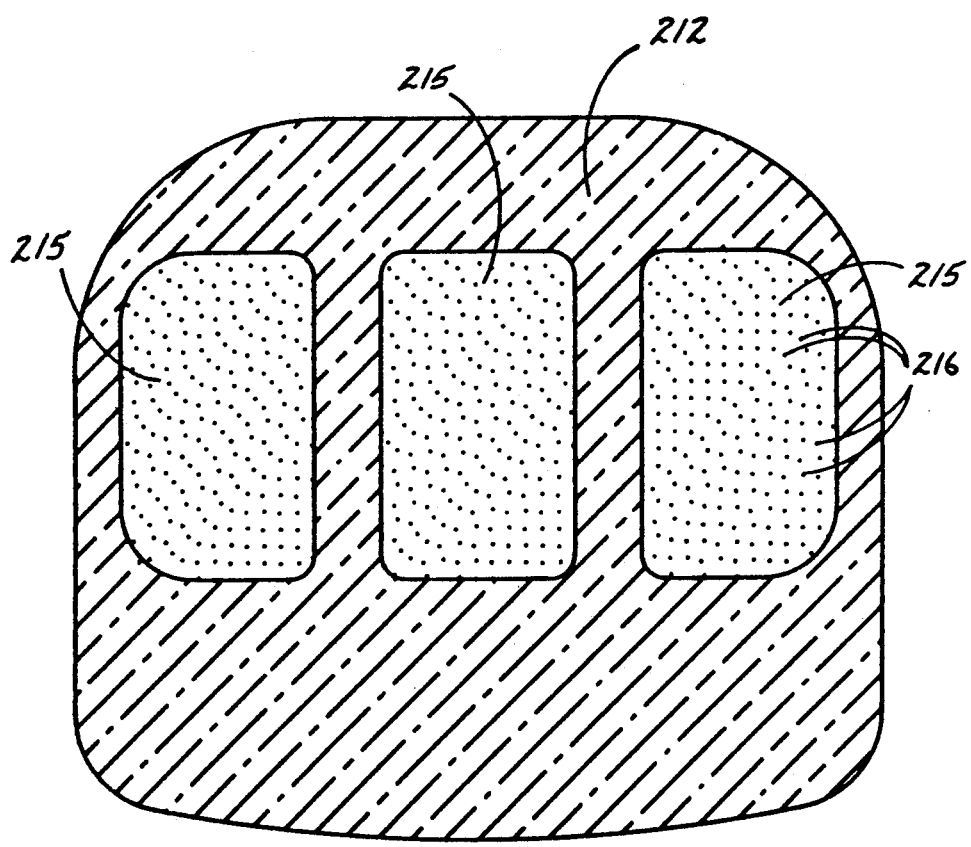
FIG. 17 is a diagrammatic view taken substantially along line 17—17 of FIG. 16 showing the crash bag deployed and in isolation from other parts of the safety enclosure.

Further passenger restraint is also provided by the crash bag. FIG. 7 shows along the inside ceiling of the cabin a crash or air bag assembly unit 210. The stored crash bag assembly is automatically deployed under emergency conditions to provide protective restraint against forward and upward motion of the passengers seated in seats 181-183, as suggested in FIG. 16. Crash bag assembly 210 includes a housing 211 which stores and positions a flexible crash bag 212. Crash bag 212 is advantageously constructed of a thin, strong and lightweight fabric, synthetic resin (e.g. nylon), polymer or reinforced polymer film shaped in a desired bag configuration, such as shown in FIG. 16, or otherwise so as to properly fill large volumes of the cabin. FIG. 17 shows that crash bag 212 is preferably provided with specially adapted passenger contact areas 215. Passenger contact areas 215 are made either of the same material as the remaining portions of the crash bag or a different synthetic resin, polymer or fabric material. The passenger contact areas of the crash bag are provided with a plurality of relatively small gas supply openings through the wall of the crash bag 212. These breathable gas supply holes 216 enable a breathable gas to be dispensed through the crash bag adjacent to the passenger's frontal areas in order to assure that the crash bag does not cause any temporary suffocation of the passengers during an emergency.

Safety enclosure 100 includes a contained supply of breathable gas, such as compressed air, oxygen or other formulations. The supply of air or other breathable gas is advantageously stored in a plurality of compressed air tanks 220 (see FIG. 18 or 7). Air tanks 220 are mounted securely within the interior of cabin 122 using the interior floor structure 144 and retaining straps 221 which are secured to the seating frameworks 170 in a secure fashion.

Figure 18:
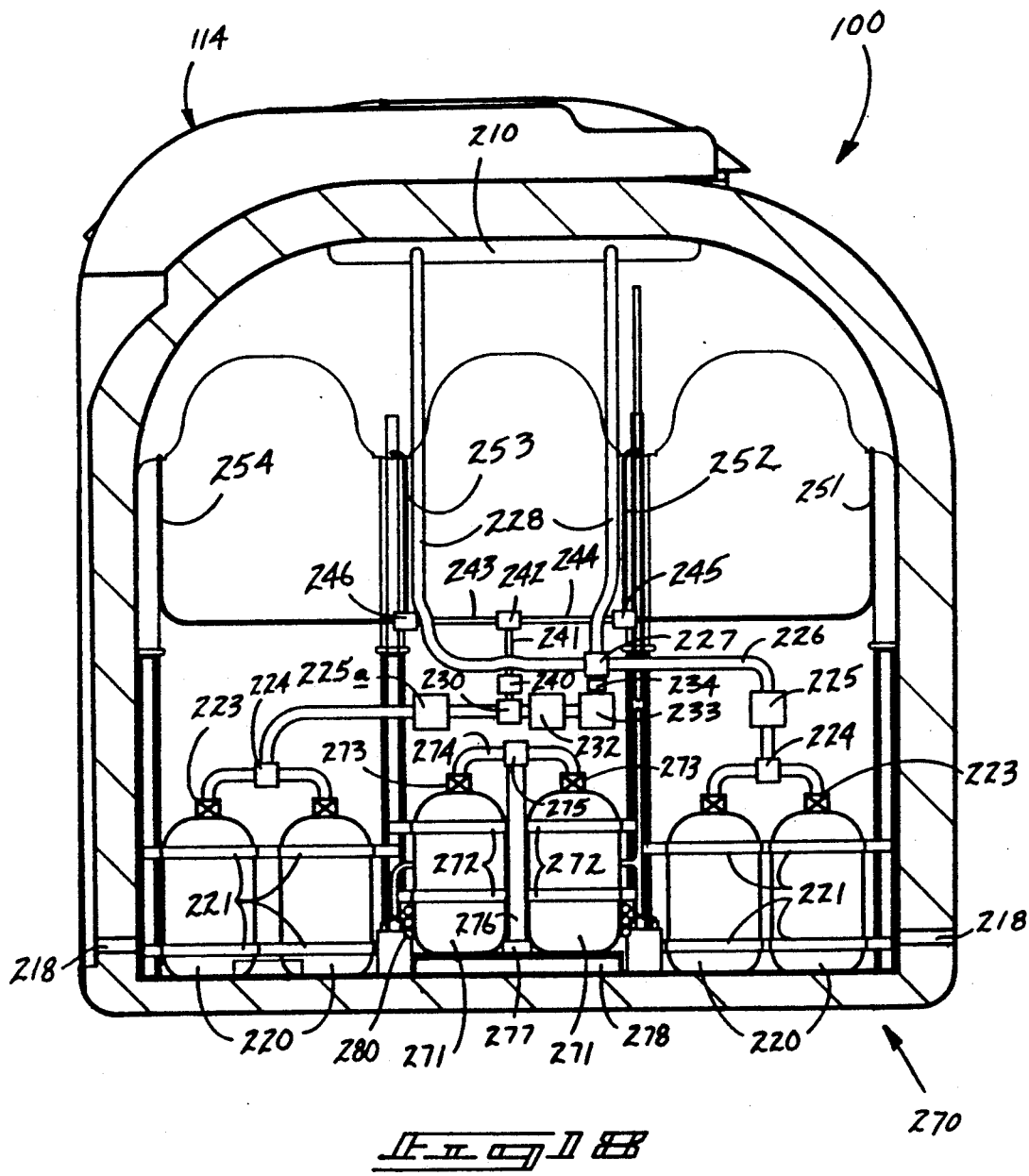
FIG. 18 is a sectional view taken substantially along line 18—18 of FIG. 7.
Figure 19:
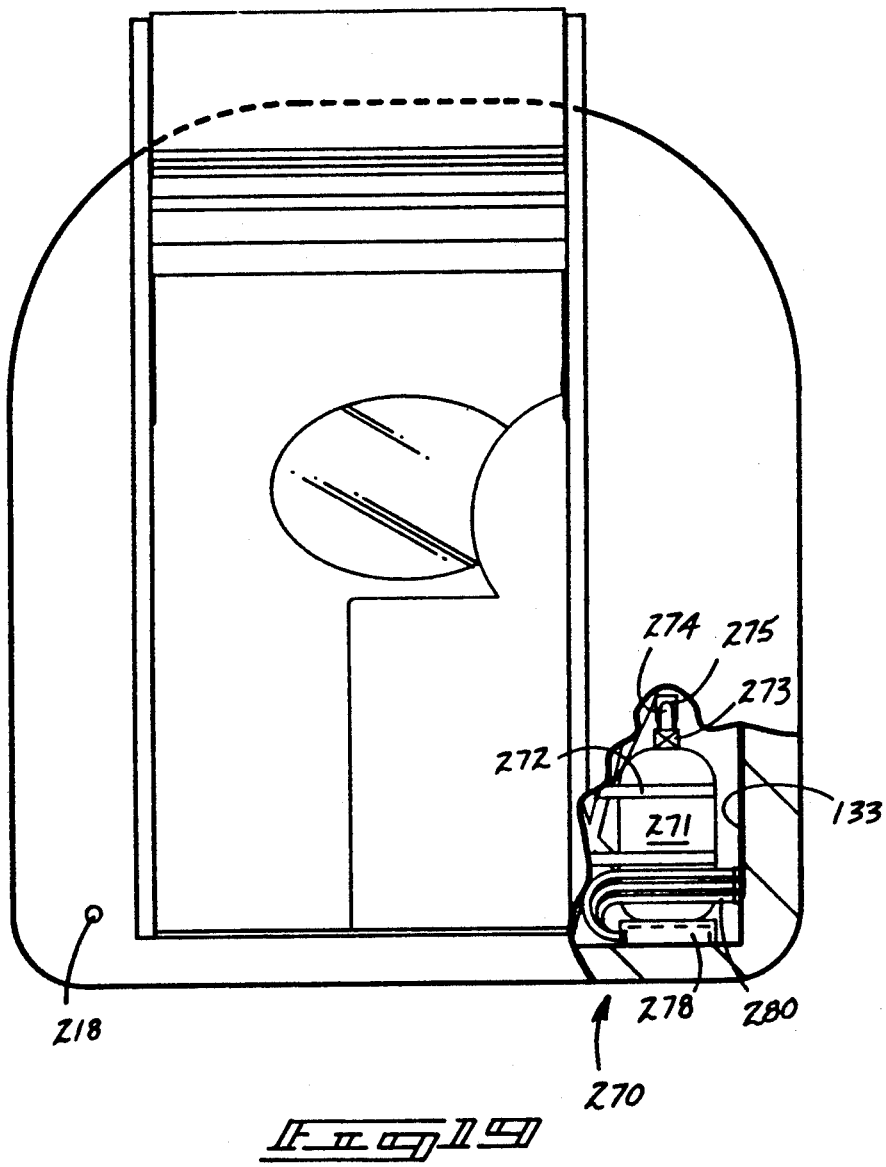
FIG. 19 is an enlarged aisle side elevational view similar to FIG. 3 with portions removed to show portions of the cooling system and related parts which are positioned under the seating.

FIG. 18 shows a preferred means for supplying compressed air from tanks 220 to the crash bag assembly 210. Air or other breathable compressed gas stored in tanks 220 are supplied through manually operated cut-off valves 223 to supply headers and junctions 224. The outlet line from junctions 224 are connected to air control valves 225 and 225a. The outlet from air control valve 225 flows through conduit 226 to a junction 227. Parallel crash bag air supply lines 228 are connected to junction 227 and to the crash bag assembly 210.

Crash bag assembly 210 is preferably automatically controlled using a suitable automatic control system which provides activating signals to valve 225 which is preferably selected to be a solenoid controlled flow valve which responds to such automatic control signals. The control system preferably responds to an appropriate controlled switch or sensory input which is indicative of the need to deploy the air bag 212. The system controller 900 preferably activates the crash bag to inflate in controlled synchronization with the closing of the safety enclosure door thereby allowing the cabin air to be expelled by the expanding crash bag rather than attempting to force the air through the check valve vents 218. The control system instructs valve 225 to open and to allow compressed air to be supplied therethrough via lines 228 to the crash bag assembly 210. The supply of compressed air to crash bag assembly 210 causes direct flow of the pressurized air into the interior of crash bag 212 thus inflating it through an opening in the assembly and causing it to extend downwardly and fill the cabin such as shown in FIG. 16.

Safety enclosure 100 is also adapted to provide breathable gas or air to the occupants in addition to or in lieu of that supplied through the deployed crash bag 212 as just described. FIG. 18 shows that one of the compressed air control flow valves marked 225a is connected to a junction 230 using a suitable conduit. Junction 230 is also connected to another air control valve 232. An air bag pressure differential regulator 233 is connected to valve 232 and to a check valve 234. Check valve 234 is connected to junction 227 and functions to prevent pressurized air flow through conduit 226 and junction 227 from damaging the pressure differential regulator 233.

Junction 230 is also connected to an air flow regulator 240 which outlets to a conduit 241 and connected junction 242. The outlet lines 243 and 244 from junction 242 are connected to additional junctions 245 and 246. Conduits 251-254 convey air up and over the intermediate portions of the seat head rests to provide supplies of air to the passengers at points adjacent to their neck and mouth.

Figure 14:
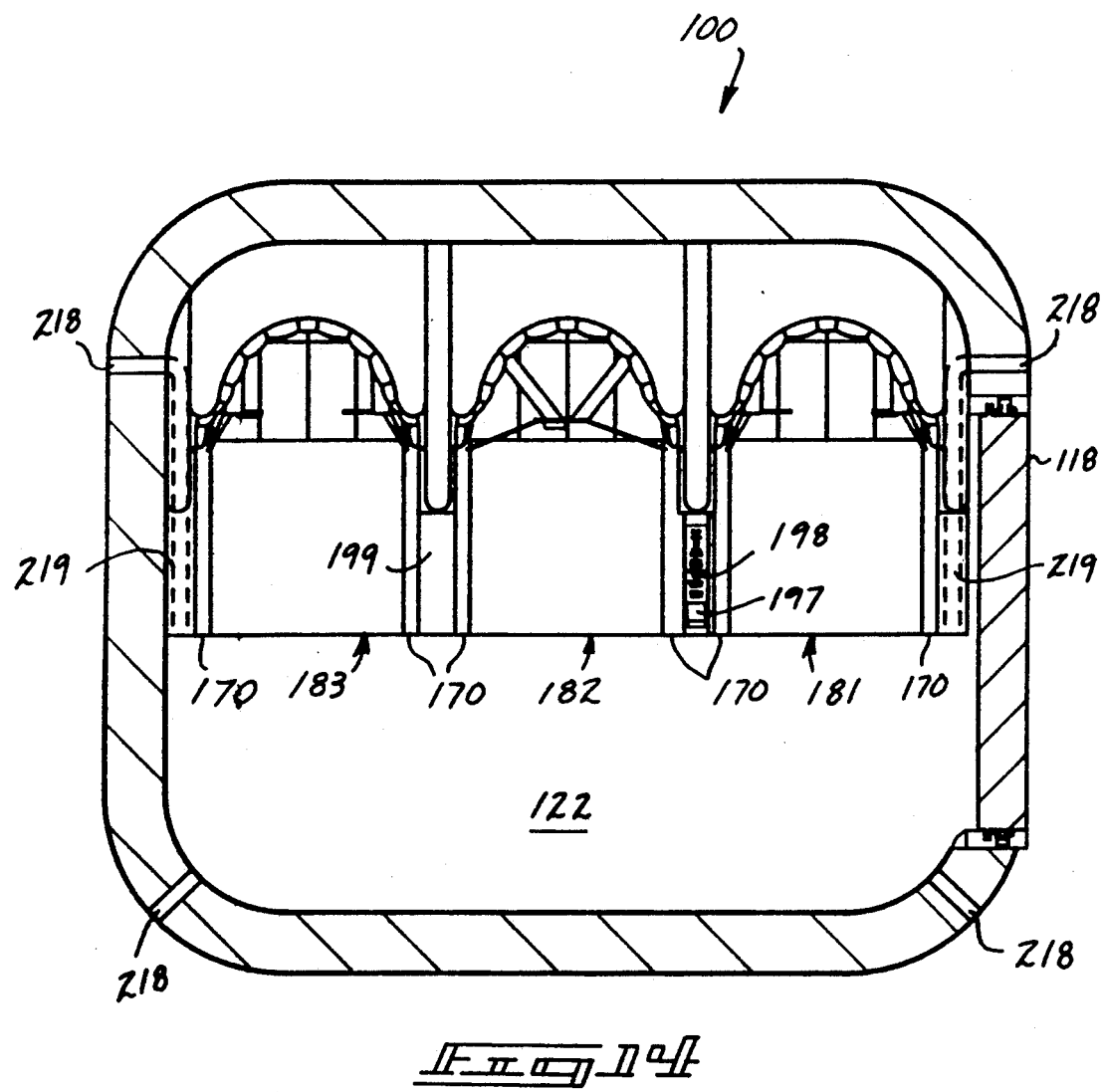
FIG. 14 is an enlarged top or plan sectional view taken substantially along line 14—14 of FIG. 3.

The release of compressed gas within the cabin causes the cabin pressure to increase which serves to exclude smoke and fumes from entering the cabin in case of fire. It also maintains a sufficiently oxygen rich atmosphere in the cabin to allow breathing where there is a loss of pressure in the fuselage of the aircraft and the ambient atmospheric pressure is not excessively low. The increased cabin pressure caused by the dispensing of breathable gas within the cabin is controlled by a plurality of vents 218. Cabin vents 218 are provided with check valves which automatically control the flow of exhausting cabin air and prevent the inflow of smoke and fumes in case there might be a pressure differential allowing inflow of gas from outside of the cabin. FIG. 14 shows that the rear cabin vents exhaust via conduits 219 which open to the cabin below the passenger arm rests.

The combined air supply and control system functions in the following manner. When the crash bag 212 is to be deployed the control valve 225 is opened and the contents of the right two tanks are fully expended to fill or nearly fill the crash bag. Additional air is supplied to maintain the crash bag by using the left two tanks and flow occurs through control valves 225a and 232. Thus, all three valves 225, 225a and 232 are opened simultaneously. The air bag pressure differential regulator 233 provides an air supply to the bag (via check valve 234 and junction 227) that is sufficient to maintain the crash bag at a small positive pressure above that of the cabin. When the crash bag is to be deflated, valve 232 is closed allowing air to flow only to the air supply vents through tubes 251-254. The opening of valves 225, 225a and 232 is actuated by the controller 900 following the appropriate sensory (emergency) input to the controller. Closure of valve 232 to deflate the crash bag occurs by manual controls or switches (not shown) via the system controller. Air through valve 225a and junction 230 is regulated by the pressure regulator 240 which reduces the pressure to limit use of the compressed air supplied to the tubes 251-254.

Figure 20:
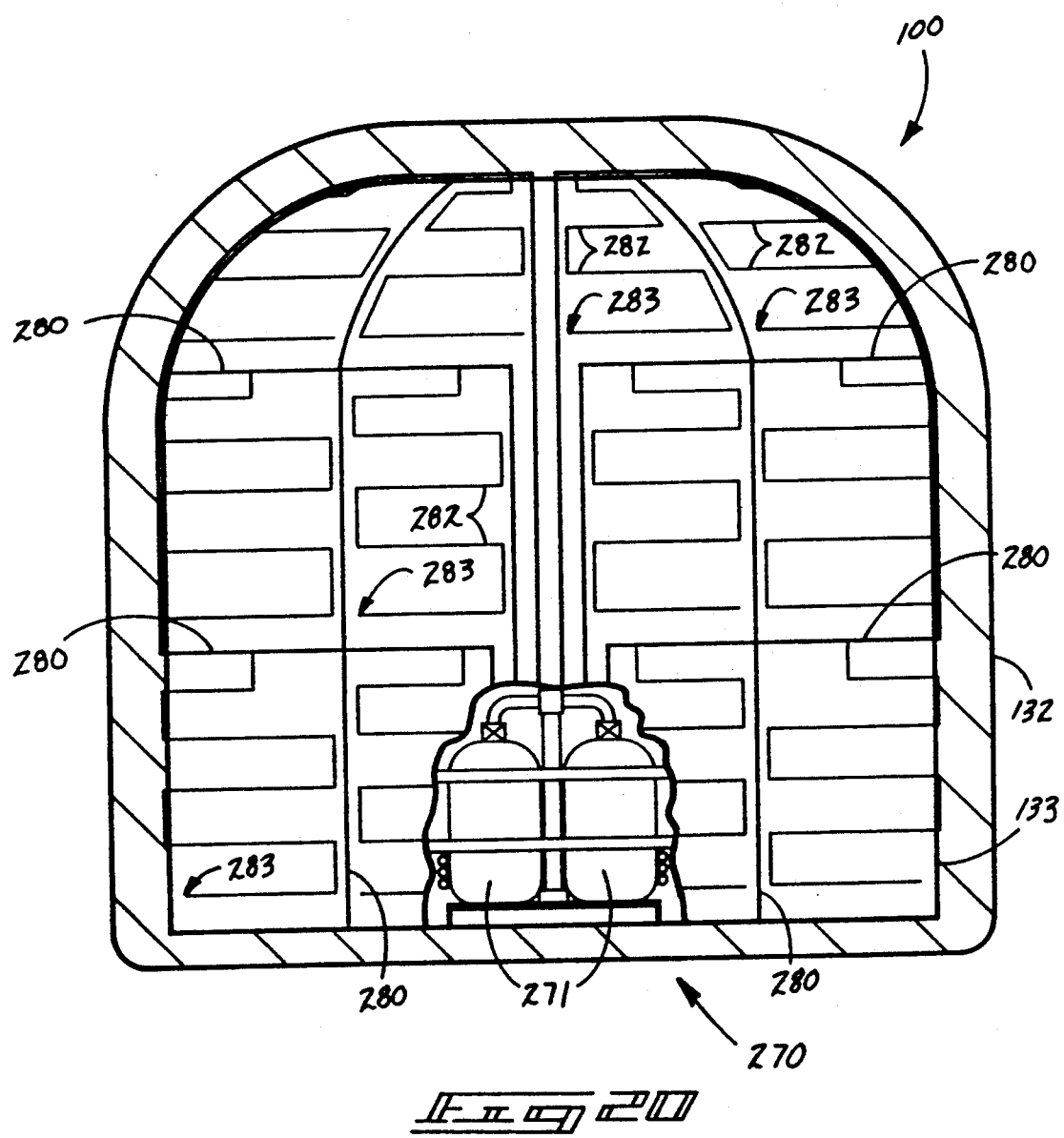
FIG. 20 is a diagrammatic rear elevational view of the safety enclosure of FIG. 1, with outer portions of the safety enclosure shell removed and presented in section to show an array of cooling tubes connected to the outer surface of the inner wall of the enclosure shell. Portions of the inner shell wall have been broken away to show the cooling system tanks and related parts, also shown in FIG. 19.

Safety enclosure 100 also includes a cooling system to protect the occupants against overheating during exposure to fire. Cooling system 270 is illustrated in FIGS. 18-21. Cooling system 270 includes two refrigerant tanks 271. Coolant tanks 271 are positioned behind and beneath the center passenger seat 182 as shown in FIGS. 15 and 18-20. Tanks 271 are secured in position using tank straps 272 which are affixed to the seating support framework 170. Tanks 271 are each supplied with manual cutoff valves 273 which communicate with conduits 274 and a junction or tee 275. Coolant flows through junction 275 downwardly via conduit 276 and into a supply plenum 278 as allowed by the solenoid controlled supply valve 277. Supply plenum or reservoir 278 helps to regulate the supply of refrigerant and acts as a distribution plenum to a plurality of main distribution lines marked 280 and best shown in FIG. 19. Main distribution lines 280 pass through the inner shell wall 133 and are connected thereto using suitable fittings or other mounts. The main coolant distribution lines then branch out in a variety of directions as best illustrated in FIG. 20. The main distribution lines are sized to provide adequate flow to a network of secondary coolant distribution lines 282 which extend from the main distribution lines 280 and terminate at open-ended exhausting ports or nozzles 283. The secondary coolant distribution lines and exhaust openings or nozzles 283 are properly sized to provide substantial pressure drop along the secondary distribution lines thus causing the refrigerant to expand and provide cooling in accordance with the Joule-Thompson effect. The Joule-Thompson effect is well-known in the art of refrigeration. The coolant lines, particularly the secondary coolant lines, are preferably in intimate contact with or connected to the inner shell wall in order to provide conductive heat transfer from the coolant tubes to the inner shell wall 133. Transfer of the cooling effect from the distribution lines to the inner shell causes the cabin interior to be cooled thus counteracting the inflow of heat which may otherwise occur due to exposure of the safety enclosure to open flames or radiation.

Since the secondary coolant distribution lines are preferably connected directly to the outer surface of the shell inner wall 133, the expanded refrigerant gas is released within the intermediate space between outer shell wall 132 and inner shell wall 133. The intermediate insulating and crash resistant material 134 is sufficiently porous or otherwise provided with openings, cracks or fissures at suitable points to allow the refrigerant to flow outwardly. The refrigerant is passed through the outer skin 132 of the enclosure shell via coolant exhaust openings 160 which are most clearly shown in FIG. 8. The coolant escape holes 160 are preferably spaced over the entire upper portion of the enclosure shell 120.

As shown, the coolant system is not provided along the base 140 due to its typical close mounting and contact with the supporting floor structure of the airplane or other vehicle. Providing coolant distribution lines in the base is also possible.

The flow of coolant from refrigerant tanks 271 through the distribution lines is controlled by the main coolant control valve 277 which is connected between conduit 276 and the supply plenum 278. Main coolant control valve 277 is preferably, automatically controlled using the main safety module system controller 900 described hereinafter. Suitable temperature sensors 920 are preferably attached at appropriate points along the inner shell skin 133 to detect the temperature experienced by the passengers. The sensed temperature is constantly monitored by control processor 902 and if temperatures in excess of a preselected threshold are exceeded, then the system controller preferably automatically opens valve 277 thereby allowing coolant to pass through the cooling system and reduce the temperature of the safety enclosure inner shell 133 and the cabin contained therewithin. If temperatures less than the prescribed threshold value are sensed, the controller preferably automatically closes valve 277 thereby cutting off coolant supply to the cooling system.

Figure 21:
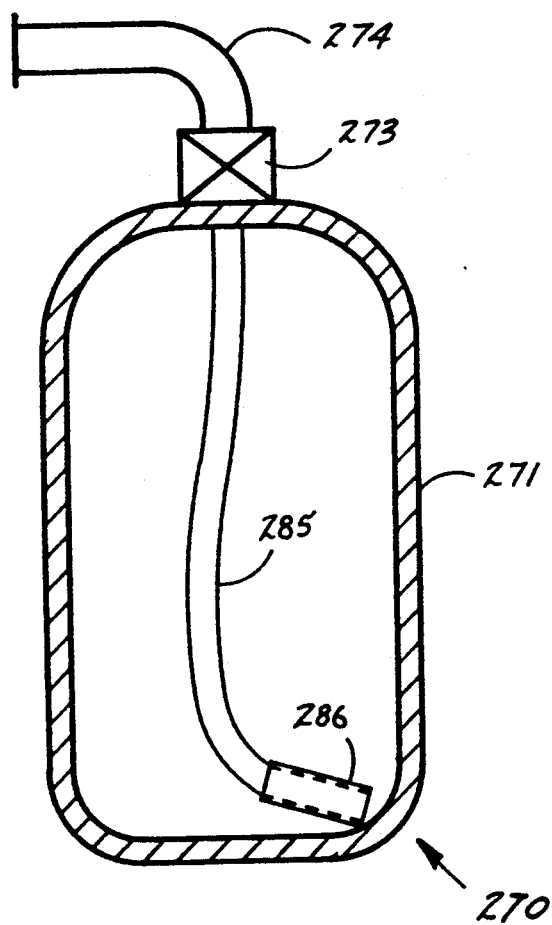
FIG. 21 is an enlarged sectional view showing a cooling system tank as shown in FIGS. 19 and 20.

FIG. 21 shows that coolant tanks 271 are preferably provided with a flexible internal outflow conduit 285 bearing a weight 286 to efficiently convey liquid refrigerant therethrough in order to optimize the cooling effectiveness occurring along the secondary coolant distribution lines 282.

FIG. 5 shows some additional passenger convenience and safety features which are advantageously included in safety enclosures made in accordance with this invention. Along the ceiling of the cabin are three accessory units 290 which advantageously include reading lights, adjustable air supply from the aircraft, and emergency oxygen masks, in a configuration similar to units now used on commercial jetliners. FIG. 7 shows a ship service connection 295 which provides electricity, communications, and air from the aircraft or other vehicle in which safety enclosure 100 is mounted.

FIG. 14 shows an armrest cover 199 which has been raised between seats 182 and 183 to show a control panel 198 for notifying the stewardess, controlling audio entertainment, and a small liquid crystal television set 197 which may be otherwise located as a larger unit. Other convenience and safety features can also be included or controlled from such a control panel.

Figure 15:
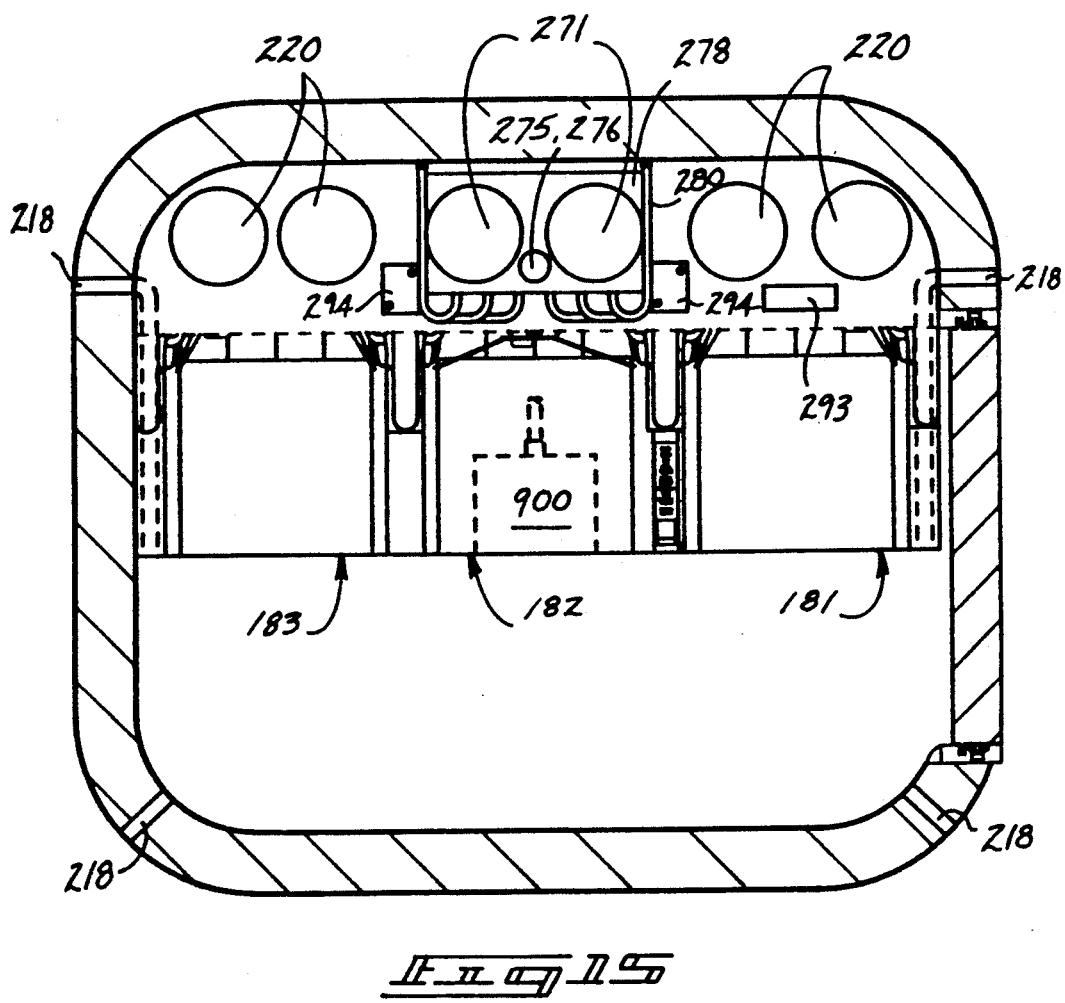
FIG. 15 is a sectional view similar to FIG. 14 with portions of the seating removed to show auxiliary systems mounted behind and underneath the seating.

FIG. 15 shows that the controller unit 900 is preferably contained in a system controller module. The system controller module also preferably includes a verification subsystem 924 which records and verifies the data being monitored by the controller. The controller and verification units can alternatively be mounted between the seats in the arm rest structure. Both such units are housed in a protective enclosure. An emergency locator transmitter 293 is also preferably provided to send emergency location signals to aid in rescue of the passengers. Such transmitter 293 may operate at its own unique frequency thereby permitting rescue crews, following a crash, to identify and locate the origin of the distress signal. Two or more batteries 294 are included to supply emergency power whenever the supply from the transporting vehicle is interrupted or terminated.

Figure 22:
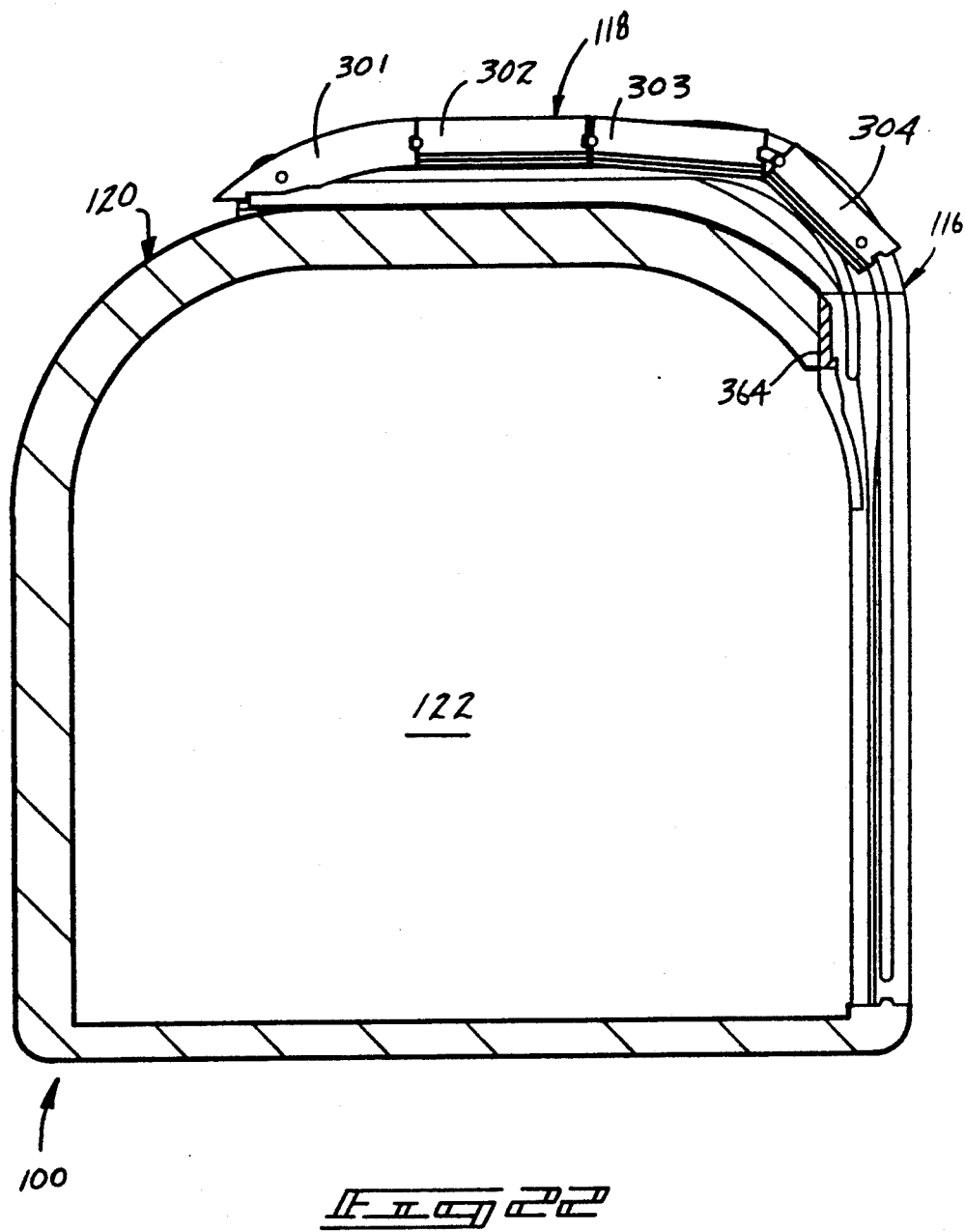
FIG. 22 is an enlarged diagrammatic transverse sectional view of the safety enclosure of FIG. 1 with portions simplified and removed to provide isolated presentation of the door and supporting door frame structure. The door is shown in a fully retracted overhead position normally maintained for ingress and egress of passengers.

The door means 114 was briefly described above but will now be considered in full detail. Door means 114 includes both door assembly 118 and door frame assembly 116. FIGS. 22-25 show the general operation of the door assembly relative to the enclosure shell 120 and door frame assembly 116. FIG. 22 shows the door assembly 118 in the fully retracted position. It can be appreciated from that view that door 118 is preferably constructed in four segments or sections 301-304. These four door sections are connected by hinges 390 (shown in FIG. 49) allowing the door assembly 118 to negotiate the curved path defined by the door frame assembly 116.

Figure 23:
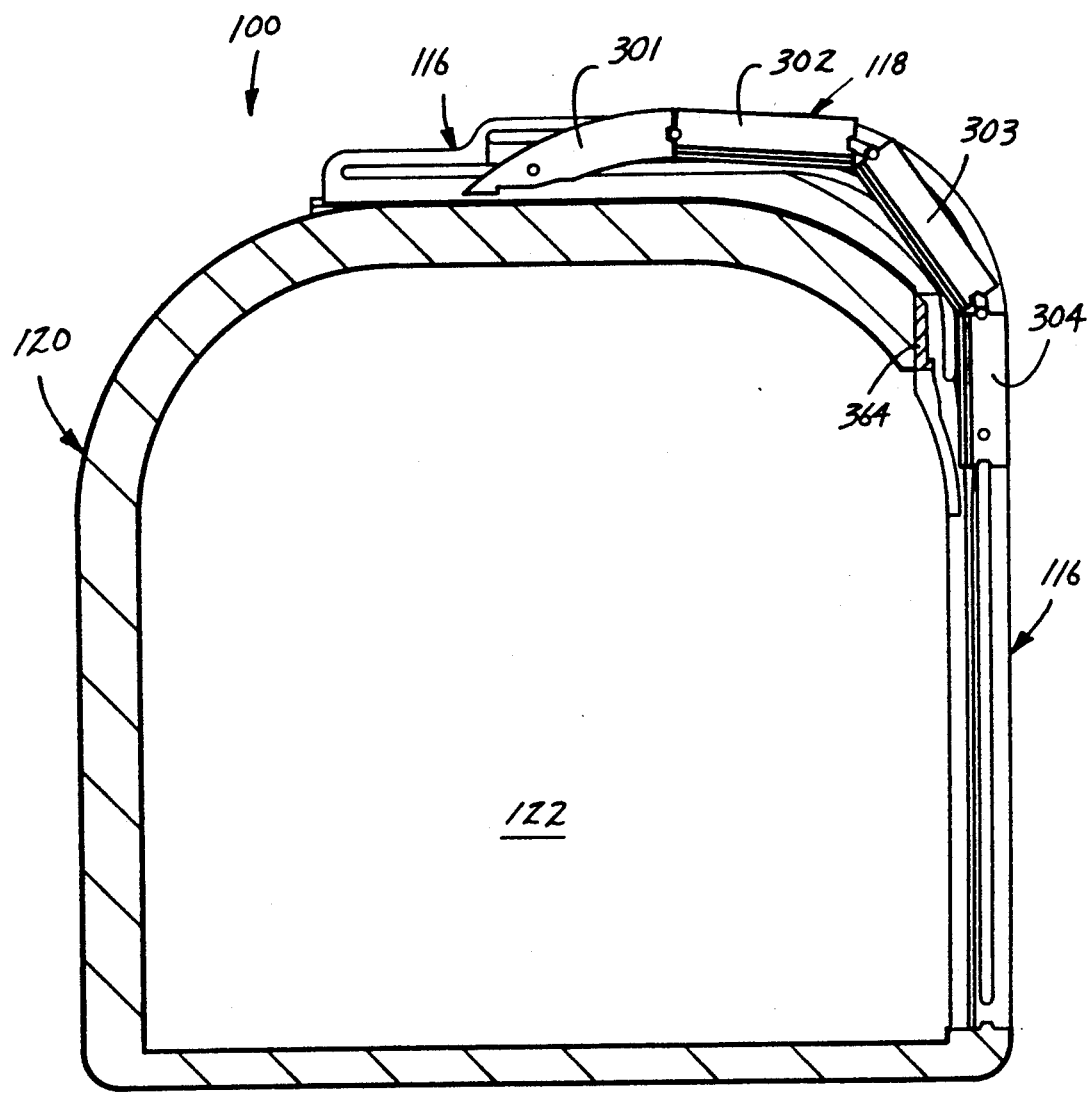
FIG. 23 is a view similar to FIG. 22 with the door repositioned downwardly in a partially closed position to illustrate the process of closing the door.

FIG. 23 shows door assembly 118 partially closed and proceeding downwardly. FIG. 24 shows door assembly 118 in a further state of closure. FIG. 25 shows the door assembly in a completely closed and sealed condition.

FIG. 26 shows an aisle view of the safety enclosure with the door in the closed position of FIG. 25. The roller assemblies 318 supporting the door assembly within the door frame assembly appear to be in solid line, however, this is a result of their small size and the impracticability of showing such short lines as hidden lines. Such lines should be interpreted as hidden lines.

A preferred form of door frame assembly 116 will be described next followed by description of the door assembly. Thereafter a detailed description of the operation of the door within the door frame will be given.

FIG. 27 shows the door frame assembly 116 in isolation from the enclosure shell 120 and door assembly 118. Door frame assembly 116 includes two similar door frame side rail assemblies 330 and 331. Front and rear door frame side rail assemblies 330 and 331 are preferably constructed as two pieces. Front door frame side rail assembly 330 includes an upper side rail piece 341 and a lower side rail piece 342. The rear side rail assembly includes upper and lower side rail pieces or members 351 and 352. FIG. 28 shows fasteners 355a which extend through preformed and tapped holes 355b in stepped lap joints 355 which align and position the upper and lower side rail pieces for both the front and rear side rail assemblies. A dowel pin 356 is advantageously included at each joint for inward and outward alignment between the respective parts of the side rail assemblies.

The lower side rail members or jambs 342 and 352 are connected along the inside surfaces of the enclosure shell door opening 112. A door frame bottom or threshold 360 is connected along the bottom of the door opening 112 and is preferably joined with the lower ends of the lower side rail members 342 and 352. Threshold 360 includes a raised ridge 361 which fits into a recess 391 (see FIG. 48) in the bottom of the door 116 to provide an airtight or nearly airtight seal and a water-tight or nearly a water-tight seal.

The door opening 112 is also furnished with a door frame head piece or top sill 364 which is shown in cross section in FIG. 29. Head piece 364 includes a latch receptacle 365 for receiving a door latch pin therein as will be explained in greater detail below. Head piece 364 also includes a sealing lip 366 which extends outwardly to mate with portions of the upper section of door 118 to form a substantially airtight or water-tight seal.

FIG. 32 shows an alternative threshold 360a which is similar to threshold 360 except for the omission of a curved portion 362 included in threshold 360. Threshold 360a includes a raised ridge 361a similar to ridge 361. Threshold 360a is used in alternative embodiments of the invention which will be described hereinafter. Portion 362 of threshold 360 is merely for contouring the threshold to the curved profile of the enclosure shell 120.

FIG. 33 shows the configuration of the rear door frame side rail assembly 331. The lower portion 352 of side rail assembly 331 includes a first guide roller receptacle track 353 which is best shown in FIG. 37 taken along line 37—37. Guide roller receptacle track 353 serves to receive and guide door rollers 318 which are included along the edges of door assembly 118. Adjacent to the first guide roller track 353 is a gear rack 354 which is advantageously formed in a separate piece to allow removal and maintenance. Gear rack 354 meshes with a door operating drive gear 323 as shown in FIG. 60. The gear rack member 354 extends upwardly into the upper side rail piece 351 to provide drive capability for the door into the fully open and retracted position, such as shown in FIG. 22.

The lower portion of rear door frame side rail member 352 also includes an alignment and sealing groove 356. Groove 356 is designed to receive a tapered sealing rib 394 formed on the side of the door assembly to form a very strong engaging fit between the door and door frame to resist explosions and to provide a substantially airtight and water-tight seal between the door and door frame to exclude smoke and other noxious fumes and water should the protective enclosure be immersed in water.

FIGS. 33 and 36 indicate that the upper portions of lower side rail member 352 also include a second guide roller track receptacle 357. A boss portion 358 is also provided against which inner surfaces of the top door section 301 mate when the door is in the fully closed and extended position, such as shown in FIG. 25. The top door section and boss or stop portion 358 seal in a substantially airtight manner.

The upper door frame side rail member 351 is shown in greater detail in FIGS. 33-35. These figures indicate that the first guide roller receptacle track 353 extends along and aligns with the same track defined in the lower portion of the door frame side rail. The second guide roller receptacle track 357 extends along beneath the first guide roller track and also mates with the corresponding extension of the second guide rail track which forms a part of the lower side rail member 352. The first and second guide tracks 353 and 357 are spaced apart in approximately parallel relationship. The first guide roller track 353 guides the door rollers 318 except for the top pair of guide rollers 318a of the top door section 301. The second guide roller track 357 guides the top door rollers 318a. The door rollers 318 and 318a are best shown in FIG. 46. The area 349 between the guide roller receptacle tracks 353 and 357 is recessed as is the adjacent area 348 which provide clearance for movement of the door assembly about the curved track.

The description given with respect to FIGS. 33-37 in connection with the rear side rail assembly 331 is also applicable to front side rail assembly 330. Front side rail assembly 330 includes the guide track related features described above along the inward or rearward face of the door frame side rail rather than along the inside frontward face as described with respect to the rear side rail assembly 331. Otherwise the two side rail assemblies are similar and substantially mirror images of one another.

FIG. 38 shows a preferred top door rail mounting means 369 for mounting the distal ends of upper side rail members 341 and 351 to the top of the enclosure shell 120. This arrangement includes a tab bar 370 which is preferably provided with two or more tapered and rounded tabs 371 along the outer edge of the tab bar. The tapered and rounded tabs are best shown in FIG. 38A. Tab bar 370 is also provided with recessed portions 372 at opposing ends which are mounted adjacent to the lower surfaces of the distal ends of the upper side frame members 341 and 351. Recessed portions 372 define shoulders 373 which restrain the upper side rail pieces against motion when the tab bar is rigidly connected beneath and between the upper side rail members 341 and 351. The upper side rail members 341 and 351 are advantageously connected to the tab bar 370 using fasteners or by welding.

Door frame top mounting assembly 369 also includes a shell-door frame mounting piece 380 which is specially contoured along a lower surface thereof so as to fit tightly over the exterior skin of enclosure shell 120. Mounting piece 380 is advantageously connected to the enclosure shell outer surface by welding, fasteners, or other suitable means. Mounting piece 380 is provided with extensions 381 having tab receptacles 382 which receive tabs 371 therein. A wedge 385 is advantageously mounted to the enclosure to guide the tab bar 370 to the desired elevation relative to the tab receptacles to allow them to be inserted therein with ease.

Figure 58:
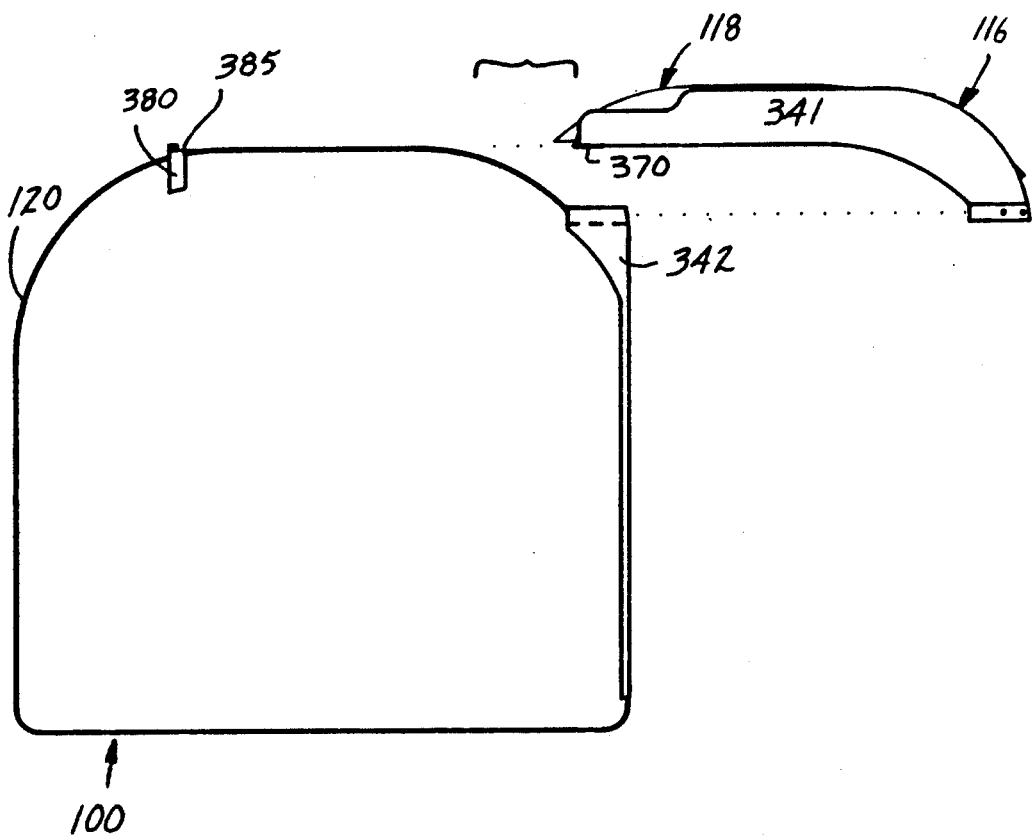
FIG. 58 is a front elevational view similar to FIG. 1 with the upper portion of the door frame side rail and door assembly expanded away to illustrate installation and assembly thereof with the lower portion of the door frame and safety enclosure shell.
Figure 66:
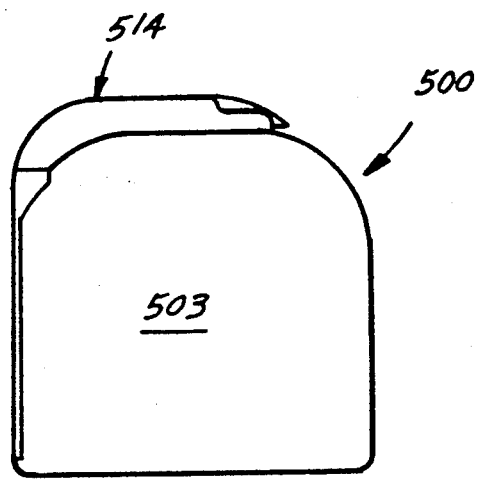
FIG. 66 is a rear elevational view of the safety enclosure of FIG. 62.
Figure 67:
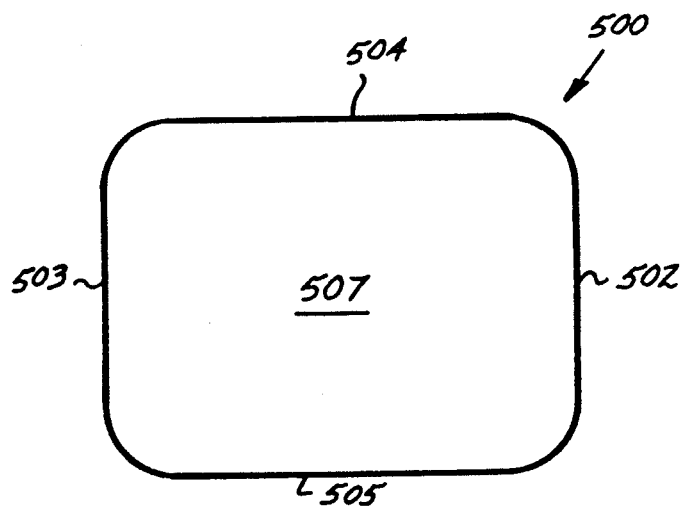
FIG. 67 is a bottom view of the safety enclosure of FIG. 62.

FIG. 58 indicates that the mounting bar 380 is permanently installed upon the top of the enclosure shell 120. The door and upper door frame side rail portion can be easily slid across the top of the enclosure shell and installed by aligning the mating tabs 371 and tab receptacles 382. Fasteners 355a are then installed to connect the staggered splice joint shown in FIG. 28 and hold the upper portion of the side rail assembly in rigid connection with the lower portion of the door side rail assembly and with the enclosure shell. This arrangement allows easy installation and removal of the door and upper portion of the door frame assembly when maintenance is required on either portion.

Figure 39:
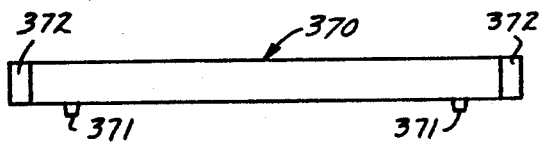
FIG. 39 is a plan or top view showing the tab bar of FIG. 38 in isolation.
Figures 40, 41:
FIG. 40 is an outside elevational or edge view of the tab bar shown in FIG. 39.
FIG. 41 is a front end view of the tab bar shown in FIG. 39.
Figures 42, 44, 45:
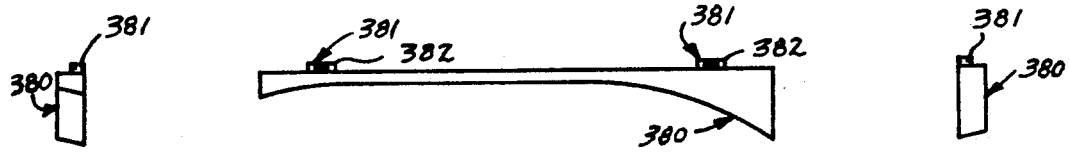
FIG. 42 is an outside elevational view showing the mounting piece for the door frame assembly shown in FIG. 38.
FIG. 44 is a front end view of the mounting piece shown in FIG. 42.
FIG. 45 is a rear end view of the mounting piece shown in FIG. 42.
Figure 43:
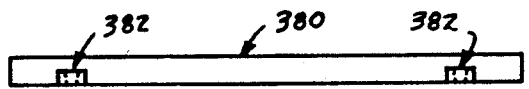
FIG. 43 is a top view of the mounting piece shown in FIG. 42.

FIGS. 39-41 show the tab bar 370 in greater and orthographic detail. FIGS. 42-45 similarly show the shell-door frame mounting piece 380 in greater detail.

FIG. 46 shows an elevational view of the outside of door assembly 118 in isolation. The first, second, third and fourth door sections 301-304 are shown in arrangement from top to bottom of the door assembly. Extending outwardly from the side edges of the door sections are a plurality of guide rollers 318 and 318a. In the lowest section of door assembly 118 there is also included a combination gear and guide roller set 320 at each side of the door. FIGS. 60 and 61 show guide roller and gear set 320 in greater detail. Set 320 includes a guide roller 318 which is mounted on a shaft 322. Shaft 322 also supports the door drive gears 323 which engage with gear rack 354 mounted on the door frame assemblies. Shaft 322 extends across the lower section of the door as presented in FIG. 46. An electrical motor unit 325 drives a reduction gear box 324 having an output gear 326 which drives a primary gear 327 mounted on shaft 322. Motor 325 is controlled by a suitable relay (not shown) and controller 900 to drive the door assembly upwardly or downwardly on the gear rack 354 by rotating the output gear 326 which intermeshes with primary gear 327 delivering torque and angular displacement to shaft 322 and connected door drive gears 323 located at opposing sides of the door assembly. A door closure sensor switch or other detector 396 (FIG. 48) senses contact of the door bottom with the threshold 360 or any obstacle so that controller 900 turns motor 325 off.

The motor unit 325 and gear box 324 together with the primary and output gears 327 and 326 are designed to rotate the shaft 322 and drive gears 323 so as to close the door over a short period of time, e.g. 2-4 seconds. Retraction of the door need not take place over such a short period of time.

Another preferred door drive mechanism would feature a motor/gear box unit that could drive a coaxial shaft leading out of both ends of the motor/gear box unit so as to directly drive the gears 323 without the need for primary and output gears 327 and 326.

FIG. 47 shows that the second, third and fourth sections of door assembly 118 are substantially planar, whereas the first or top section 301 is curved to contour with the enclosure shell shape. All four sections of the door are connected together using hinges 390 shown most clearly in the detail view of FIG. 49. The lower edges of door sections 301-303 are provided with a recessed groove 391 (see FIG. 53) which engages with a raised rib 392 formed along the top of the adjacent door section. The ribs 392 and grooves 391 are preferably tapered to provide better sealing and can be provided with resilient seals 393 (FIG. 48), if desired. This engaging rib and groove configuration provides strength against lateral displacement which may occur due to pressure differential between the cabin and outside.

FIG. 46 shows the tapered door locking or alignment fins 394 which extend along the side edges of the lower three door sections 302-304. Fins 394 are received within groove 356, shown most clearly in FIGS. 33 and 37. The interrelationship of fins 394 with grooves 356 provides tight sealing of the door against the door frame and prevents inward or outward displacement of the door relative to the door opening. This feature is important when pressures differ in the cabin versus outside and when the safety enclosure is displaced within the aircraft or thrown from the aircraft in order to maintain structural integrity of the enclosure shell. The top or first section 301 of door assembly 118 (FIG. 47) is shown shaped to conform to the general outer shape of the enclosure shell along the outside surfaces thereof but other shapes are acceptable. The inside surfaces are specially shaped to mate with the sealing and support boss 358 described hereinabove with respect to the door frame assembly. A sealing ledge 395 (FIG. 47) is provided along the inside surface of the top door section to mate and seal against the lip 366 of headpiece 364 (FIG. 29).

FIG. 50 shows a preferred form of door latch mechanism 400. Door latch mechanism 400 includes a catch pin 401 which is movable inwardly and outwardly to be received within the catch receptacle 365 of the door frame headpiece 364. Outward movement of the catch pin is accomplished by an outwardly biasing pin spring 402. Inward movement of the catch pin 401 is accomplished by rotating either the outer or inner latch handles 404 and 405 which are exposed upon the outer and inner faces of the door. Latch handles 404 and 405 are connected by a handle shaft 406. A lever 408 is rigidly connected on shaft 406 and is positioned so as to pull on a flexible release cable 409. Cable 409 is trained over a pulley 410 to provide smooth action and retraction of the catch pin 401. Catch pin 401 is provided with a beveled lower surface to aid in its automatic retraction as the door moves downwardly against the upper beveled surface of the door frame headpiece 364 as the door nears the closed position. The top of the first section 301 of the door assembly 118 can be advantageously shaped to accommodate a more efficient lever 408, cable 409, and pulley 410 system.

Door assembly 118 further includes an escape hatch or similar escape means 420 (FIG. 46) which is advantageously formed in the two intermediate second and third door sections 302 and 303. FIGS. 52-5 show a preferred form of construction for the escape hatch 420. Escape hatch 420 includes a first or upper escape panel 422 which is formed within second door section 302. Escape panels 422 and 423 can be completely removed from door sections 302 and 303 to provide an approximately square escape opening through the door in case the door assembly cannot be opened. Escape panels 422 and 423 include escape mechanism release handles 426. Such escape handles 426 are included on both the inside and outside of escape panels 422 and 423.

FIGS. 55-57 show that escape handles 426 are connected to allow rotation of a escape mechanism shaft 430. Shaft 430 non-rotatably mounts a dual lever arm 431 having pivot connections 432 at appropriate points, such as at the distal ends of the dual lever. The pivot connections 432 mount a pair of connecting rods 433. Connecting rods 433 are pivotally connected to adjustable connection ends 440a of adjacent latch members 440 to simultaneously rotate the latch members about latch member pivots 441. Latch members 440 include a latching extension 443 having a hook tip 444 which moves about locking pins 450 which are secured within the non-removable portions of the second and third door sections.

FIG. 55 shows the basic operation of the escape hatch locking mechanisms. The locking mechanisms are shown in the locked or latching position in solid line. Portions of the mechanism are also shown in phantom line indicating the released position. As handles 426 are rotated, shaft 430 rotates causing the dual lever arm 431 to rotate and draw the connecting rods 433 inwardly. This causes the adjoining latch members 440 to pivot and remove the hooked portions 444 from engagement with the locking pins 450. With the latching mechanisms released the two escape hatch panels 422 and 423 can be pushed outwardly to pivot at their adjoining hinge 390 to remove them from the door sections and allow escape of individuals from the safety enclosure.

Figure 68:
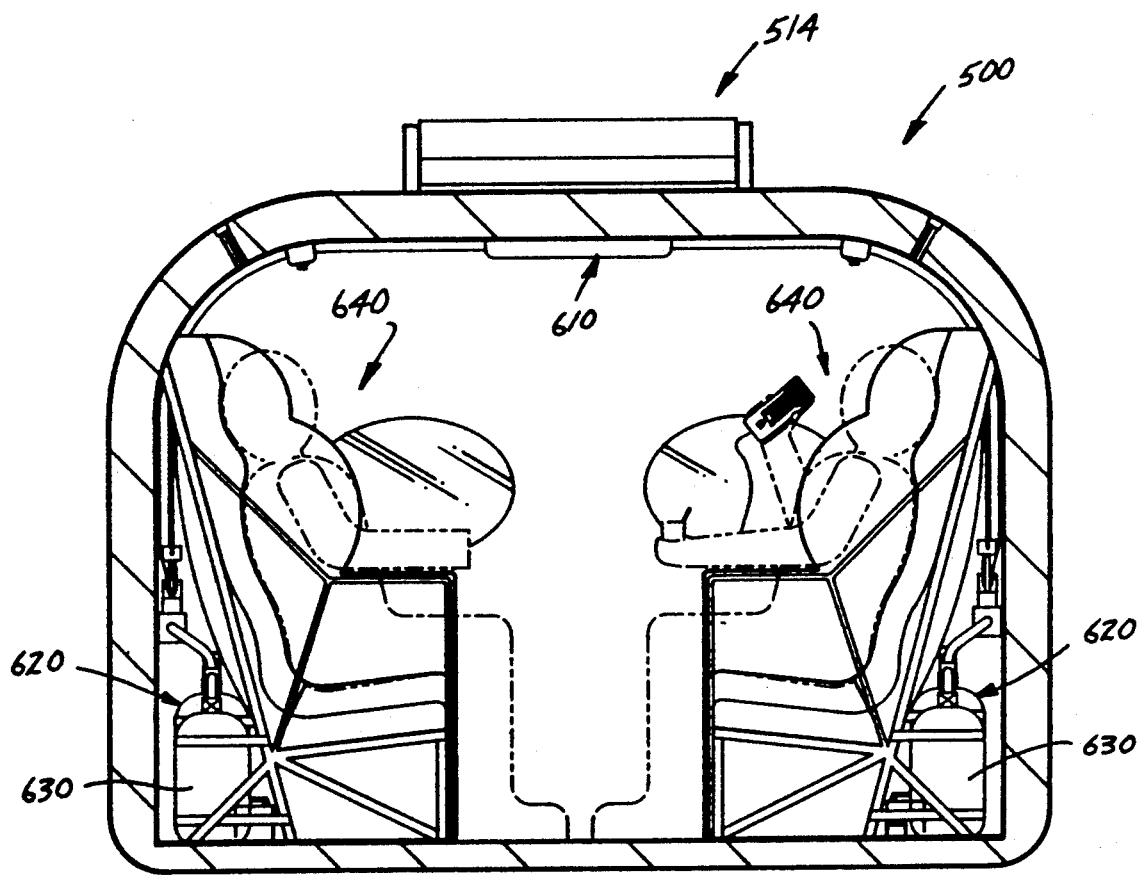
FIG. 68 is a longitudinal sectional view taken substantially along line 68—68 of FIG. 62.
Figure 69:
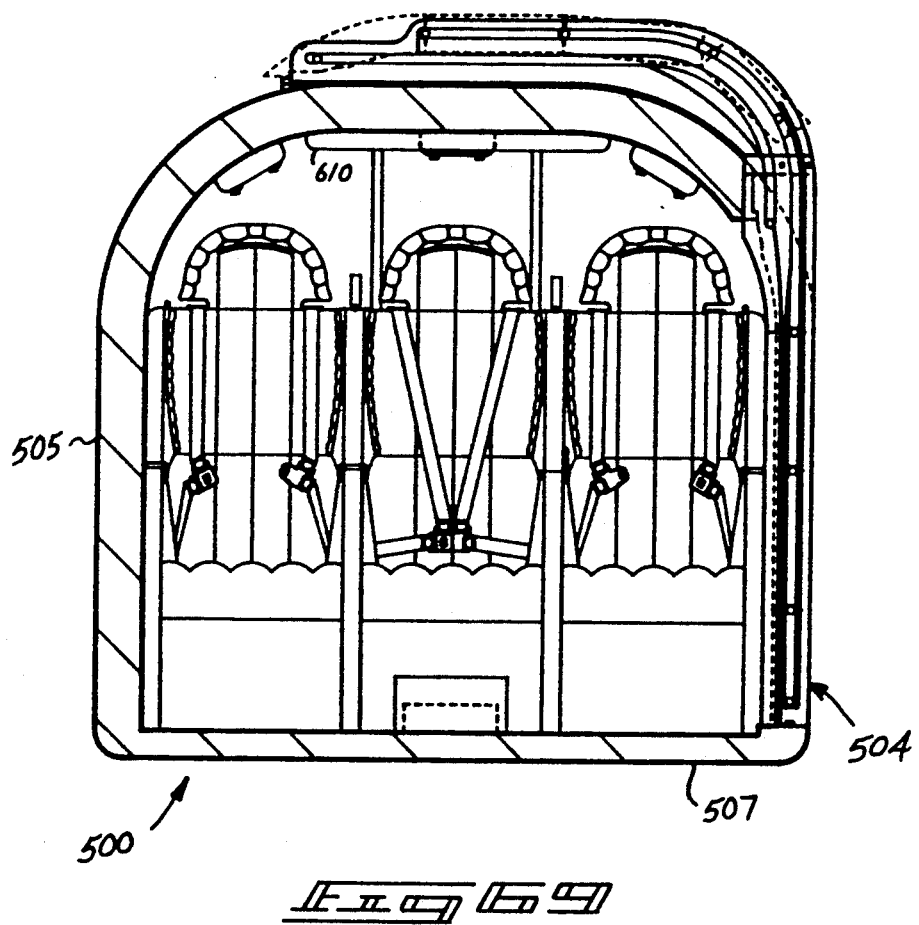
FIG. 69 is a transverse sectional view taken substantially along line 69—69 of FIG. 64.

FIGS. 62-67 show an alternative embodiment safety enclosure 500 constructed according to this invention. Safety enclosure 500 is constructed to provide two rows of seating for three people each in a manner similar to the single row of seating provided in safety enclosure 100. The seating is arranged in opposing relationship as best shown in FIG. 68. Safety enclosure 500 is constructed substantially the same as safety enclosure 100. Specific shapes and dimensions of the shell enclosure are different from safety enclosure 100 in order to accommodate the larger size and greater seating capacity.

Safety enclosure 500 includes an enclosure shell 520 constructed substantially the same as enclosure shell 120 described hereinabove. Enclosure shell 520 includes a front enclosure shell wall 502, rear wall 503, aisle wall 504, window wall 505, top 506, and bottom 507. Window wall 505 is advantageously provided with two port holes 510 each having a port hole window 511 provide viewing for both rows of passengers. Enclosure shell 520 is provided with a door opening 512 which is fitted with a door means 514. Door means 514 is nearly identical to door means 114 described hereinabove. The variants between door means 114 and 514 are with respect to the shell-door frame mounting piece 580 which is contoured somewhat differently than the corresponding mounting piece 380 described hereinabove because of the relatively flatter roof contour adjacent the door frame. Also, the threshold 360a shown in FIG. 32 is used with safety enclosure 500.

FIG. 68 shows that the interior or cabin configuration of safety enclosure 500 is substantially the same as that shown with respect to enclosure 100 except for the provision of two seating rows of the same construction as those described hereinabove with respect to enclosure 100. Auxiliary systems similar to safety enclosure 100 are provided in safety enclosure 500, including a gas deployable breathing supply crash bag 610. A cooling system 620 is similarly provided. Air tanks 630 are positioned behind each of the rows of passenger seats 640. Convenience items, control systems, and other passenger safety features as described above with respect to enclosure 100 are also provided and such description is applied to enclosure 500 as if set forth in full. The alternative configurations described below in connection with FIGS. 87-91 can alternatively be used with this and other embodiments.

Figure 70:
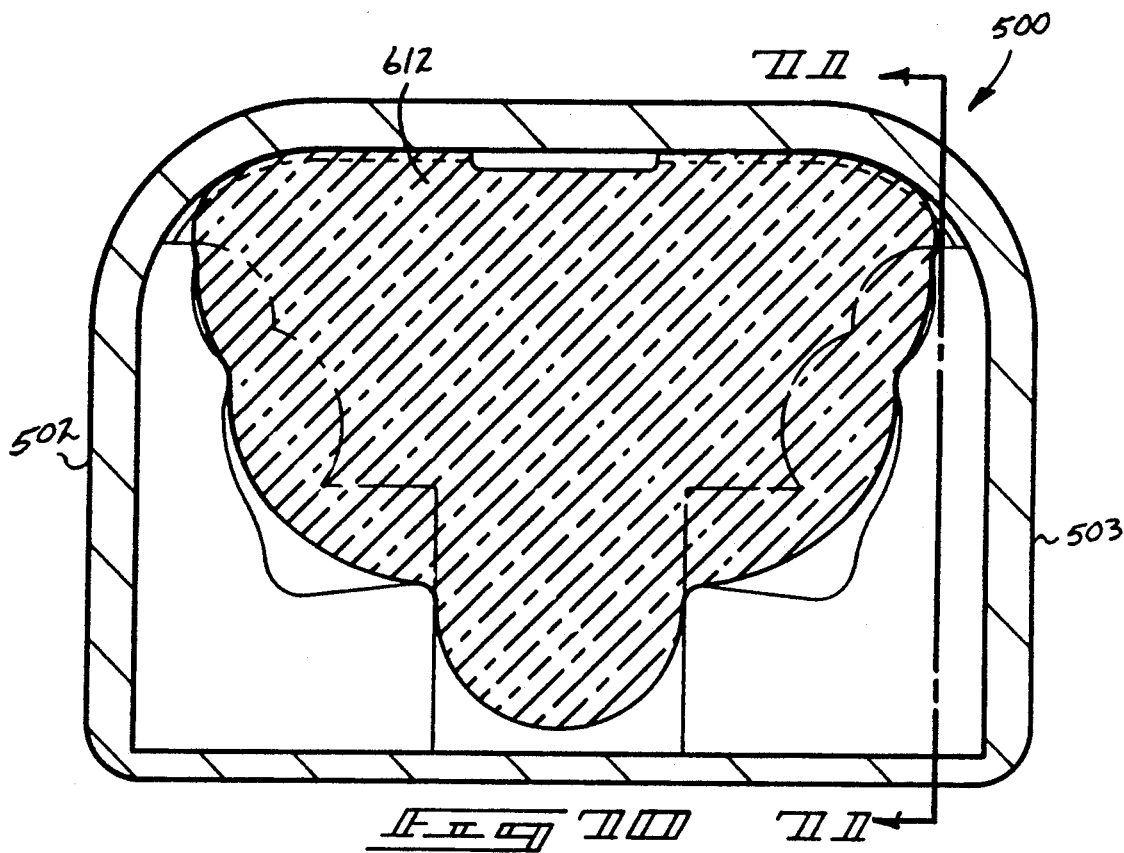
FIG. 70 is a diagrammatic longitudinal sectional view similar to FIG. 68 showing deployment of a gas expandable crash bag.
Figure 71:
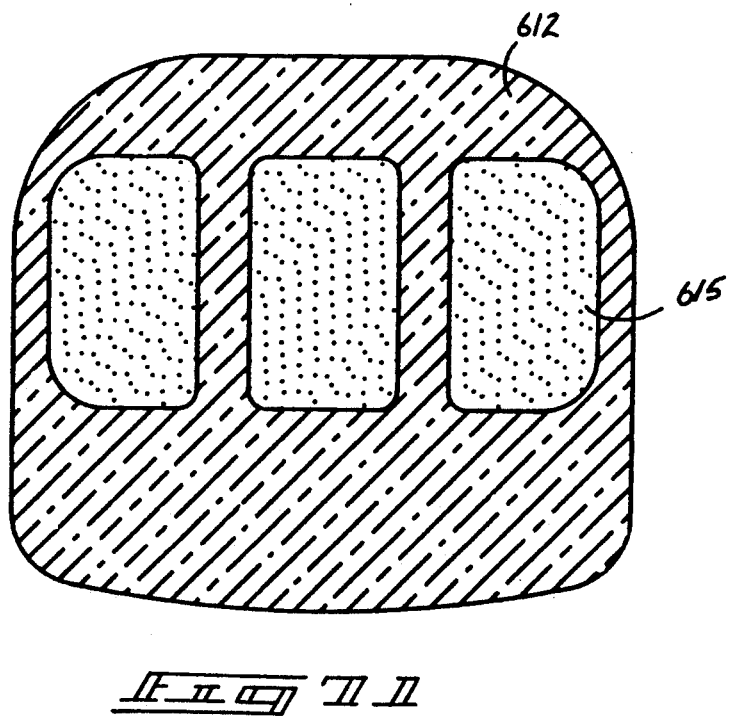
FIG. 71 is a diagrammatic view taken substantially along line 71—71 of FIG. 70.

FIGS. 70 and 71 show the deployment of crash bag 612. Crash bag 612 is constructed similar to crash bag 212 except that it is larger with capacity to fill the relatively larger cabin of safety enclosure 500. Breathable gas supply passenger panels 615 are provided along both front and rear sides of crash bag 612 as described hereinabove as panels 215.

FIGS. 72-74 show a further alternative embodiment of safety enclosure constructed according to this invention which utilizes modular safety enclosure units which can be assembled into a linear array. The aisle and top views, FIGS. 73 and 74, show three modular units 701, 702 and 703. Modular unit 701 is a front end unit adapted with a rearwardly facing seating 710. Safety enclosure modules 702 and 703 are provided with forwardly facing passenger seating. For illustration purposes, all of modules 701-703 are shown to provide seating for three persons each in the same fashion as enclosure 100 described hereinabove. However, the concepts according to this invention are applicable to construction having seating for two, three or more occupants.

Port holes 711-713 are provided with port hole window glass as explained above. Each of the modules is provided with a door means 714 which is substantially identical to door means 114 described above with respect to safety enclosure 100. Some modification may be needed with respect to the particular contours of the shell-door frame mounting piece 715 of FIG. 72 as described hereinabove. This is especially true for two seating row configurations of this alternative embodiment. Similar modifications to the door frame threshold 716 are also applicable with respect to the front and rear end units 701 and 703 in order to accommodate the particular shape of the enclosure shells of those modules.

FIGS. 73 and 74 indicate that any number of intermediate units such as intermediate unit 702 can be spaced between the front and rear units 701 and 703 to form a safety enclosure array.

FIG. 75 shows one form of internal construction for such a safety module array 700. Each module effectively forms a section of an enclosed tube. Partition walls 720 divide the tube into individual compartments otherwise enclosed by the tubular safety enclosure shell. All other module systems are as described above with respect to enclosure 100.

Figure 76:
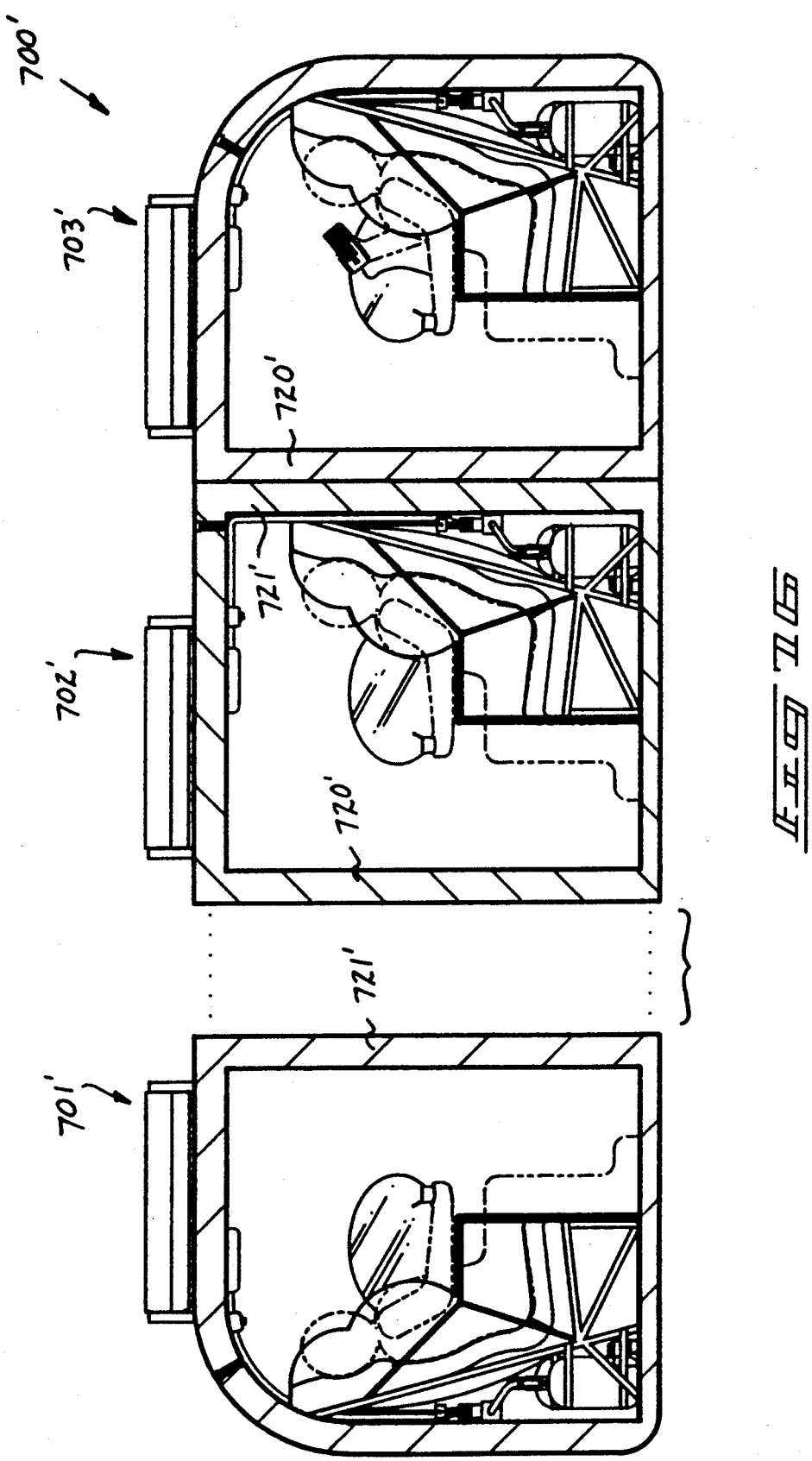
FIG. 76 is a view similar to FIG. 75 showing an alternative construction which can be used for the modular safety enclosure of FIG. 72.

FIG. 76 shows an alternative modular array 700' which is similar in basic arrangement to modular array 700 described with respect to FIGS. 72-74. Each of the modules 701'-703' are similar to the respective front, intermediate and rear end units 701-703 with the exception of the permanent provision of enclosing front and rear wall structures 720' and 721' for each of the intermediate modules 702'. The front module 701' is similarly provided with a rearward permanent protection wall 721'. The rearward module 703' is provided with a permanent front partition wall 720'. Otherwise the modular safety units of array 700' are similar to those described above with respect to array 700.

FIGS. 77-79 show a further alternative modular safety enclosure array system 800 made in accordance with this invention. Array 800 includes modular safety units 801-803 each of which is adapted to incorporate two rows of two, three or more seats in opposing orientation as in safety enclosure 500 described above. Modular safety enclosure array 800 includes a frontward safety module 801, a rearward module 803 and any desired number of intermediate safety enclosures 802. The modules include door means 814 which are as described above with respect to safety enclosures 100 and 500. All other systems included in the safety enclosure modular array 800 are the same as described hereinabove with respect to the other embodiments.

FIG. 80 shows an aisle sectional view of the internal configuration of modular safety enclosure unit 800. Each intermediate unit 802 forms a tubular array safety unit separated from adjacent units by intervening partition walls 820.

FIG. 81 shows an alternative modular safety enclosure array 800' which is similar to array 800. Array 800' includes front, intermediate and rear safety enclosure modules 801'-803', respectively. Modules 801'-803' are constructed substantially similar to modules 801-803 described hereinabove. Modules 801'-803' differ from modules 801-803 in the provision of permanent front and rear partition walls 820' and 821', respectively. Otherwise the systems and features employed in array 800' are the same as described hereinabove with respect to other embodiments of this invention. The modules can be connected together using suitable bolts or other fasteners (not shown) or merely mounted to their supporting vehicle in close proximity.

Figure 84:
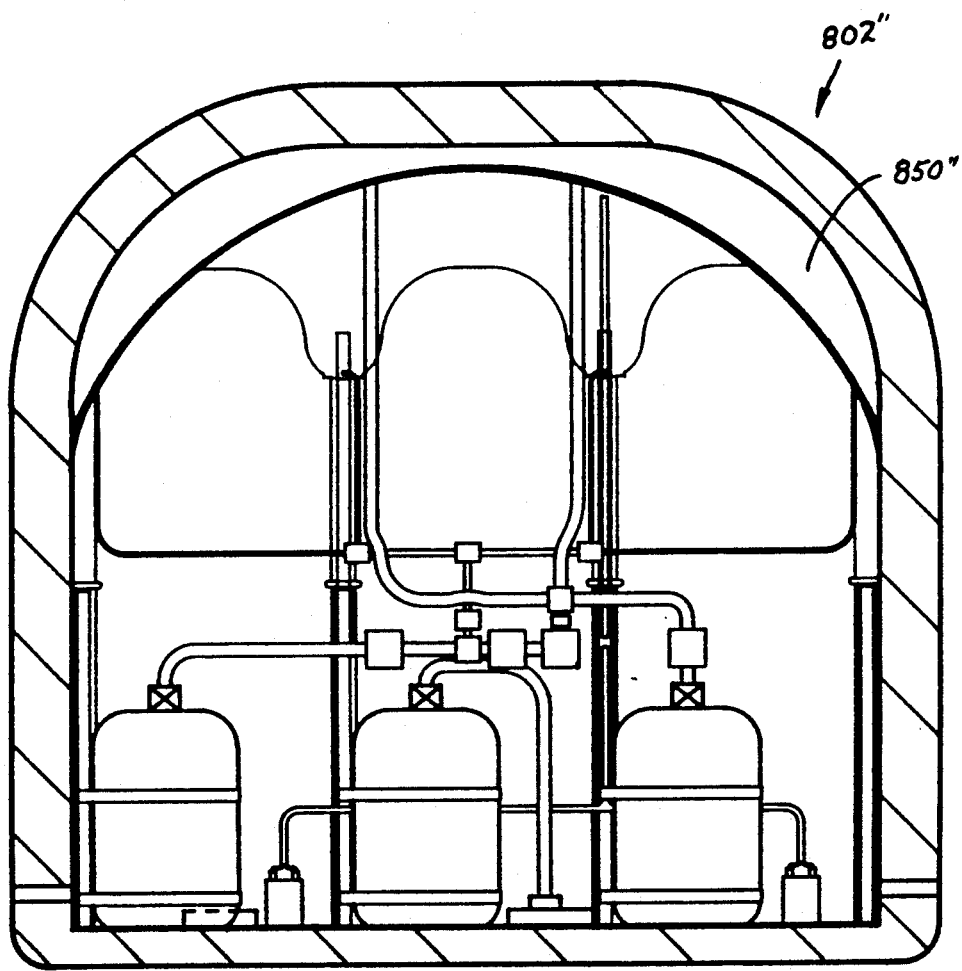
FIG. 84 is a transverse sectional view taken along line 84—84 of FIG. 82.

FIG. 82 shows a still further alternative embodiment safety enclosure array 800''. Enclosure array 800'' is substantially similar to array 800 described hereinabove except that in lieu of partition walls there is a reinforcing arch 850 added along the adjoining portions of the shell enclosure. A double reinforcing arch configuration could also be used in lieu of partition walls 820' and 821' in safety enclosure array 800'. FIG. 84 shows reinforcing arch 850 in greater detail. Array 800'' also includes front, intermediate and rear modular units 801'', 802'' and 803''. The area between adjacent seats of adjacent modules has been made continuous and not partitioned in order to save additional space. FIG. 84 also shows that the air supply and coolant tanks, used in safety enclosure 100, are now shared thus allowing one to serve where two were provided in enclosure 100. Otherwise the modules are substantially the same as the other embodiments described hereinabove.

FIG. 83 shows safety enclosure array 800'' with air bags 822'' deployed within each of the three modules. Similar air bag deployments are applicable in alternative embodiments 800 and 800'.

Figure 85:
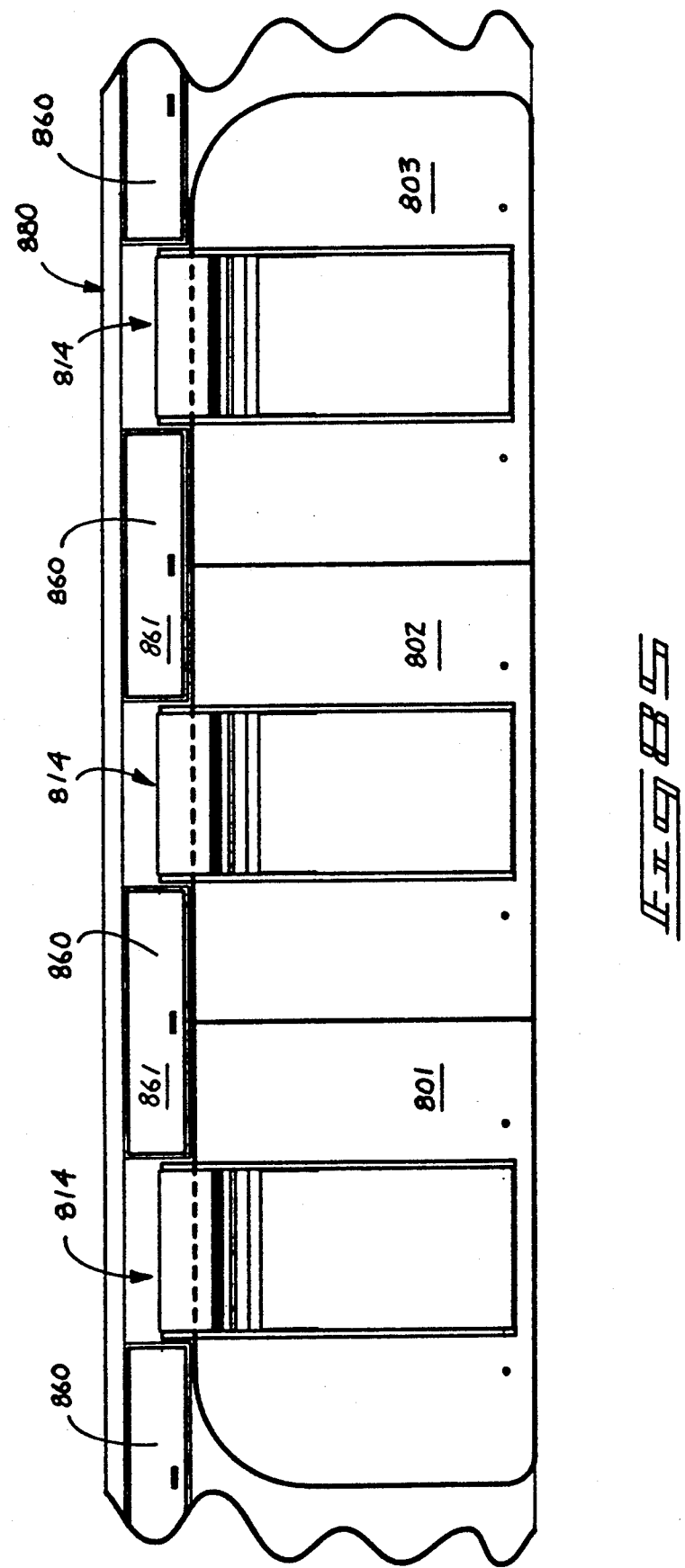
FIG. 85 is an aisle side elevational view showing installation of the embodiment of FIG. 82 within an aircraft and the addition of optional overhead cargo compartments onto the safety enclosures.

FIG. 85 shows safety enclosure array 800 installed within the fuselage of an airliner 880. Optional cargo storage containers 860 are shown outside of the safety enclosure and interpositioned between the respective door and frame assemblies 814 to provide additional cargo space. Such cargo units 860 are preferably provided with a front storage panel or door 861 which retains the contents inside during air travel. Optional cargo containers similar to containers 860 can be interpositioned between respective door and frame assemblies of any of the safety enclosure embodiments 100, 500, 800, 800' and 800'' which have been placed in an array configuration.

Figure 87:
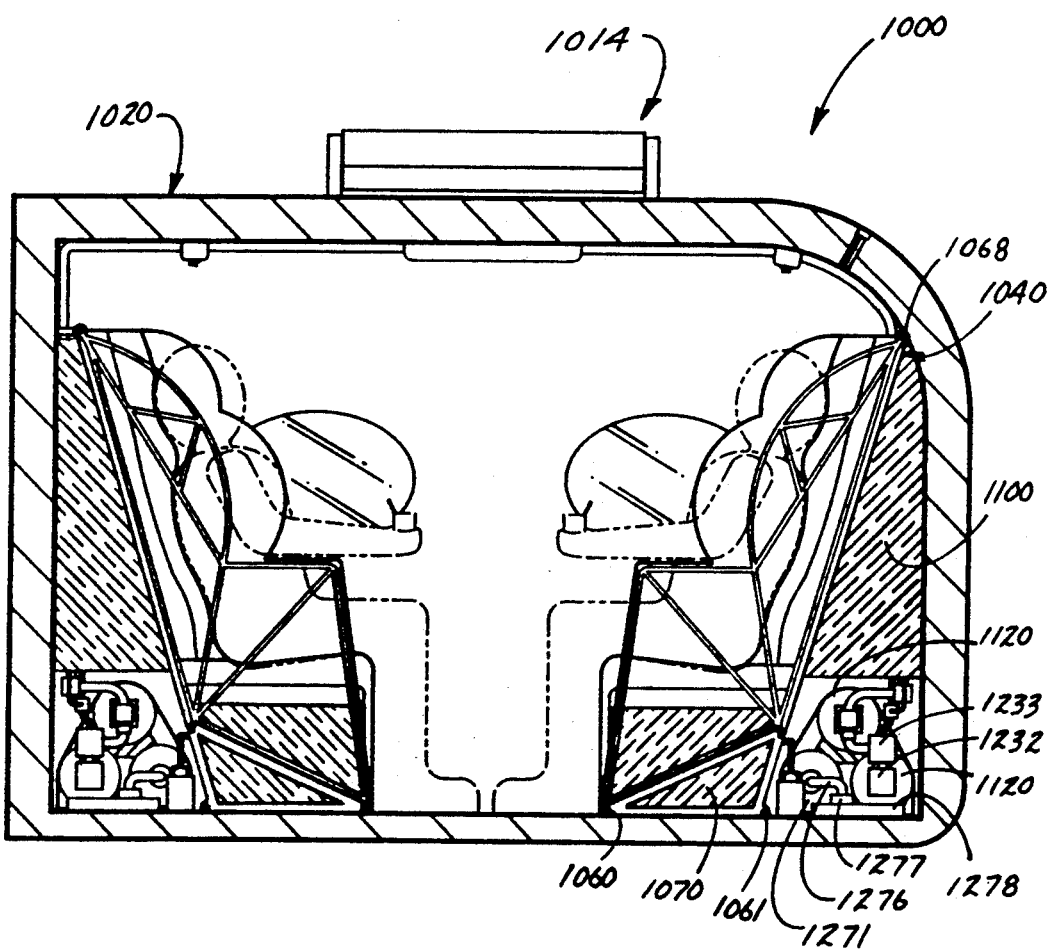
FIG. 87 is an aisle side sectional view of a further alternative embodiment of this invention showing a preferred alternative seating construction and arrangement for auxiliary systems.

FIG. 87 shows a still further embodiment of safety enclosure 1000 constructed in accordance with this invention. Safety enclosure 1000 is similar in basic layout to enclosures 800 and 800' described above and is, as shown, capable of accommodating up to six (6) passengers in comfort preferably in opposing rows of seats. Alternative variations can accommodate fewer or greater numbers of passengers in the configurations described herein or other alternatives. The alternative features shown and described in connection with FIGS. 87-91 are also applicable to safety enclosures 100, 500, 700, 800, 800' and others according to this invention.

Enclosure 1000 includes a shell 1020 which is similar in construction to shell 120 and others described hereinabove. The door structure 1014 is also similar to door means 114 described above and that description will not be repeated here. The primary distinctive features of enclosure 1000 relate to the seating construction and arrangement of the auxiliary equipment about the seating, which will now be described with respect to the distinctive features. Otherwise, the descriptions given herein should be used to interpret the safety enclosure 1000.

The seating of enclosure 1000 is designed to give maximum distribution of impact forces and to minimize the inertial forces imposed on the passengers during a crash. To help in attaining these goals the passengers are each supported upon a seating structure which is primarily supported by the enclosure shell structure itself. The alternative seat framework assemblies serve mainly to restrain and secure three layers of passenger support material, such as bottom layers 1070, 1102, and 1104, and back layers 1100, 1103, and 1105, shown in FIG. 91. The restraint and securement function of the seat framework assemblies also applies to other embodiments described herein.

Figure 88:
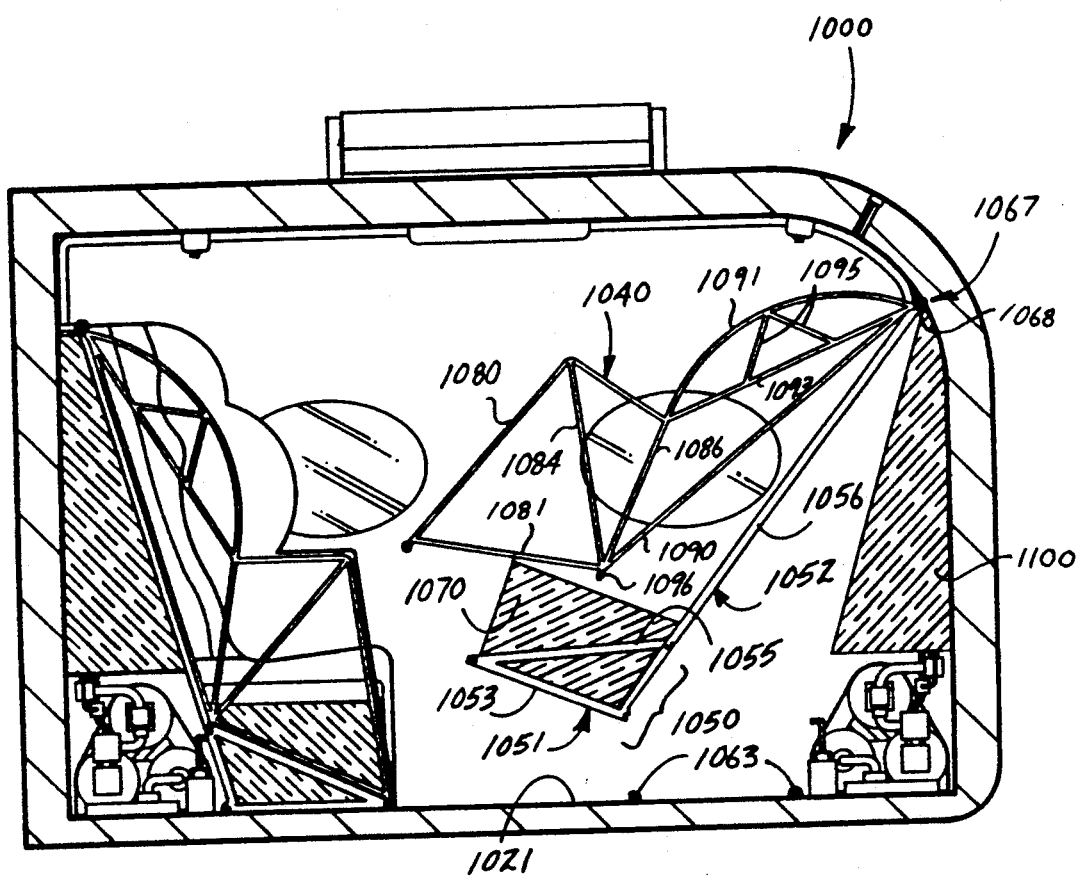
FIG. 88 is a view similar to FIG. 87 with components of the seating system shown raised for access to auxiliary systems.
Figure 89:
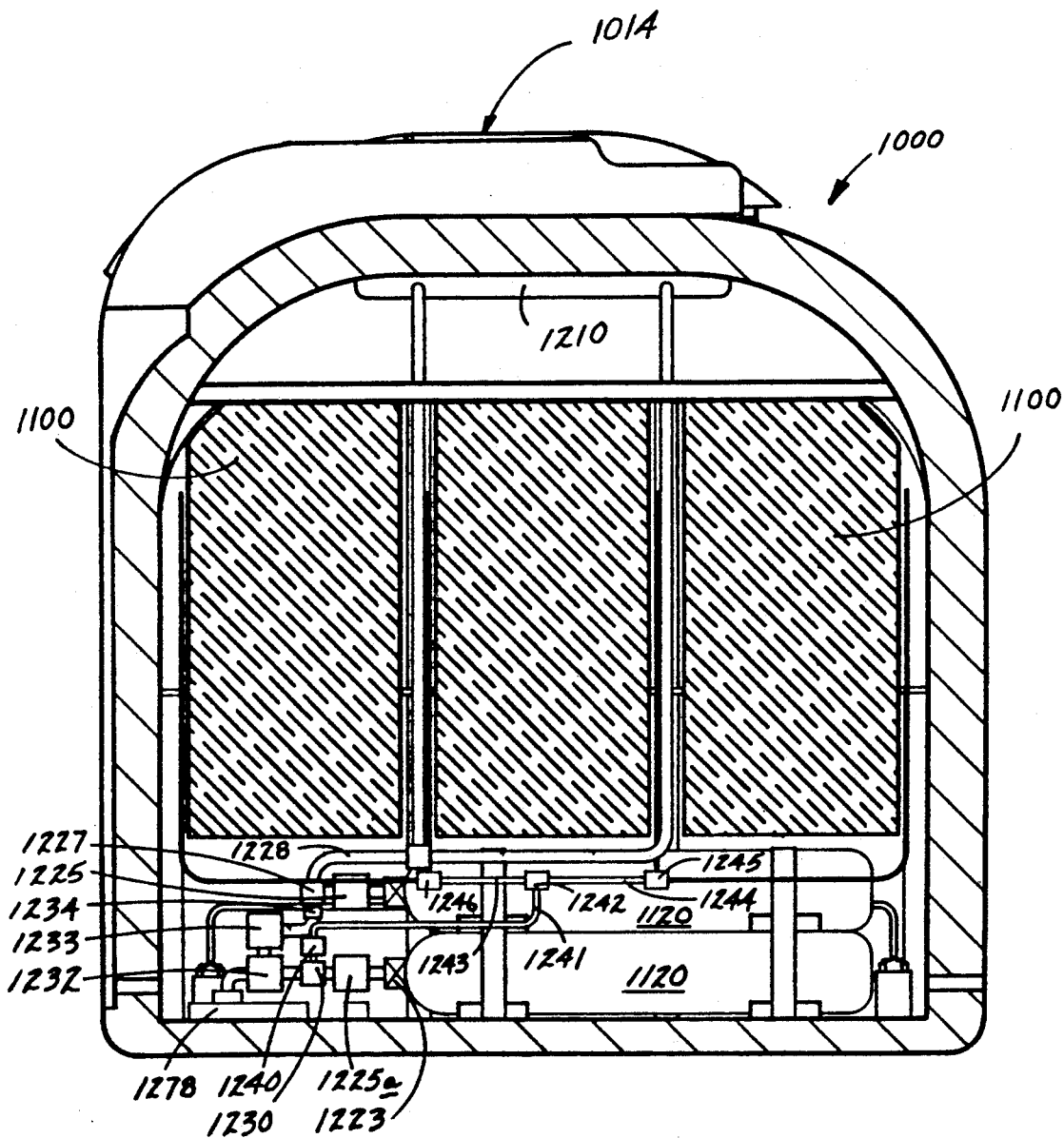
FIG. 89 is rear sectional view of the embodiment of FIG. 87.
Figure 90:
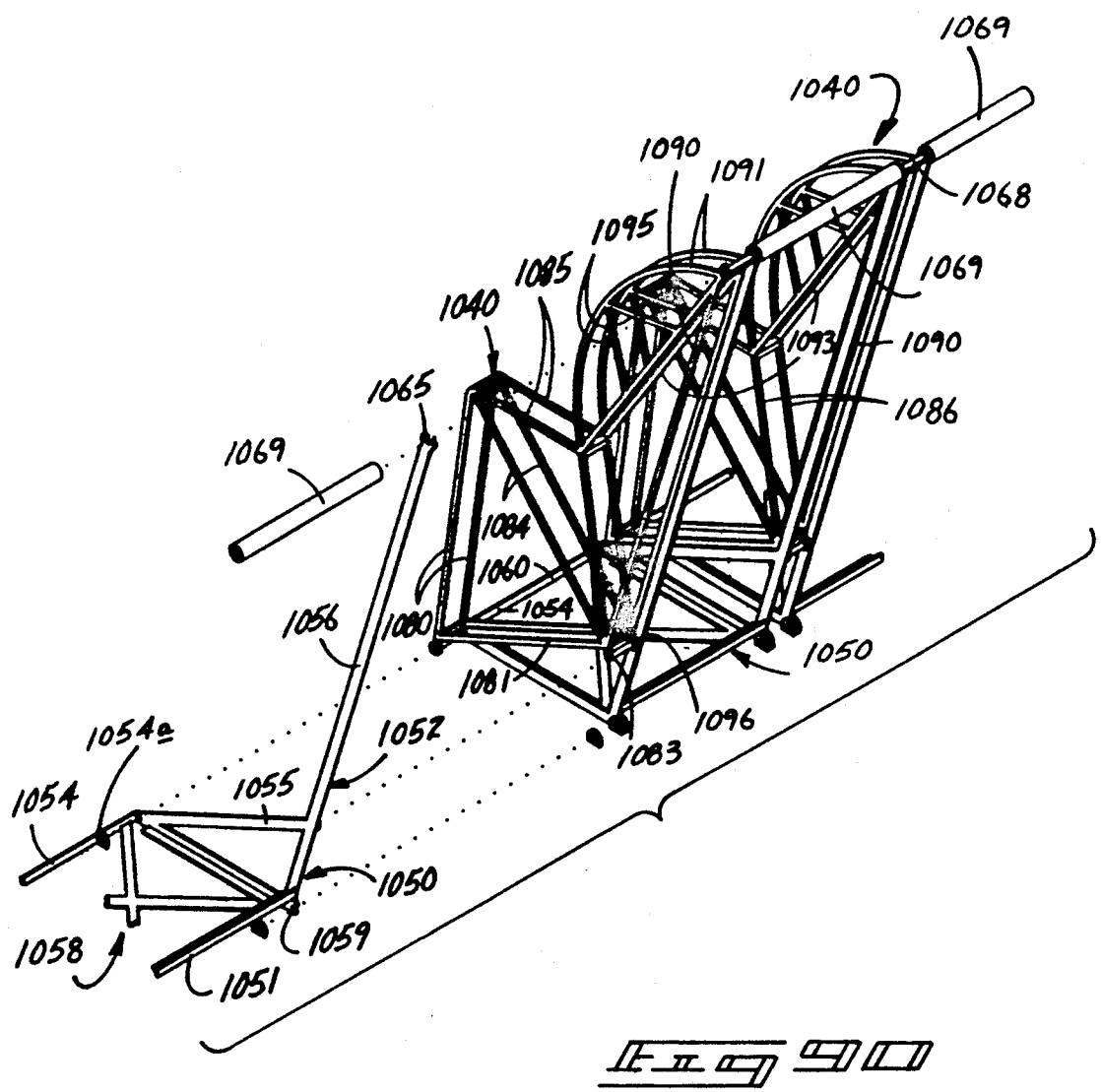
FIG. 90 is a pictorial exploded view showing the seating frame assemblies of FIG. 87 in isolation.

The seating includes a plurality of side frame assemblies 1040 and plurality of base frame assemblies 1050 (see FIG. 90). Base frame assemblies 1050 are provided for each passenger seat. Side frame assemblies 1040 are provided at the side of each seat and between two seats in a shared position. FIG. 88 shows that both the side frames 1040 and base frames 1050 are advantageously connected to the interior wall or other structural member of the shell at a pivot assembly 1067 to allow access to auxiliary equipment mounted behind and below the seating. The frame assemblies pivot upwardly and forwardly to allow access to the auxiliary equipment.

Base frame assembly 1050 includes bottom portion 1051 and two side portions 1052. The bottom portion 1051 includes a perimeter frame 1053 with L-shaped members along the back and sides for restraining the base or foundation cushioning and support member 1070 (see FIG. 88). Base member 1070 is also restrained laterally by the side braces 1055 which extend from the front of the base perimeter frame obliquely rearward to connect with the base frame assembly side bars 1056. The bottom portion also advantageously includes a bottom cross-brace 1058 (FIG. 90). The cross-brace connects with the front bar 1054. The front bar includes restraint fittings 1054a which include holes therethrough which align with holes in the perimeter frame 1053, thus allowing a front restraint rod 1060 (see also FIG. 87) to be inserted therethrough to keep the base and side frame assemblies 1050 and 1040 in the downward and installed position shown in FIG. 87. The back edges of the perimeter frames 1053 are provided with slotted extensions 1059 which engage a rear restraint rod 1061 (FIG. 87) when the base frame assembly is pivoted into the downward position of FIG. 87. The front and rear restraint rods 1060 and 1061 are held to the floor using restraint rod floor fittings 1063 (FIG. 88) which are secured to the shell floor 1021 and provided with holes through which the restraint rods extend.

The upper end of the base frame assembly side bars 1056 are provided with slotted end fittings 1065 which snap into pivotal engagement with a top restraint bar 1068. The base frame assemblies can thus be pivoted upwardly and removed from the top restraint bar by pulling them outwardly along the axis of the side bars 1056. Enlarged portions 1069 of the restraint bar 1068 extend substantially between the base framework side bars 1056 and act as spacer sections for the side bars 1056. The enlarged portions 1069 also provide increased strength and serve as the contact or mounting section by which the restraint bar is permanently secured to the reinforced inner shell surface. The side frame assemblies 1040 are similarly mounted by the top restraint bar 1068 and are pivotally connected thereto using similar snap lock slotted ends which can also be removed.

Seating side frame assemblies 1040 preferably include paired substantially parallel structural members to provide a substantially hollow space within the side frame assemblies for mounting controls, dining trays, and other auxiliary equipment. The side frame assemblies include front members 1080 which extend upwardly from a connection with the front restraint bar 1060. Lower arm rest strut members 1081 extend backwardly and upwardly from the front restraint bar connection to an intersect point 1083 (FIG. 90). Upper arm rest strut members 1084 brace from the intersect point upwardly and forward to the top ends of the front members and the forward ends of the arm rest members 1085. The intersect point also connects to rear arm rest members 1086 which extend upwardly to the rear ends of the arm rest members 1085. Rear main strut members 1090 extend upwardly from the intersect point to a point at or near the pivotal connection with the upper restraint bar 1068. A lateral side panel portion of the side frame assembly connects with the rear main strut members 1090, also near the upper end of the side frame assembly. The lateral side panel portion advantageously includes parallel curved face members 1091 and inside connection bar members 1093 which extend between the rear ends of arm rest members 1085 and the upper end of the side frame assembly, at or near the connection with restraint bar 1068. Lateral side panel brace members 1095 are included between the curved face members 1091 and the inside connection bar members 1093. The intersect point has an intersect point extension piece 1096 which fits between adjacent side bars 1056 of the base frame assemblies 1040 to space and laterally restrain such members of the adjacent assemblies. As FIG. 90 indicates, the side bars 1056 of the base frame lay along and are adjacent to the rear main strut members 1090 of the side frame assemblies.

Figure 91:
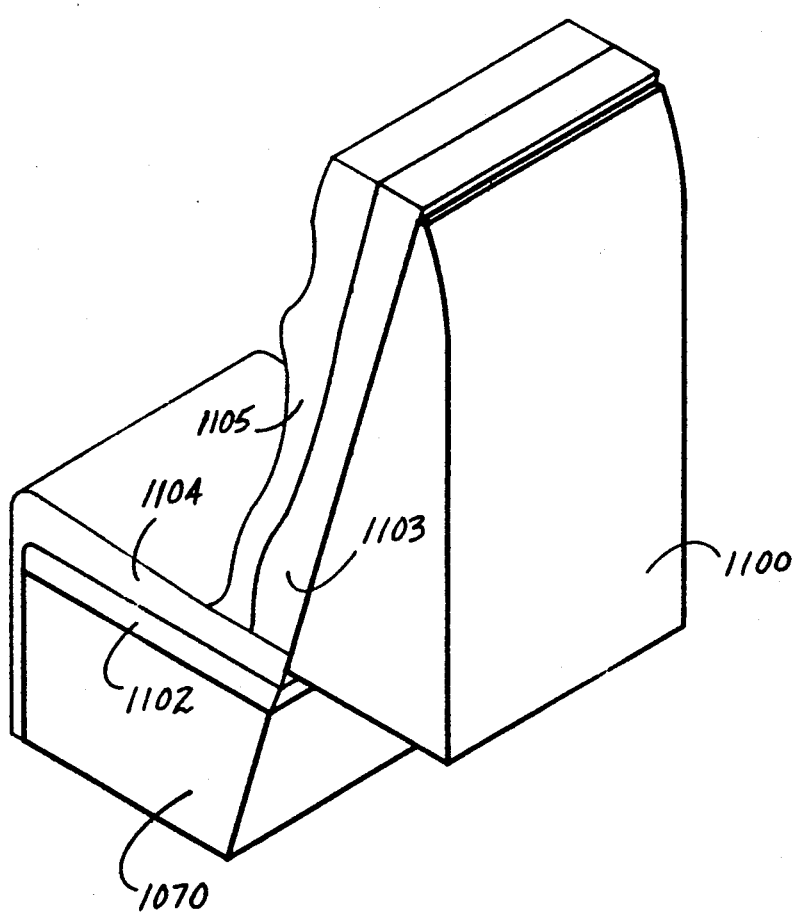
FIG. 91 is a pictorial view showing the seating cushion construction of FIG. 87.

FIGS. 87 and 91 illustrate that the passenger seating system includes not only the bottom foundation piece 1070 but also a rear or back support foundation piece 1100. The rear foundation piece 1100 is wedge shaped, or otherwise appropriately shaped and properly sized to fit between the frame assemblies side portions 1052, and otherwise between the frame assemblies and the inside wall of the enclosure shell. The bottom foundation piece 1070 is a trapezoidal prism sized to provide the desired seating elevation when covered with the secondary and tertiary seating layers. Bottom foundation piece 1070 and back foundation piece 1100 serve as the foundation layers of the passenger support and are selected from materials which exhibit an ability to plastically deform, but only significantly under conditions of high inertial force loading, such as 5–10 g's or higher.

The secondary passenger support layers 1102 and 1103 provide resilient but firm support for the passenger's rear and back. The tertiary or outer passenger support layers 1104 and 1105 provide relatively soft, comfortable padding and can be upholstered and the like. The secondary and tertiary layers can advantageously be surface contoured, such as shown in FIG. 91, to provide appropriate anatomical support and maximum distribution of forces during strong inertial accelerations, such as in crashes. The secondary and/or tertiary layers can advantageously be fashioned into a flotation device for use in water landings.

The seating construction described immediately above provides maximum distribution of impact forces which direct the passenger into and downwardly relative to the seat. The harness system described hereinabove is used advantageously in conjunction with the crash bag to provide passenger restraint in the upward, outward, and lateral directions relative to the passenger seats.

Safety enclosure 1000 is also adapted to position the auxiliary systems in positions which help to minimize the risk of passenger injury during high inertial force conditions. The air or other breathable gas storage tanks 1220 are stacked in a horizontal compact triangular arrangement with the refrigerant or other coolant tank 1271. The valving and control system interaction are substantially the same as described hereinabove with regard to other embodiments. Similar reference numerals with a preceding 1 in the 1000'column are indicated for corresponding parts to those shown and described above, such as with respect to FIG. 18 and safety enclosure 100.

Figure 86:
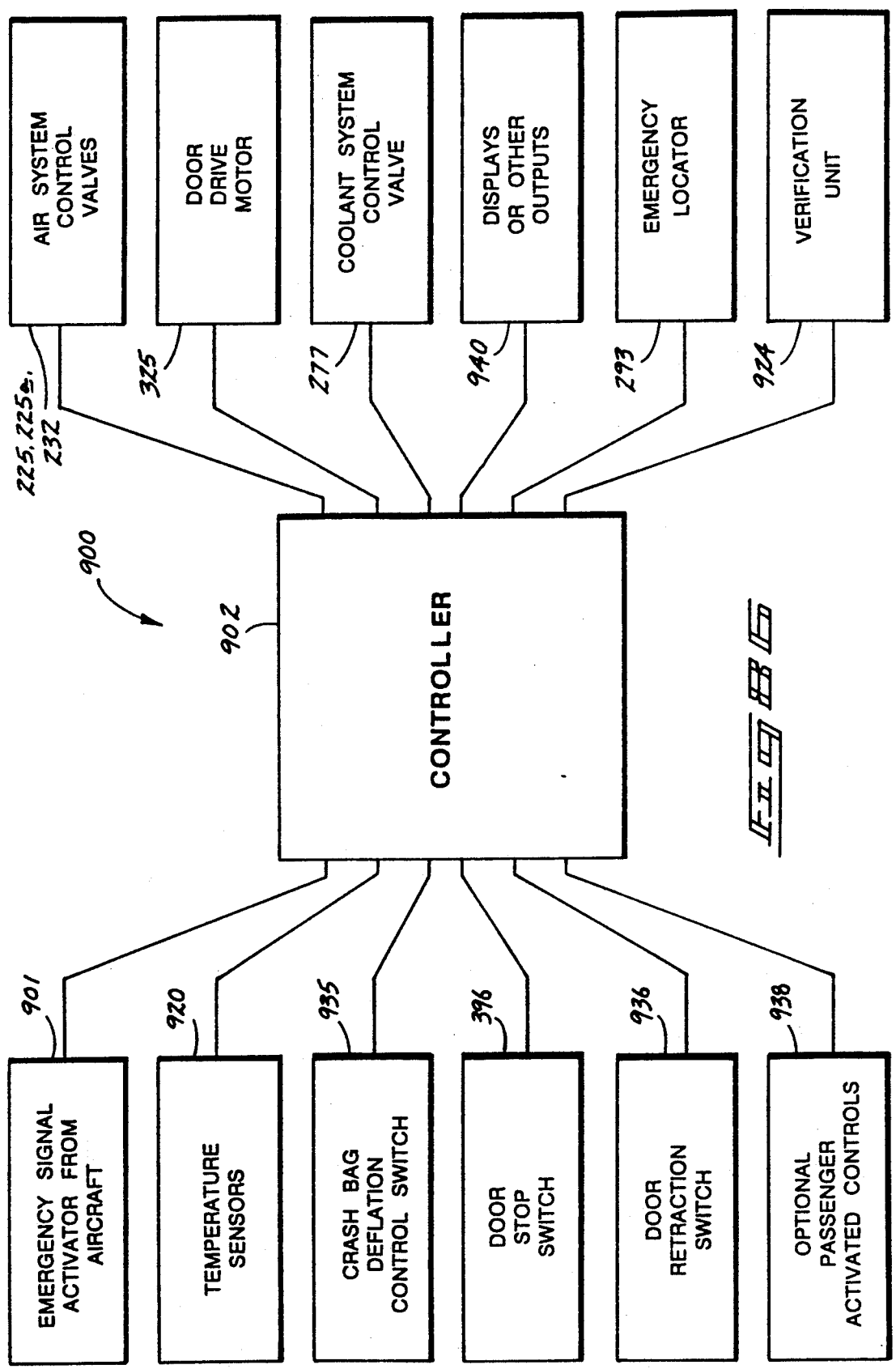
FIG. 86 is diagrammatic view showing a control system which can be used with the safety enclosure of FIG. 1 and other embodiments described herein.

FIG. 86 shows a preferred control system 900 which can be used with any of the safety enclosures described herein. Control system 900 includes a controller, microprocessor or computer 902, hereafter called the controller, which is suitably programmed to monitor and respond to perform the control functions indicated. Controller 902 can be selected from a variety of commercially available controllers. More specifically, controller 902 has a plurality of inputs including switch activated inputs and automatic sensors which are monitored by the controller.

FIG. 86 shows an emergency signal activator input 901 which is advantageously a switch controlled by the pilot and/or copilot of the aircraft, or other responsible crew member(s). The emergency signal activator will be operated under conditions conforming to a predetermined procedure or protocol in order to provide maximum passenger safety concerning the deployment of the crash bags and closure of the doors to the safety enclosures. The safety enclosures typically are in a standby mode of operation receiving power and communications from the mother ship until any emergency arises.

The controller 902 also receives input from temperature sensors 920 which are preferably positioned at appropriate points about the cabin interior wall to sense the temperature and detect any exposure of the enclosure to open flame or radiation. The door closure detection switch 396 is another input used by the controller to terminate drive of the door motor 325 when the door is closed or is otherwise obstructed such as to activate the switch. FIG. 86 also shows a crash bag deflation control switch 935 which is within the passenger control panel or otherwise available to the passengers when the crash bag has been deployed, and serves to instruct the controller 902 that appropriate operational steps should be performed to cease inflation of the crash bag and allow deflation. A door retraction switch 936 is included to allow the passengers to open the door means from within the cabin, preferably only following activation of switch 935. Additional optional inputs 938 can include switches for passenger control of various safety enclosure items such as use of emergency lighting, various displays, such as cabin temperature displays, and the like.

The output from controller 902 include the individual control signals for the crash bag and air control valves 225, 225a and 232, which are shown diagrammatically together. Further output signals are provided to door motor 325 for closure and retraction of the door. An output signal is also provide to activate the coolant control valve 277 for activation and deactivation of cooling system. Displays or other outputs 940 can also be included. Additional controller output signals include those to activate emergency lights (not shown), emergency locator unit 293 and the verification unit 924. Verification unit 924 is similar to flight recorders now used in airliners, and is used to record and verify information about the operation of the safety enclosure and control system 900. All significant control instructions are processed through controller 902 and recorded by the verification unit 924.

The various embodiments described hereinabove are operated in substantially the same fashion, and description will now be made with respect to the safety enclosure 100 with the understanding that such is also applicable to the remaining embodiments shown herein. Door assembly 114 is retracted into the overhead position so that passengers can gain access to the interior cabin through the door opening. Passengers assume seated positions within the respective seats 181–183 and secure the safety harnesses about them as shown in FIG. 6. Door assembly 118 remains in the overhead position during normal travel conditions. When the appropriate signals are received by the controller indicating imminent crash conditions, the system controller will instruct deployment of the crash bag by supplying pressurized air or other breathable gas to the crash bag interior. The system controller also preferably automatically controls the closure of door assembly 118 so as to allow the deploying air bag to displace air from the cabin as it expands to fill the safety enclosure cabin and restrain passengers against movement. By the time the air bag is fully deployed the door assembly 118 is in the fully extended and closed position providing substantially airtight and water-tight sealing of the door and cabin interior. The occupants are thus in a greatly enhanced condition for survival of shock and inertial loading due to the closure of the door, placement of the air bag, restraining action of the safety harness, and the energy absorbing quality of the seat structure. The approximate time necessary to deploy the air bag and close the door opening will vary depending upon the specific sizes and structures used, but it is preferable that deployment times of two to four seconds be achievable in order to maximize the bodily restraint function and provide protection for imminent crash situations. When it is appropriate to do so, the passengers may deflate the crash bag and divert all air feed to the vents located near the neck and head of the passengers.

The cooling system 270 becomes activated or deactivated automatically as described hereinabove due to exposure to fire or other high temperature conditions. The refrigerant coolant cools the cabin in the manner described hereinabove.

The safety enclosures described herein are made using well-known manufacturing techniques, such as employed in the construction of aircraft. Materials of construction can vary as desired or acceptable for the types of components included. Specific preferred materials have been described hereinabove where preference exists.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A protective safety enclosure for mounting within a vehicle to accommodate and protect passengers riding therein, comprising:
   a protective enclosure shell having an interior cabin in which passengers ride; said protective safety enclosure having thermal insulation between an exterior surface of said enclosure shell and said interior cabin;
   at least one passenger seat adapted to support a passenger therein and, to restrain the passenger against movement relative to the interior cabin;
   at least one door opening in said enclosure shell allowing access into and from the cabin;
   at least one door means which is operable to open and close the door opening; the enclosure shell and door means forming a substantially fluid-tight interior cabin against inward migration of gases and liquids when the door means closes the door opening;
   at least one gas-expandable crash bag mounted for controlled deployment to restrain a passenger within the at least one passenger seat and to in combination with the passenger seat resist passenger movement within the cabin;
   a cooling system adapted to cool the cabin during periods of exposure of the safety enclosure to fire or other high temperature conditions;
   a contained compressed breathable gas supply for supplying a breathable gas to passengers within the cabin during periods when the door means is closed, and for creating a positive pressure within the cabin relative to outside the enclosure, to exclude fumes and noxious gases which result during a fire within the vehicle in which the safety enclosure is mounted.

2. A safety enclosure as defined in claim 1 wherein the enclosure shell has at least two spaced wall members which enclose at least portions of said thermal insulation therebetween.

3. A safety enclosure as defined in claim 1 wherein the enclosure shell has at least two spaced wall members with thermally insulating and impact resistant material contained therebetween.

4. A safety enclosure as defined in claim 1 wherein the safety enclosure shell is adapted to join with other similar safety enclosures to form a modular array.

5. A combination including a plurality of safety enclosures as defined in claim 1 wherein enclosure shells of said plurality of safety enclosures are adjoined into a tubular array.

6. A combination including a plurality of safety enclosures as defined in claim 1 wherein the plurality of safety enclosures are joined into a modular array which share at least one common wall structure with another adjacent connected safety enclosure to allow formation of the modular array.

7. A safety enclosure as defined in claim 1 and further comprising at least a single row having a plurality of passenger seats.

8. A safety enclosure as defined in claim 1 and further comprising opposed facing rows having a plurality of passenger seats.

9. A safety enclosure as defined in claim 1 wherein said crash bag includes a plurality of breathable gas openings formed through a bag wall along at least one passenger contacting panel to allow delivery of breathable gas to the passenger during deployment of said crash bag.

10. A safety enclosure as defined in claim 1 wherein said crash bag is automatically controlled to deploy for use during periods when the safety enclosure is subjected to substantial acceleration or deceleration forces.

11. A safety enclosure as defined in claim 1 wherein said breathable gas supply includes at least one supply outlet adjacent to a location where a passenger head is expected to be during travel.

12. A safety enclosure as defined in claim 1 wherein:
   said crash bag is adapted and automatically controlled to deploy for use during periods when the safety enclosure is subjected to substantial acceleration or deceleration forces;
   said crash bag includes a plurality of breathable gas openings formed through a bag wall along at least one passenger contacting panel to allow delivery of breathable gas to the passengers during deployment of said crash bag; and,
   said breathable gas supply includes at least one supply outlet adjacent to a location where a passenger head is expected to be during travel.

13. A safety enclosure as defined in claim 1 wherein:
   said crash bag is adapted and automatically controlled to deploy for use during periods when the safety enclosure is subjected to substantial acceleration or deceleration forces; and,
   said crash bag includes a plurality of breathable gas openings formed through a bag wall adjacent passengers to allow delivery of breathable gas to the passengers during deployment of said crash bag.

14. A safety enclosure as defined in claim 1 and further comprising at least one passenger restraint harness for restraining a passenger in said at least one passenger seat.

15. A safety enclosure as defined in claim 1 wherein the at least one passenger seat is deformable under crash conditions to alleviate acceleration or deceleration forces on a passenger riding therein.

16. A safety enclosure as defined in claim 1 wherein said enclosure shell includes at least one cabin exhaust vent which allows breathable gas to exhaust from the cabin, but which maintains a positive cabin pressure to prevent inflow of combustion gases and fumes into the cabin during fire conditions.

17. A safety enclosure as defined in claim 16 wherein at least one cabin exhaust vent includes check valve means.

18. A safety enclosure as defined in claim 1 wherein the cooling system includes a supply of compressed refrigerant which is controllably passed through at least one coolant expansion tube which causes the refrigerant to expand and cool, thus cooling the cabin.

19. A safety enclosure as defined in claim 18 wherein:
the enclosure shell has at least inner and outer spaced wall members with thermally insulating and impact resistant material contained therebetween;
there are a plurality of coolant expansion tubes mounted to the inner wall member which exhaust refrigerant gas between the inner and outer wall members of the enclosure shell; and,
the outer wall member of the enclosure shell is provided with at least one refrigerant escape opening to allow the expanded refrigerant, exhausted from the coolant expansion tubes, to pass from between the inner and outer wall members of the enclosure shell.

20. A safety enclosure as defined in claim 18 wherein the cooling system includes means to detect high temperatures to which the safety enclosure is subjected and to automatically cause cooling of the cabin.

21. A safety enclosure as defined in claim 1 wherein said door means is power driven and automatically controlled to close during appropriate risk periods.

22. A safety enclosure as defined in claim 1 wherein said door means further comprises an escape hatch means allowing passenger escape without opening of the door means.

23. A safety enclosure as defined in claim 1 wherein said door means is constructed to retract into an overhead position.

24. A protective safety enclosure for use within aircraft to accommodate and protect passengers riding therein against crash forces, fire and noxious gases, comprising:
a protective enclosure shell; said enclosure shell having at least inner and outer spaced shell wall members with thermally insulating and impact resistant material contained therebetween; said enclosure shell defining an interior cabin in which passengers ride;
at least one passenger seat within said cabin to support at least one passenger therein and, to restrain the passenger against movement relative to the interior cabin;
at least one door opening in said enclosure shell allowing access into and from the cabin;
at least one power operated automatic door means which is operable to open and close the door opening; the enclosure shell and door means forming a substantially fluid-tight interior cabin against inward migration of gases and liquids when the door means closes the door opening;
at least one automatically controlled gas-expandable crash bag mounted for controlled deployment to restrain a passenger within the at least one passenger seat and to in combination with the passenger seat limit and cushion passenger movement within the cabin;
an automatic cooling system adapted to sense the temperature of the safety enclosure and to automatically cool the cabin during periods of exposure of the safety enclosure to fire or other high temperature conditions;
an automatic contained compressed breathable gas supply for automatically supplying a breathable gas to passengers within the cabin during periods when the door means is closed, and for creating a positive pressure within the cabin to exclude fumes and noxious gases which result during a fire within the vehicle in which the safety enclosure is mounted;
at least one controller for automatically controlling the door means, crash bag, cooling system, and breathable gas supply.

25. A safety enclosure as defined in claim 24 wherein the safety enclosure shell is adapted to join with other similar safety enclosures to form a modular array.

26. A safety enclosure as defined in claim 24 wherein the safety enclosure shell is adapted to share a common shell wall structure with another adjacent connected safety enclosure to allow formation of a modular array of at least two safety enclosures.

27. A safety enclosure as defined in claim 24 wherein said crash bag includes a plurality of breathable gas openings formed through a bag wall along at least one passenger contacting panel to allow delivery of breathable gas to the passenger during deployment of said crash bag.

28. A safety enclosure as defined in claim 24 wherein said breathable gas supply includes at least one supply outlet adjacent to a location where a passenger head is expected to be during travel.

29. A safety enclosure as defined in claim 24 wherein said crash bag is automatically controlled to deploy for use during periods when the safety enclosure is subjected to substantial acceleration or deceleration forces.

30. A safety enclosure as defined in claim 24 further comprising at least one passenger restraint harness for restraining a passenger in said at least one passenger seat.

31. A safety enclosure as defined in claim 24 wherein the at least one passenger seat is deformable under crash conditions to alleviate acceleration or deceleration forces on a passenger riding therein.

32. A safety enclosure as defined in claim 24 wherein said enclosure shell includes at least one cabin exhaust vent which allows breathable gas to exhaust from the cabin, but which maintains a positive cabin pressure to prevent inflow of combustion gases and fumes into the cabin during fire conditions.

33. A safety enclosure as defined in claim 32 wherein at least one cabin exhaust vent includes check valve means.

34. A safety enclosure as defined in claim 24 wherein the cooling system includes:
a plurality of coolant expansion tubes mounted to the inner wall member of the enclosure shell which exhaust refrigerant gas between inner and outer wall members of the enclosure shell; and wherein, the outer wall member of the enclosure shell is provided with at least one refrigerant escape opening to allow the expanded refrigerant, exhausted from the coolant expansion tubes, to pass from between the inner and outer wall members of the enclosure shell.

35. A safety enclosure as defined in claim 24 wherein said door means further comprises an escape hatch means allowing passenger escape without opening of the door means.

36. A safety enclosure as defined in claim 24 wherein said door means is constructed to retract into an overhead position.

37. A protective safety enclosure for mounting within a vehicle to accommodate and protect passengers riding therein, comprising:
- a protective enclosure shell; said enclosure shell having at least inner and outer spaced shell wall members with thermally insulating and impact resistant material contained therebetween; said enclosure shell defining an interior cabin in which passengers ride;
- passenger seating within said cabin;
- at least one door opening in said enclosure shell allowing access into and from the cabin;
- at least one door means which is operable to open and close the door opening;
- a cooling system adapted to cool the cabin during periods of exposure of the safety enclosure to fire or other high temperature conditions; said cooling system including a contained supply of refrigerant connected to supply a plurality of coolant expansion tubes mounted to the enclosure shell at spaced locations to exhaust refrigerant gas between the inner and outer wall members of the enclosure shell; and wherein,
- the outer wall member of the enclosure shell is provided with refrigerant escape openings to allow the expanded refrigerant gas exhausted from the coolant expansion tubes to pass from between the inner and outer wall members of the enclosure shell.

38. A safety enclosure as defined in claim 37 and further comprising a contained compressed breathable gas supply for supplying breathable gas to passengers within the cabin during periods when the door means is closed, and for creating a positive pressure within the cabin to exclude fumes and noxious gases which result during a fire within the vehicle in which the safety enclosure is mounted.

39. A safety enclosure as defined in claim 37 wherein the cooling system includes means to detect high temperatures to which the safety enclosure is subjected and to automatically cause cooling of the cabin.

40. A protective safety enclosure for mounting within a vehicle to accommodate and protect passengers riding therein, comprising:
- a protective enclosure shell having an interior cabin in which passengers ride;
- at least one door opening in said enclosure shell allowing access into and from the cabin;
- at least one door means which is operable to open and close the door opening;
- at least one gas-expandable crash bag mounted for controlled deployment to resist passenger movement within the cabin; said crash bag including a plurality of breathable gas openings formed through a bag wall in said crash bag adjacent to at least one passenger to allow delivery of breathable gas to the passenger during deployment of said crash bag;
- a contained, compressed breathable gas supply for supplying a breathable gas to passengers within the cabin during periods when the door means is closed, and for creating a positive pressure within the cabin to exclude fumes and noxious gases which result during a fire within the vehicle in which the safety enclosure is mounted.

41. A safety enclosure as defined in claim 40 wherein said crash bag is automatically controlled to deploy for use during periods of when the safety enclosure is subjected to substantial acceleration or deceleration forces.

42. A safety enclosure as defined in claim 40 wherein said breathable gas supply includes at least one supply outlet adjacent to a location where a passenger head is expected to be during travel.

43. A safety enclosure as defined in claim 40 wherein:
- said crash bag is adapted and automatically controlled to deploy for use during periods when the safety enclosure is subjected to substantial acceleration or deceleration forces; and
- said breathable gas supply includes at least one supply outlet adjacent to a location where a passenger head is expected to be during travel.

44. A safety enclosure as defined in claim 40 wherein said crash bag and door means are automatically controlled and powered to provide coordinated deployment of the crash bag as the door means closes to thereby allow cabin air to be efficiently displaced by the crash bag through the closing door means.

45. A crash bag system for use in a protective safety enclosure, comprising:
- a flexible bag envelope having at least one bag wall;
- a plurality of breathable gas openings formed through at least one bag wall of said bag envelope along passenger contacting panels; at least some of said breathable gas openings being formed to allow delivery of a breathable gas therethrough for supplying the breathable gas to a passenger.

46. A crash bag system as defined in claim 45 and further comprising:
- sensor means for sensing an event for which deployment of the crash bag is desired;
- at least one supply of compressed, breathable gas for deploying the crash bag;
- at least one valve means for controlling the flow of compressed, breathable gas from said supply of compressed, breathable gas to the crash bag;
- control means for receiving information from the sensor means and controlling said valve means to deploy the crash bag and supply breathable gas therethrough.

47. A protective safety enclosure for mounting within a vehicle to accommodate and protect passages riding therein, comprising:
- a protective enclosure shell having an interior cabin in which passengers ride;
- at least one door opening in said enclosure shell allowing access into and from the cabin;
- at least one door means which is operable to open and close the door opening;
- at least one gas-expandable crash bag mounted for controlled deployment to resist passenger movement within the cabin; said crash bag including a plurality of breathable gas openings formed through a bag wall along at least one passenger contacting panel to allow delivery of breathable gas to the passenger during deployment of said crash bag;
- a cooling system adapted to cool the cabin during periods of exposure of the safety enclosure to fire or other high temperature conditions;
- a contained compressed breathable gas supply for supplying a breathable gas to passengers within the cabin during periods when the door means is closed, and for creating a positive pressure within the cabin to exclude fumes and noxious gases which result during a fire within the vehicle in which the safety enclosure is mounted.

48. A protective safety enclosure for mounting within a vehicle to accommodate and protect passages riding therein, comprising:

a protective enclosure shell having an interior cabin in which passengers ride;

at least one door opening in said enclosure shell allowing access into and from the cabin;

at least one door means which is operable to open and close the door opening;

at least one gas-expandable crash bag mounted for controlled deployment to resist passenger movement within the cabin; said crash bag being adapted and automatically controlled to deploy for use during periods when the safety enclosure is subjected to substantial acceleration or deceleration forces; said crash bag including a plurality of breathable gas openings formed through a bag wall along at least one passenger contacting panel to allow delivery of breathable gas to the passengers during deployment of said crash bag;

a cooling system adapted to cool the cabin during periods of exposure of the safety enclosure to fire or other high temperature conditions;

a contained compressed breathable gas supply for supplying a breathable gas to passengers within the cabin during periods when the door means is closed, and for creating a positive pressure within the cabin to exclude fumes and noxious gases which result during a fire within the vehicle in which the safety enclosure is mounted; said breathable gas supply including at least one supply outlet adjacent to a location where a passenger head is expected to be during travel.

49. A protective safety enclosure for mounting within a vehicle to accommodate and protect passages riding therein, comprising:

a protective enclosure shell having an interior cabin in which passengers ride;

at least one door opening in said enclosure shell allowing access into and from the cabin;

at least one door means which is operable to open and close the door opening;

at least one gas-expandable crash bag mounted for controlled deployment to resist passenger movement within the cabin; said crash bag being adapted and automatically controlled to deploy for use during periods when the safety enclosure is subjected to substantial acceleration or deceleration forces; said crash bag further including a plurality of breathable gas openings formed through a bag wall adjacent passengers to allow delivery of breathable gas to the passengers during deployment of said crash bag;

a cooling system adapted to cool the cabin during periods of exposure of the safety enclosure to fire or other high temperature conditions;

a contained compressed breathable gas supply for supplying a breathable gas to passengers within the cabin during periods when the door means is closed, and for creating a positive pressure within the cabin to exclude fumes and noxious gases which result during a fire within the vehicle in which the safety enclosure is mounted.

50. A protective safety enclosure for use in aircraft and to accommodate and protect passages riding therein against crash forces, fire and noxious gases, comprising:

a protective enclosure shell; said enclosure shell having at least inner and outer spaced shell wall members with thermally insulating and impact resistant material contained therebetween; said enclosure shell defining an interior cabin in which passengers ride;

passenger seating within said cabin;

at least one door opening in said enclosure shell allowing access into and from the cabin;

at least one door means which is operable to open and close the door opening;

at least one automatically controlled gas-expandable crash bag mounted for controlled deployment to resist passenger movement within the cabin; said crash bag including a plurality of breathable gas openings formed through a bag wall along at least one passenger contacting panel to allow delivery of breathable gas to the passenger during deployment of said crash bag;

a cooling system adapted to cool the cabin during periods of exposure of the safety enclosure to fire or other high temperature conditions;

a contained compressed breathable gas supply for supplying a breathable gas to passengers within the cabin during periods when the door means is closed, and for creating a positive pressure within the cabin to exclude fumes and noxious gases which result during a fire within the vehicle in which the safety enclosure is mounted.

51. A safety enclosure as defined in claim 18 wherein at least one coolant expansion tube is arranged at spaced locations about the enclosure shell to remove heat therefrom; said coolant expansion tube being arranged to provide for the exhausting expanded refrigerant to the exterior of the enclosure shell.

52. A safety enclosure according to claim 37 wherein the plurality of coolant expansion tubes are mounted to the inner wall member of the enclosure shell to transfer heat therefrom.

53. A protective safety enclosure for mounting within a vehicle to accommodate and protect passengers riding therein, comprising:

a protective enclosure shell having an interior cabin in which passengers ride; said protective safety enclosure having thermal and crash resistant insulation between an exterior surface of said enclosure shell and said interior cabin;

at least one passenger seat adapted to support a passenger therein and, to restrain the passenger against movement relative to the interior cabin;

at least one door opening in said enclosure shell allowing access into and from the cabin;

at least one door means which is operable to open and close the door opening; the enclosure shell and door means forming a substantially fluid-tight interior cabin against inward migration of gases and liquids when the door means closes the door opening;

at least one gas-expandable crash bag mounted for controlled deployment to restrain a passenger within the at least one passenger seat and to in combination with the passenger seat resist passenger movement within the cabin;

a contained compressed breathable gas supply for supplying a breathable gas to passengers within the cabin during periods when the door means is closed, and for creating a positive pressure within the cabin to exclude fumes and noxious gases which result during a fire within the vehicle in which the safety enclosure is mounted.

54. A safety enclosure as defined in claim 53 wherein said crash bag is connected to be filled with breathable gas from said compressed breathable gas supply and to supply breathable gas to the cabin through the crash bag.

55. A safety enclosure as defined in claim 53 wherein said crash bag includes a plurality of breathable gas openings formed through a bag wall in said crash bag adjacent at least one passenger to allow delivery of breathable gas to the passenger during deployment of said crash bag.

56. A safety enclosure as defined in claim 53 wherein said crash bag is automatically controlled to deploy for use during periods of when the safety enclosure is subjected to substantial acceleration or deceleration forces.

57. A safety enclosure as defined in claim 53 wherein said breathable gas supply includes at least one supply outlet adjacent to a location where a passenger head is expected to be during travel.

58. A safety enclosure as defined in claim 53 wherein:
said crash bag is connected to be filled with breathable gas from said compressed breathable gas supply and to supply breathable gas to the cabin through the crash bag;
said crash bag is adapted and automatically controlled to deploy for use during periods when the safety enclosure is subjected to substantial acceleration or deceleration forces.

59. A safety enclosure as defined in claim 53 wherein:
said crash bag is adapted and automatically controlled to deploy for use during periods when the safety enclosure is subjected to substantial acceleration or deceleration forces; and,
said crash bag includes a plurality of breathable gas openings formed through a bag wall adjacent passengers to allow delivery of breathable gas to the passengers during deployment of said crash bag.

60. A safety enclosure as defined in claim 59 wherein said crash bag and door means are automatically controlled and powered to provide coordinated deployment of the crash bag as the door means closes to thereby allow cabin air to be efficiently displaced by the crash bag through the closing door means.

61. A crash bag system, comprising:
at least one flexible bag envelope having at least one bag wall;
a plurality of breathable gas openings formed through at least one bag wall of said bag envelope to allow delivery of a breathable gas therethrough for supplying the breathable gas to a passenger.

62. A crash bag system according to claim 61 and further comprising at least one supply of compressed, breathable gas for deploying the crash bag.

63. A crash bag system as defined in claim 61 and further comprising:
sensor means for sensing an event for which deployment of the crash bag is desired;
at least one supply of compressed, breathable gas for deploying the crash bag;
at least one valve means for controlling the flow of compressed, breathable gas from said supply of compressed, breathable gas to the crash bag;
control means for receiving information from the sensor means and controlling said valve means to deploy the crash bag and supply breathable gas therethrough.

64. A protective safety enclosure for mounting within a vehicle to accommodate and protect passengers riding therein, comprising:
a protective enclosure shell having an interior cabin in which passengers ride; said protective safety enclosure having thermal insulation between an exterior surface of said enclosure shell and said interior cabin;
at least one passenger seat adapted to support a passenger therein and, to restrain the passenger against movement relative to the interior cabin;
at least one door opening in said enclosure shell allowing access into and from the cabin;
at least one door means which is operable to open and close the door opening; the enclosure shell and door means forming a substantially fluid-tight interior cabin against inward migration of gases and liquids when the door means closes the door opening;
at least one safety harness system to restrain a passenger within the passenger seat and to limit passenger movement with the cabin;
a cooling system adapted to cool the cabin during periods of exposure of the safety enclosure to fire or other high temperature conditions;
a contained compressed breathable gas supply for supplying a breathable gas to passengers within the cabin during periods when the door means is closed, and for creating a positive pressure within the cabin to exclude fumes and noxious gases which result during a fire within the vehicle in which the safety enclosure is mounted.

65. A safety enclosure as defined in claim 64 wherein the enclosure shell has at least two spaced wall members which enclose at least portions of said thermal insulation therebetween.

66. A safety enclosure as defined in claim 64 wherein the enclosure shell has at least two spaced wall members with thermally insulating and impact resistant material contained therebetween.

67. A safety enclosure as defined in claim 64 wherein the safety enclosure shell is adapted to join with other similar safety enclosures to form a modular array.

68. A combination including a plurality of safety enclosures as defined in claim 64 wherein enclosure shells of said plurality of safety enclosures are adjoined into a tubular array.

69. A combination including a plurality of safety enclosures as defined in claim 64 wherein the plurality of safety enclosures are joined into a modular array which share at least one common wall structure with another adjacent connected safety enclosure to allow formation of the modular array.

70. A safety enclosure as defined in claim 64 wherein the safety enclosure shell is adapted to share a common shell wall structure with another adjacent connected safety enclosure to allow formation of a modular array of at least two safety enclosures.

71. A safety enclosure as defined in claim 64 and further comprising at least a single row having a plurality of passenger seats.

72. A safety enclosure as defined in claim 64 and further comprising opposed facing rows having a plurality of passenger seats.

73. A safety enclosure as defined in claim 64 wherein said breathable gas supply includes at least one supply outlet adjacent to a location where a passenger head is expected to be during travel.

74. A safety enclosure as defined in claim 64 wherein the at least one passenger seat is deformable under crash conditions to alleviate acceleration or deceleration forces on a passenger riding therein.

75. A safety enclosure as defined in claim 64 wherein said enclosure shell includes at least one cabin exhaust vent which allows breathable gas to exhaust from the cabin, but which maintains a positive cabin pressure to prevent inflow of combustion gases and fumes into the cabin during fire conditions.

76. A safety enclosure as defined in claim 75 wherein at least one cabin exhaust vent includes check valve means.

77. A safety enclosure as defined in claim 64 wherein the cooling system includes a supply of compressed refrigerant which is controllably passed through at least one coolant expansion tube which causes the refrigerant to expand and cool, thus cooling the cabin.

78. A safety enclosure as defined in claim 77 wherein:
the enclosure shell has at least inner and outer spaced wall members with thermally insulating and impact resistant material contained therebetween;
there are a plurality of coolant expansion tubes mounted to the inner wall member which exhaust refrigerant gas between the inner and outer wall members of the enclosure shell; and
the outer wall member of the enclosure shell is provided with at least one refrigerant escape opening to allow the expanded refrigerant exhausted from the coolant expansion tubes to pass from between the inner and outer wall members of the enclosure shell.

79. A safety enclosure as defined in claim 77 wherein the cooling system includes means to detect high temperatures to which the safety enclosure is subjected and to automatically cause cooling of the cabin.

80. A safety enclosure as defined in claim 64 wherein said door means is power driven and automatically controlled to close during appropriate risk periods.

81. A safety enclosure as defined in claim 64 wherein said door means further comprises an escape hatch means allowing passenger escape without opening of the door means.

82. A safety enclosure as defined in claim 64 wherein said door means is constructed to retract into an overhead position.

83. A safety enclosure as defined in claim 64 wherein at least one passenger seat comprises a plurality of energy absorbing layers including at least one elastically deformable layer and at least one plastically deformable layer which is plastically deformable under crash conditions; both of said layers being deformable under crash conditions to alleviate acceleration or deceleration forces on a passenger riding therein.

84. A safety enclosure as defined in claim 1 wherein at least one passenger seat comprises a plurality of energy absorbing layers including at least one elastically deformable layer and at least one plastically deformable layer which is plastically deformable under crash conditions; both of said layers being deformable under crash conditions to alleviate acceleration or deceleration forces on a passenger riding therein.

85. A safety enclosure as defined in claim 1 wherein the safety enclosure shell is adapted to share a common shell wall structure with another adjacent connected safety enclosure to allow formation of a modular array of at least two safety enclosures.

86. A combination including a plurality of safety enclosures as defined in claim 24 wherein enclosure shells of said plurality of safety enclosures are adjoined into a tubular array.

87. A combination including a plurality of safety enclosures as defined in claim 24 wherein the plurality of safety enclosures are joined into a modular array which share at least one common wall structure with another adjacent connected safety enclosure to allow formation of the modular array.

* * * * *